United States Patent [19]
Fujita et al.

[11] Patent Number: 5,606,402
[45] Date of Patent: Feb. 25, 1997

[54] ELECTROSTATIC IMAGE FORMER WITH IMPROVED TONER CONTROL GRID

[75] Inventors: Hirokazu Fujita, Nara; Naoki Irisa, Yamatokoriyama, both of Japan

[73] Assignee: Sharp Kabushiki Kaisha, Osaka, Japan

[21] Appl. No.: 358,785

[22] Filed: Dec. 16, 1994

[30] Foreign Application Priority Data

Dec. 27, 1993 [JP] Japan .................................. 5-332473
Aug. 11, 1994 [JP] Japan .................................. 6-189393

[51] Int. Cl.$^6$ .................................................. G03G 15/06
[52] U.S. Cl. .............................. 399/222; 347/55; 399/55
[58] Field of Search ........................... 355/200, 202, 355/210, 245, 247, 248, 249, 261; 347/111, 112, 55, 158

[56] References Cited

U.S. PATENT DOCUMENTS

| | | | |
|---|---|---|---|
| 4,491,855 | 1/1985 | Fujii et al. | 347/55 |
| 4,743,926 | 5/1988 | Schmidlin et al. | |
| 5,036,341 | 7/1991 | Larsson | 347/55 |
| 5,121,144 | 6/1992 | Larsson et al. | 347/55 |
| 5,128,695 | 7/1992 | Maeda | 347/55 |
| 5,202,704 | 4/1993 | Iwao | 347/55 |
| 5,214,451 | 5/1993 | Schmidlin et al. | |
| 5,229,794 | 7/1993 | Honma et al. | 347/55 |
| 5,339,134 | 8/1994 | Nakamura et al. | 358/202 |
| 5,357,274 | 10/1994 | Kitamura | 347/55 |

FOREIGN PATENT DOCUMENTS

| | | |
|---|---|---|
| 0463743A3 | 1/1992 | European Pat. Off. . |
| 0550880A2 | 7/1993 | European Pat. Off. . |
| 0617335A2 | 9/1994 | European Pat. Off. . |

Primary Examiner—Sandra L. Brase
Attorney, Agent, or Firm—David G. Conlin; Milton Oliver

[57] ABSTRACT

In an image forming apparatus, flying of toner from a toner holder towards a counter electrode is controlled by giving a potential to a control grid according to an image signal. Here, a distance between the control grid and the toner holder is set so as to be shorter than a pitch of a gate. The toner passes through a plurality of gates which is a passing section of the toner in the control grid and adheres to a sheet so as to form an image on the sheet. Furthermore, in the image forming apparatus, image signals to be inputted serially from an image reading unit are distributed to odd lines and even lines so as to respectively stored into the odd memory and the even memory. The image signals are stored into the odd memory and at the same time the image signals stored in the even memory are read out.

24 Claims, 68 Drawing Sheets

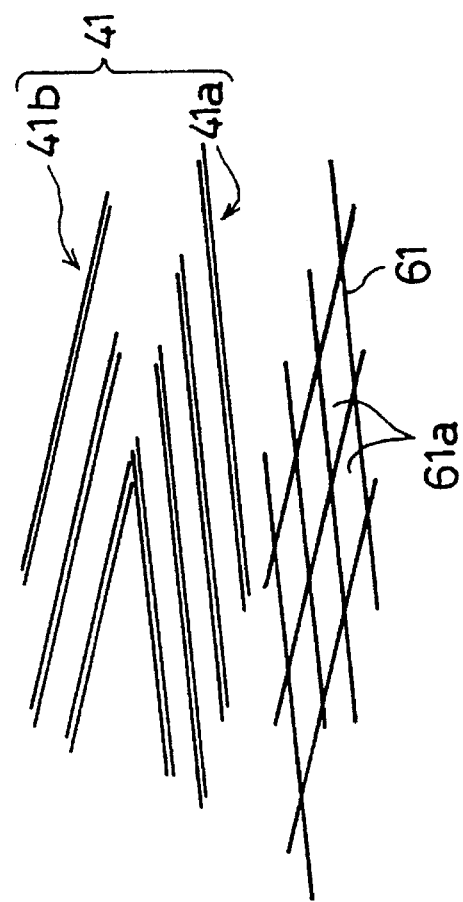
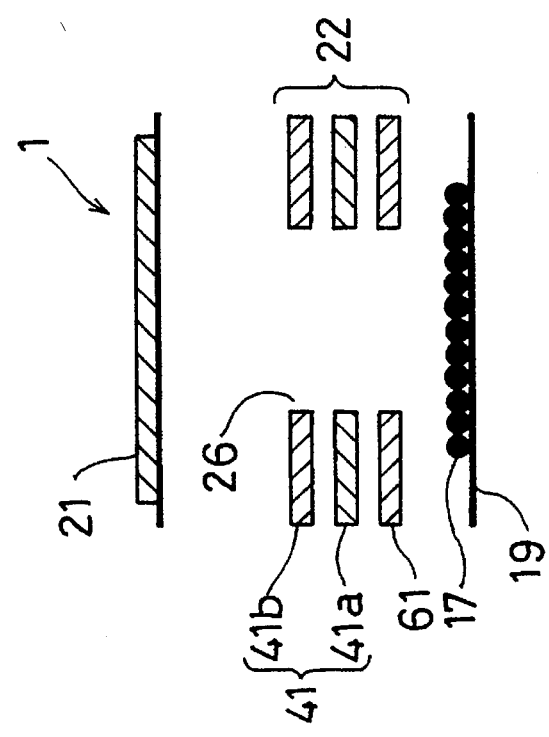
FIG. 21(a)
FIG. 21(b)

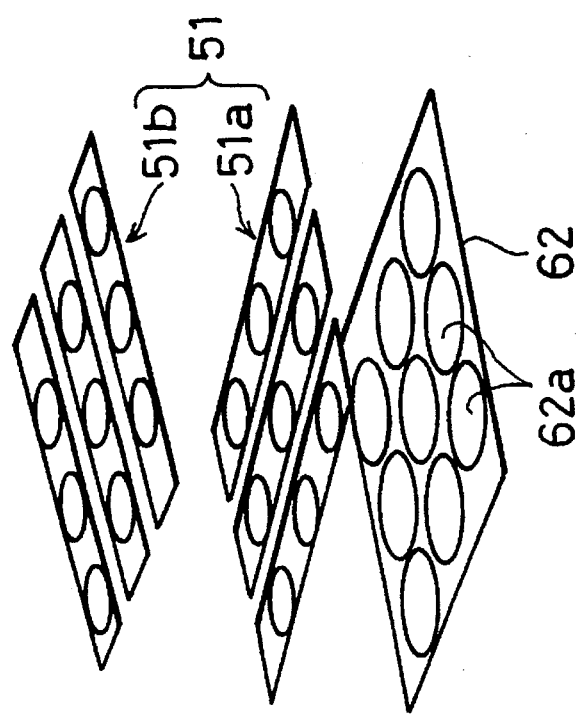
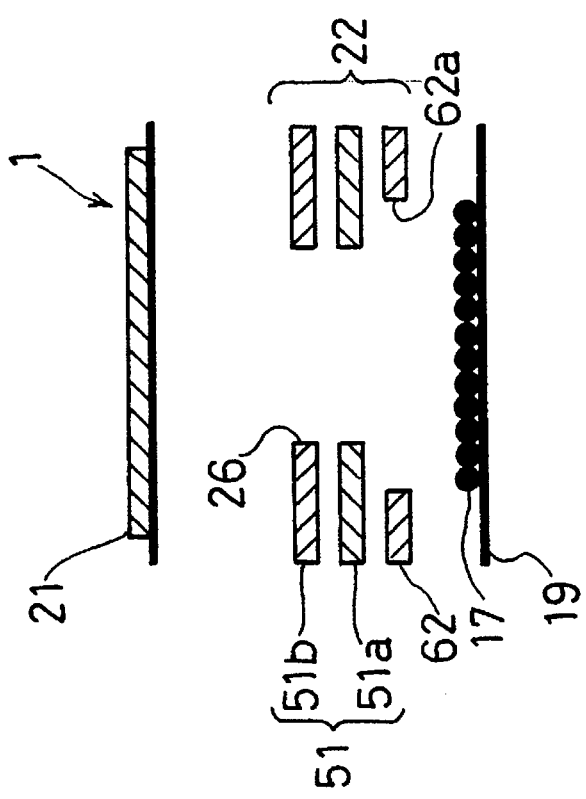
FIG. 26(a)
FIG. 26(b)

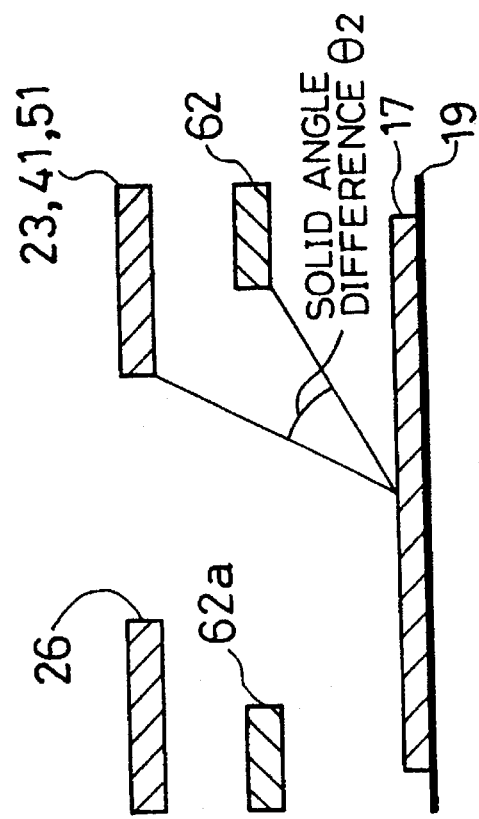
FIG. 28(a)
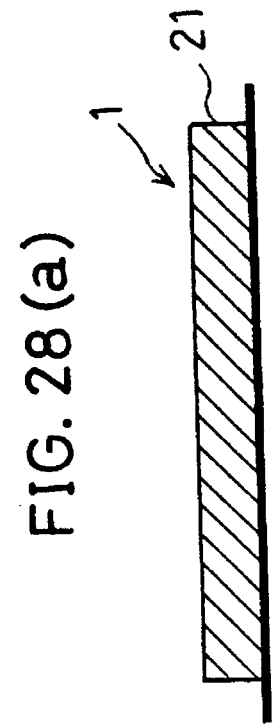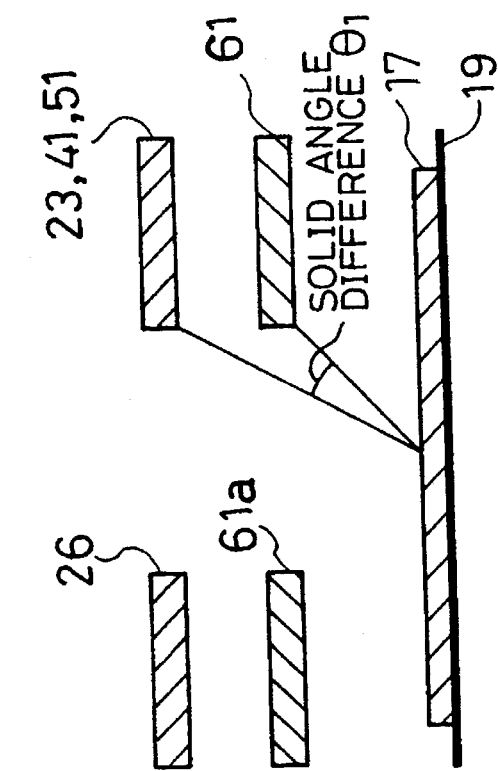
FIG. 28(b)

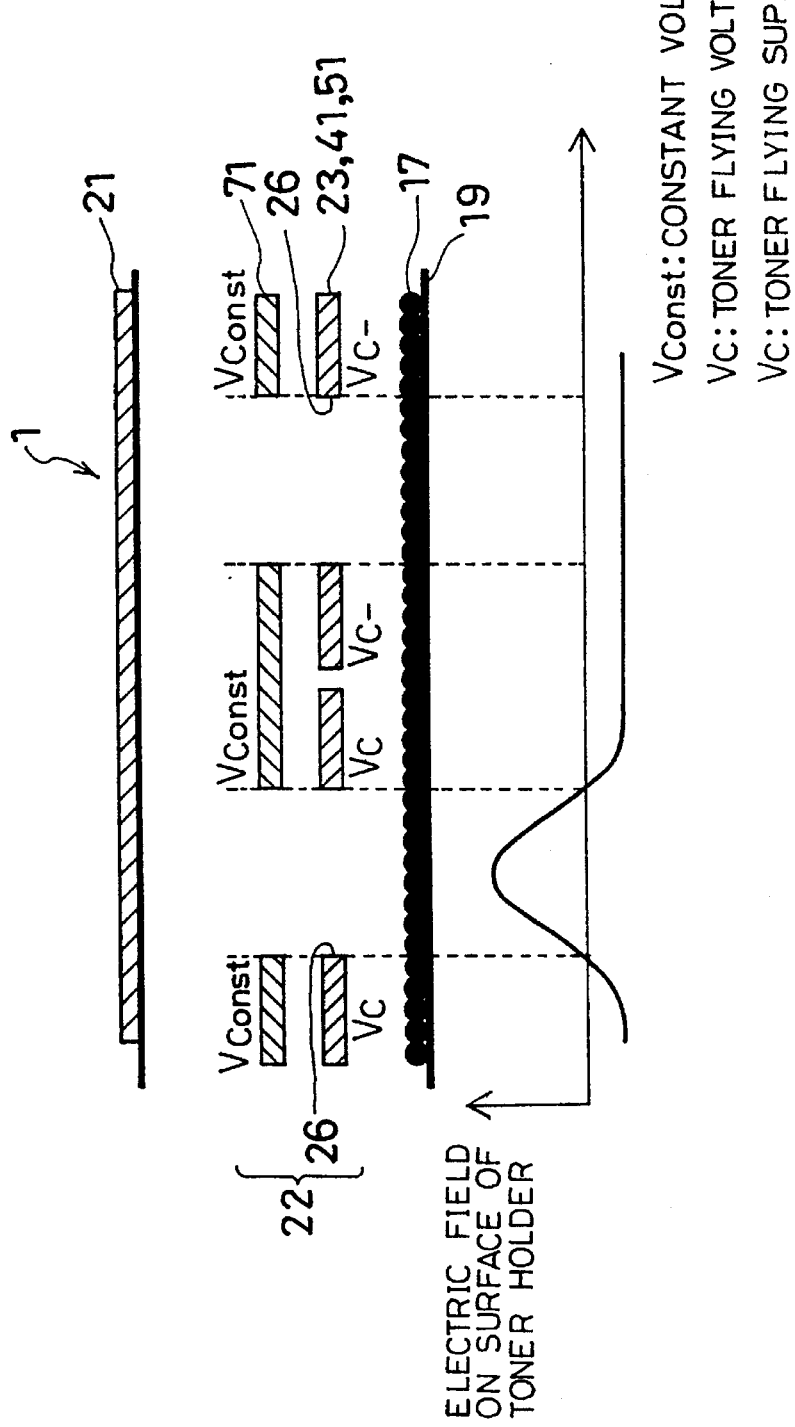

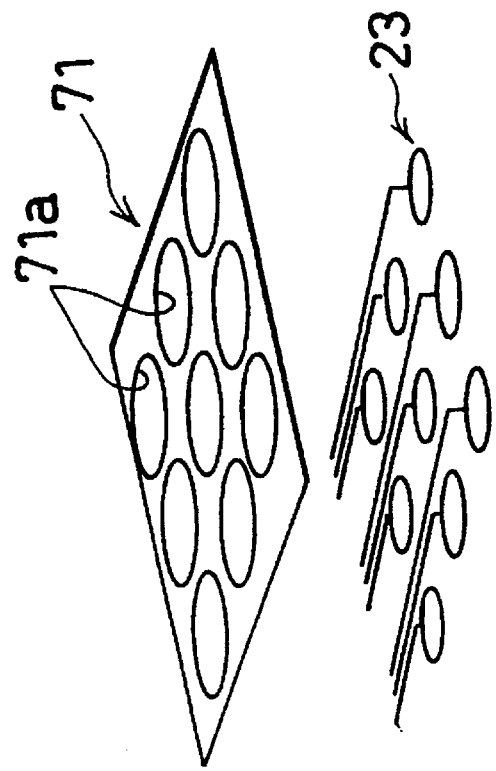
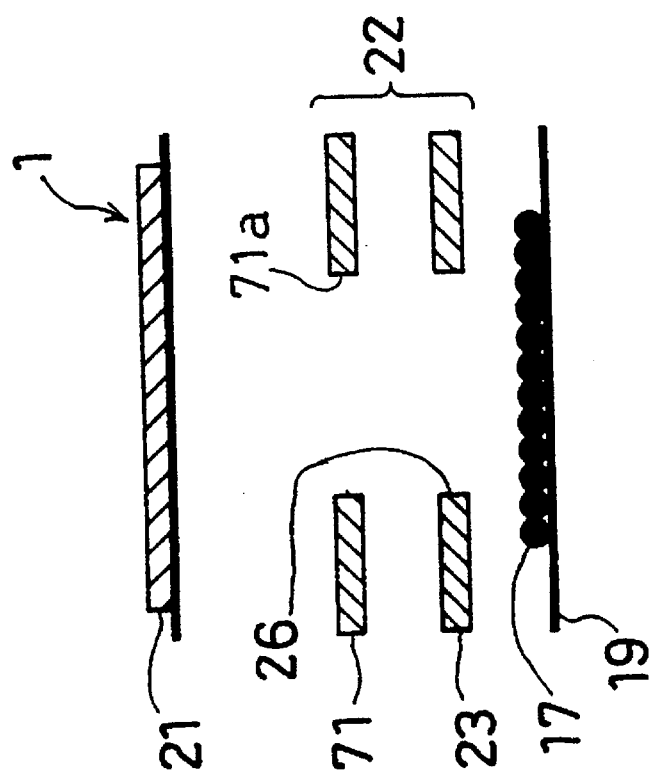
FIG. 30(b)
FIG. 30(a)

DISTRIBUTION OF POTENTIAL

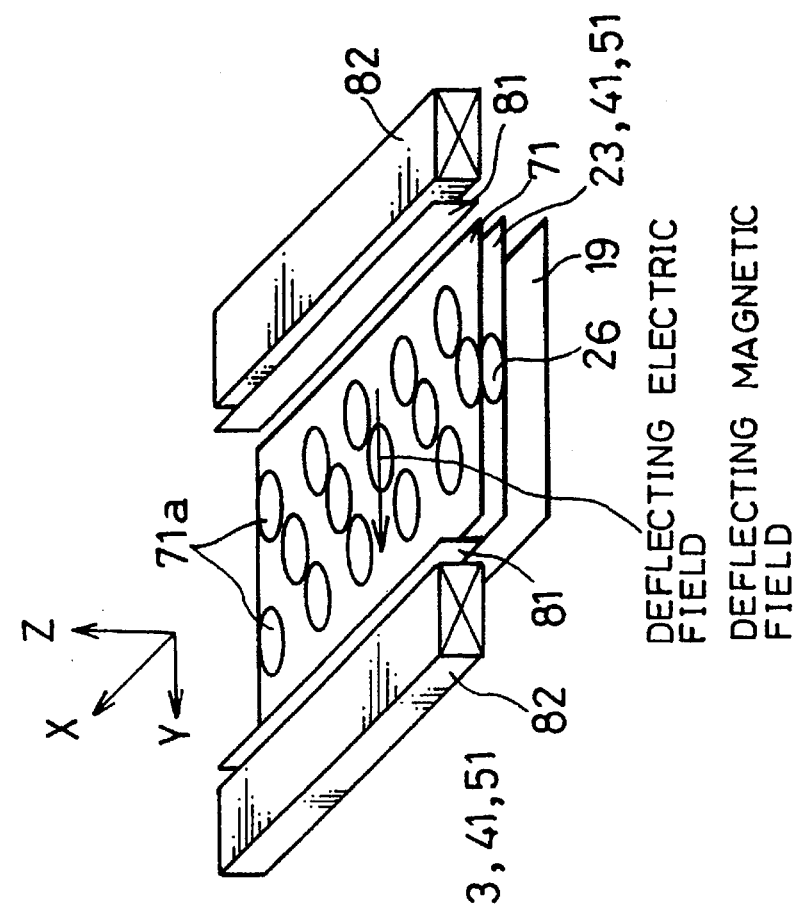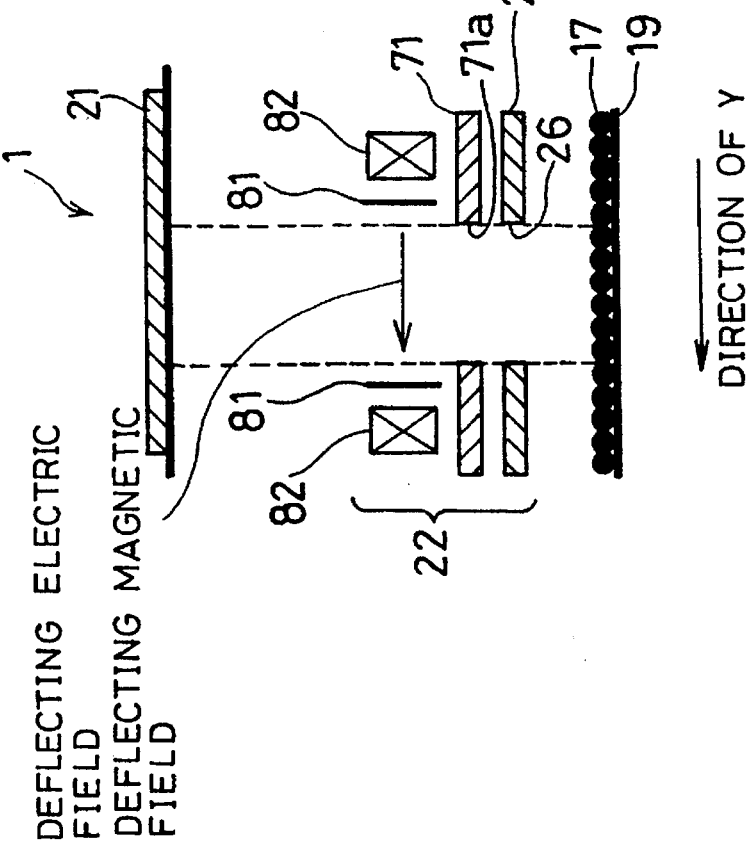
FIG. 35(b)
FIG. 35(a)

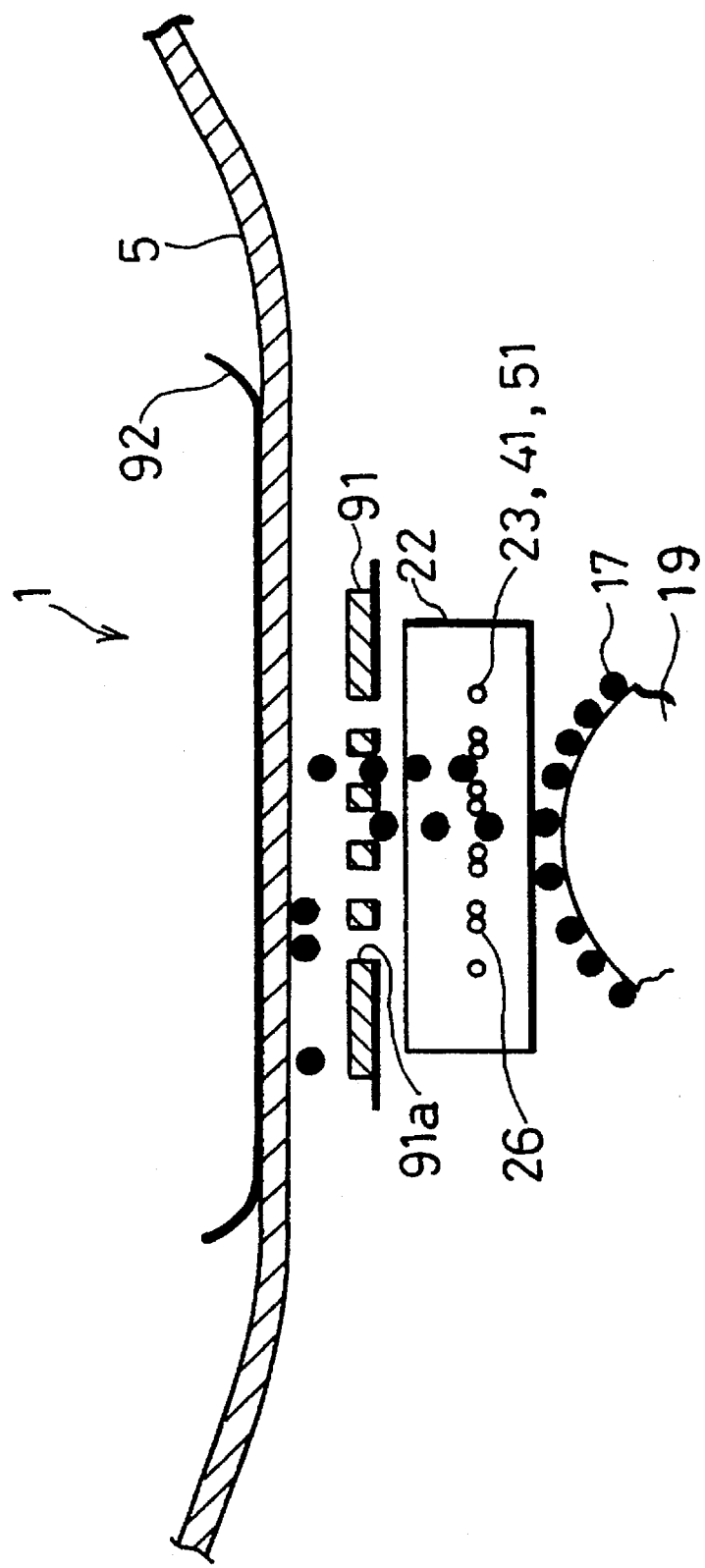

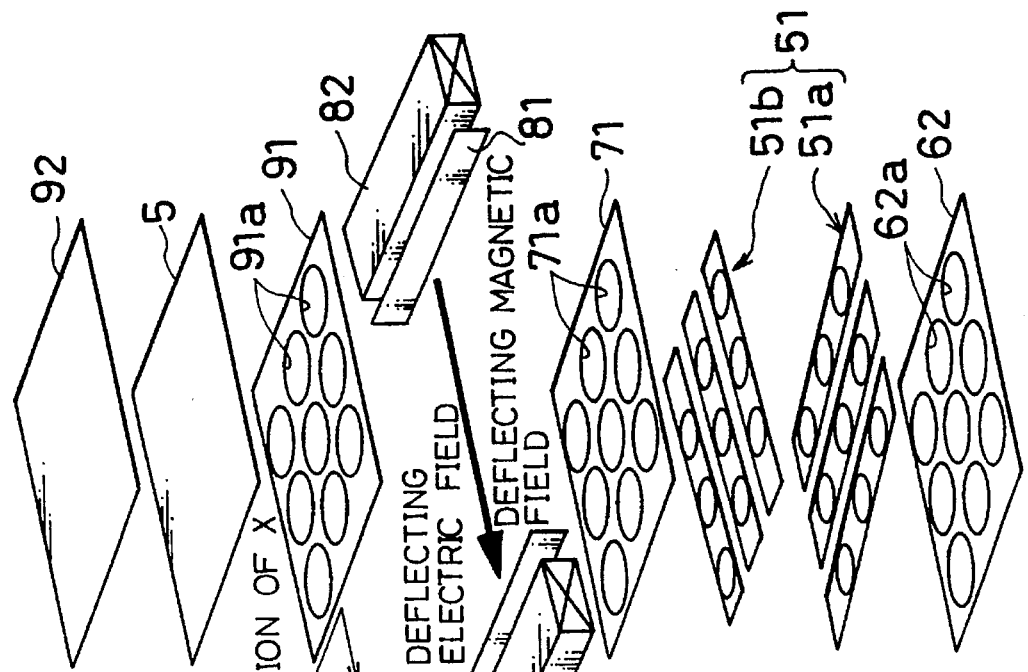
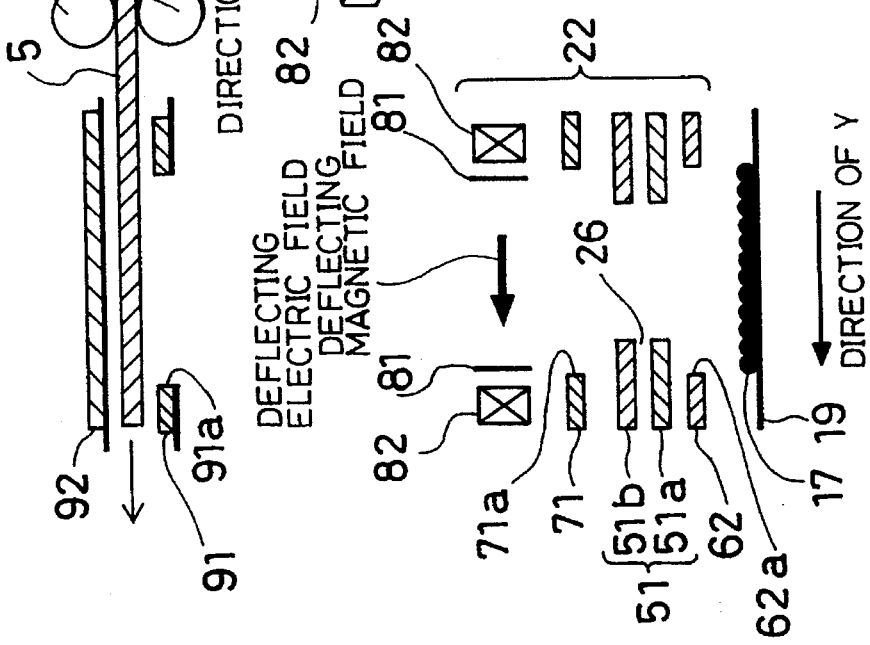

FIG.74(a)
```
X4  o  o  o  ●  o  o  o    ⤹207
X3  o  o  o  o  ●  o  o  o
X2  o  o  ●  o  ●  ●  o  o
X1  o  o  ●  ●  ●  ●  o  o⟵207a
```
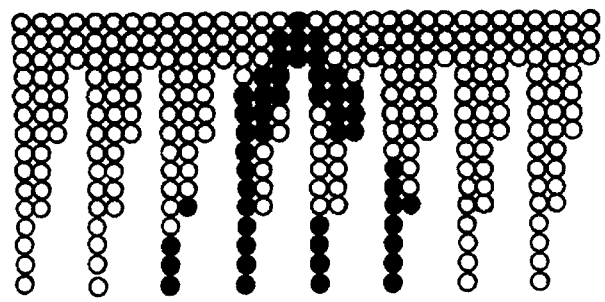
FIG.74(b)
FIG.75(a)
```
X4  o  o  o  ●  o  o  o    ⤹207
X3  o  o  o  o  ●  o  o  o
X2  o  o  ●  ●  ●  ●  o  o
X1  o  o  ●  o  o  o  o  o⟵207a
```
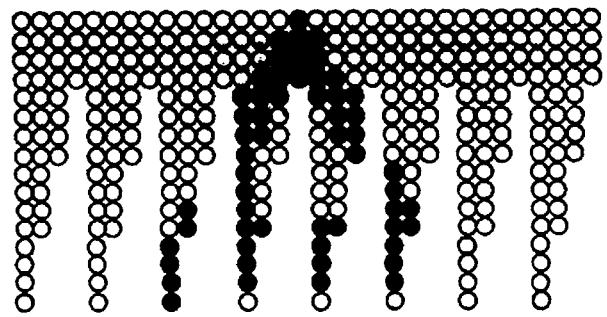
FIG.75(b)

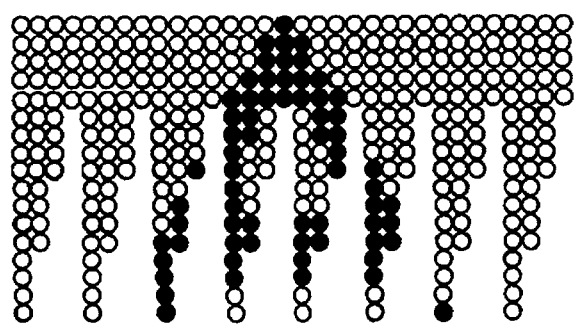
FIG.76(a)
FIG.76(b)
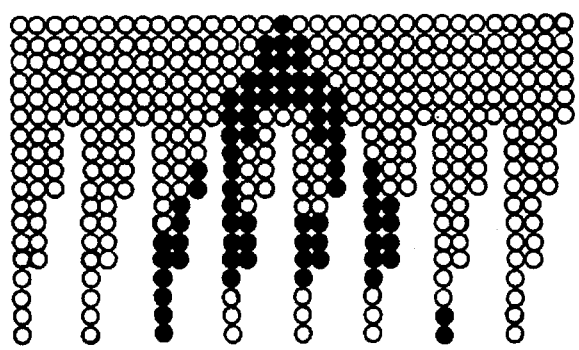
FIG.77(a)
FIG.77(b)

FIG.78(a)
X4 ○ ○ ● ○ ● ○ ○ ○ ← 207
X3 ○ ○ ● ○ ● ○ ○ ○
X2 ○ ○ ● ● ● ● ○ ○
X1 ○ ○ ● ○ ○ ○ ● ○ ← 207a
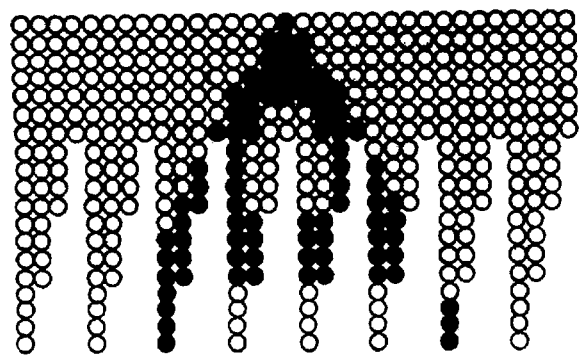
FIG.78(b)
FIG.79(a)
X4 ○ ○ ● ○ ○ ○ ○ ○ ← 207
X3 ○ ○ ● ● ● ○ ○ ○
X2 ○ ○ ○ ○ ○ ○ ○ ○
X1 ○ ● ● ○ ○ ● ● ○ ← 207a
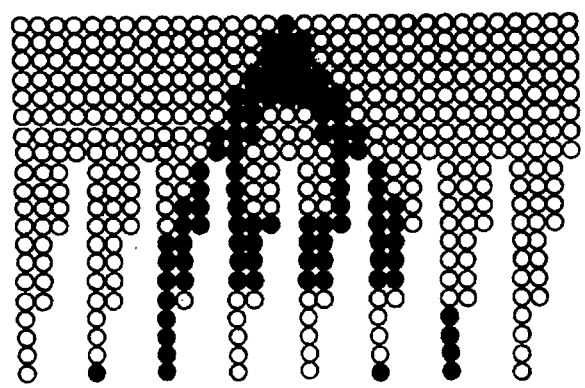
FIG.79(b)

FIG. 82(a)
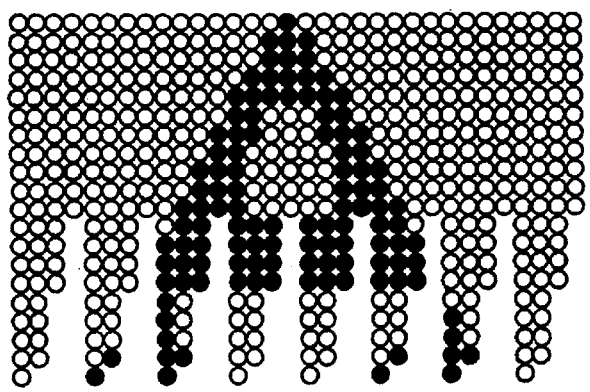
FIG. 82(b)
FIG. 83(a)
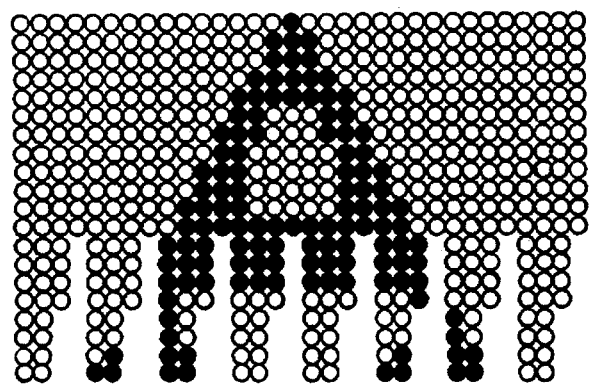
FIG. 83(b)

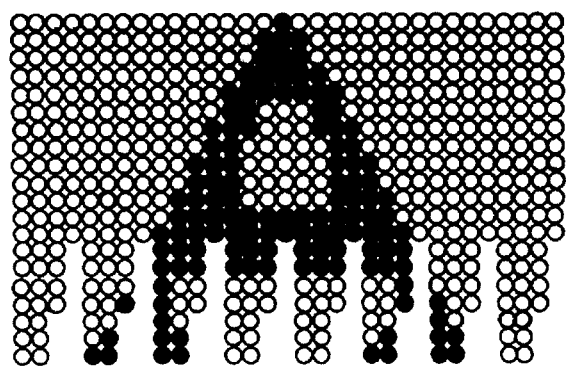
FIG.84(a)
FIG.84(b)
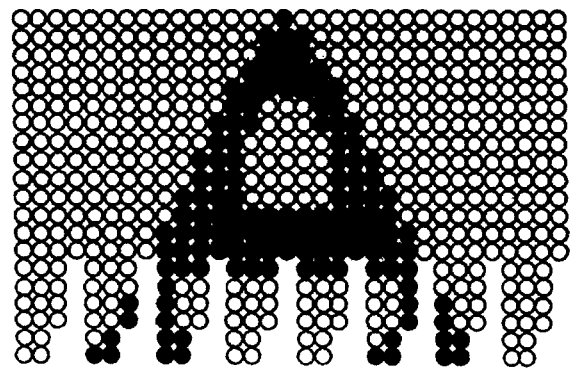
FIG.85(a)
FIG.85(b)

FIG.86(a)
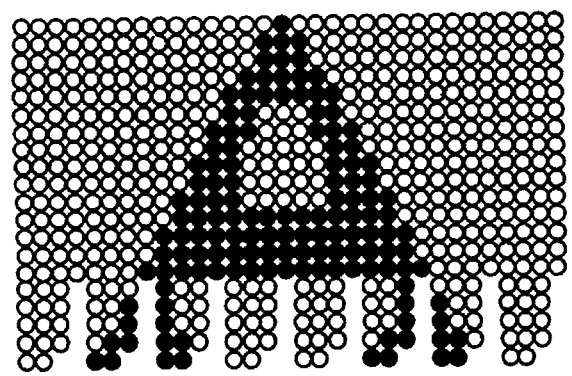
FIG.86(b)
FIG.87(a)
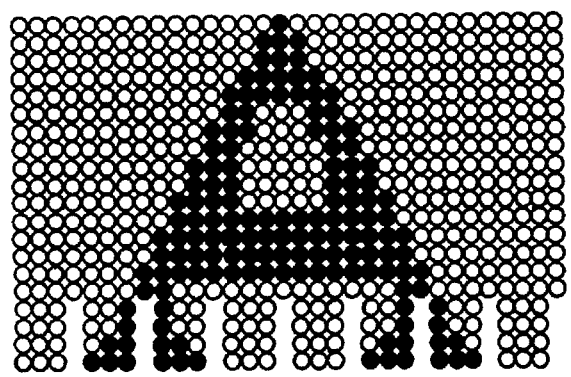
FIG.87(b)

FIG.88(a)
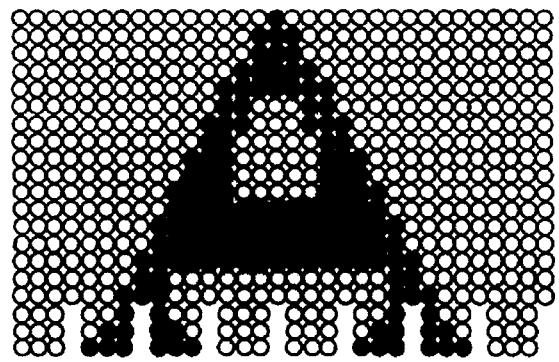
FIG.88(b)
FIG.89(a)
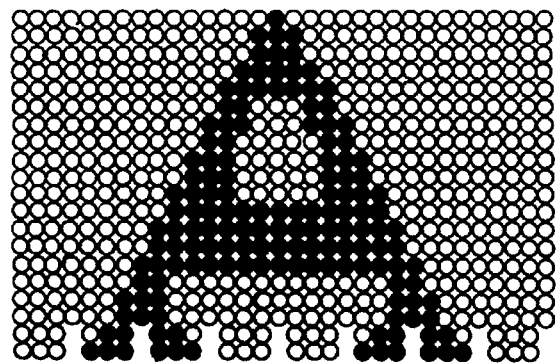
FIG.89(b)

FIG. 90(a)
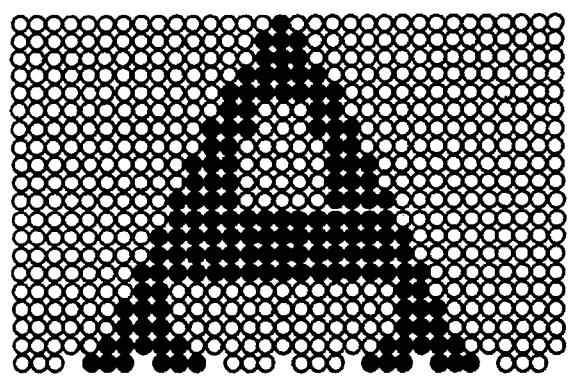
FIG. 90(b)
FIG. 91(a)
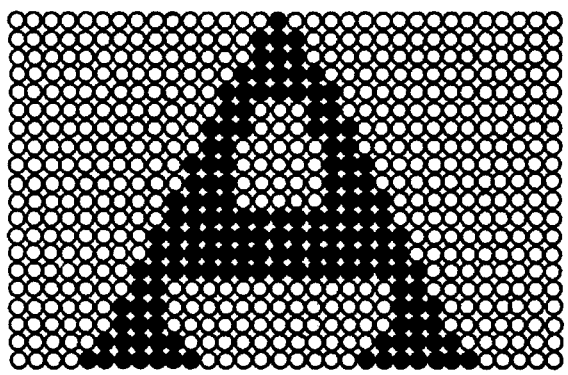
FIG. 91(b)

ELECTROSTATIC IMAGE FORMER WITH IMPROVED TONER CONTROL GRID

FIELD OF THE INVENTION

This invention relates to an image forming apparatus, which is applied to a printing section of a digital copying machine and a facsimile machine, and a digital printer, for directly forming an image on a recording medium by allowing developing particles to fly and adhere to the recording medium as well as by controlling flying of the developing particles according to an image signal.

BACKGROUND OF THE INVENTION

There has existed an image forming apparatus for outputting an image signal as a visible image to a recording medium such as paper, which adopts a method generally called electrophotography. This apparatus forms an electrostatic latent pattern by optical writing means on a photoreceptor having photoconductivity, and the electrostatic latent pattern is developed by allowing toner which is developing particles to adhere. Thereafter the apparatus transfers the developed image to a recording medium such as sheets so as to form an image signal as a visible image on the recording medium. Concretely, the image signal is converted into an optical signal by a light generator such as a laser, a LED (Light Emitting Diode), and the light is emitted to a photoreceptor which has been charged uniformly so that an electrostatic latent pattern is formed according to light intensity on the surface of the photoreceptor. Next, charged toner is allowed to contact or fly to the electrostatic latent pattern so as to develop it, and the toner image is formed on the surface of the photoreceptor. Successively, after the toner image is transferred to a recording medium such as a sheet by electrostatic attractive force, pressure, or both of them, the toner image is fixed on the recording medium by pressure, heat or both of them.

In addition, as another image forming apparatus, there exists an apparatus which forms a charge pattern according to an image signal on a dielectric drum and obtains a visible image on a recording medium by developing the charge pattern. The above image forming apparatus includes a charged particle flow generator, a charged particle flow control grid and a dielectric drum as a developing substance. Charged particle flow generated from the charged particle flow generator is controlled by controlling a voltage which is applied to the charged particle flow control grid according to an image signal. Then, a charge pattern is formed on the dielectric drum by the charged particles according to the image signal, and the charge pattern is developed by toner so that the toner image is formed on the dielectric drum. Thereafter, the toner image is transferred and fixed in the same manner as in the above-mentioned image forming apparatus.

However, in such an image forming apparatus, after an image signal as an electrostatic latent image is temporarily formed on a developing substance such as a photoreceptor or a dielectric, a toner image is obtained by developing the electrostatic latent image by using toner. Therefore, in the image forming apparatus, a developing substance having a special structure for forming an electrostatic latent image as well as writing means for the electrostatic latent image and charge eliminating means for erasing residual electric charge on the developing substance are required. Furthermore, a constitution that the toner image formed on the photoreceptor is transferred to a recording medium is complex. For this reason, the apparatus is complex and there arises a problem that miniaturization of the apparatus is limited.

Meanwhile, in an image forming apparatus adopting an electrophotographic method, a photoreceptor for forming an electrostatic latent image is required, so there causes a problem of enlargement of the apparatus. Therefore, PCT Unexamined Patent Publication No. 1-503221/1989 (Tokuhyohei 1-503221) discloses a method and an apparatus which open and shut a passage (hereinafter, referred to as gate) where pigment particles pass by means of an electric field in an electrode matrix so as to form an image by the pigment particles on a recording medium. As shown in FIG. 92, in this image forming apparatus, a pair of electrode layers 304 and 305, which are composed of a plurality of wires arranged parallel at uniform intervals, are arranged between a conveyor roller 301 and a sheet 303 so as to form the gate. The electrode layers 304 and 305 are vertically matched with the wires being at right angles to one another. Moreover, a plate electrode 306 is positioned below the sheet 303. The conveyor roller 301 magnetically attracts magnetic pigment particles 302 on its circumference, and an electrostatic field is selectively formed between the conveyor roller 301 and the plate electrode 306 by changing an applied voltage of the wires which constitute the electrode layers 304 and 305. The magnetic pigment particles 302 are carried by the electrostatic field from the conveyor roller 301 through the electrode layers 304 and 305 to the plate electrode 306. The pigment particles 302 are adsorbed on the sheet 303 so that an image is formed thereon.

In addition, as to the arrangement of an electrode section where pigment particles selectively pass in the image forming apparatus, in Japanese Unexamined Patent Publication No. 4-211970/1992 (Tokukaihei 4-211970), as shown in FIG. 93, a gate 413 is surrounded circularly by electrodes 405 so that each electrode 405 which composes the specific gate 413 does not make contact with another electrode 405. With this arrangement of the electrode section, the electrodes 405 do not cross-link, only the gate 413 where pigment particles should pass is opened in connection with matching with image information, thereby making it possible to form an accurate image.

However, in the apparatus disclosed in the above publication, an arrangement that flying of toner from a toner holder to a plate electrode is well controlled and that a high-quality image is obtained has not been sufficiently considered. Therefore, there arises a problem that a good-quality image according to an image signal cannot be obtained.

In addition, as to conventional image forming apparatuses, it is necessary to prepare a keying signal for opening and shutting a gate according to an image signal inputted from an external apparatus, but there does not exist an apparatus with a low-priced and high speed arrangement for converting the image signal to keying data. For this reason, in the case where the conversion process of an image signal is executed by an analog circuit, there arises enlargement of a circuit, and in the case where the conversion process is executed by a digital circuit, burden to the CPU process increases and the process time becomes long.

SUMMARY OF THE INVENTION

It is an object of the present invention to provide an image forming apparatus which is capable of satisfactorily controlling flying of toner from a toner holder to a plate electrode so as to obtain an image of good quality according to an image signal.

It is another object of the present invention to provide an image forming apparatus which is capable of quickening a process for converting an image signal into keying data so as to prevent enlargement of a hardware and increase in time for processes.

In order to achieve the above objects, a first image forming apparatus of the present invention, is characterized by including:

a developing particle holder for holding developing particles by means of either of force or electric force and magnetic force;

a counter electrode positioned opposite to the developing particle holder;

a control grid provided between the developing particle holder and the counter electrode such that a plurality of gates as a passing section of developing particles are provided and that a distance between the control grid and the developing particle holder is shorter than a pitch of the gates;

a power source section for applying a potential which generates a prescribed potential difference between the developing particle holder and the counter electrode and for applying a potential to the control grid; and grid potential control means for changing an electric field existing between the developing particle holder and the counter electrode by changing the potential supplied from the power source section to the control grid according to image signals in order to form an image by controlling flying of developing particles from the developing particle holder through the gate towards counter electrode and by adhering the developing particles to a recording medium in a direction to which the developing particles fly.

With the above arrangement, the electric field across the developing particle holder and the counter electrode is changed by applying a potential to the control grid according to an image signal so that the flying of toner from the developing particle holder thorough the gates of the control grid towards the counter electrode is controlled. In this case, since the control grid is set so that a distance between the control grid and the developing particle holder is shorter than the pitch of the gates, the electric field of the adjoining gate does not affect a surface of the developing particle holder, and the flying of developing particles can be independently controlled by each gate, thereby making it possible to obtain an image of good quality. Moreover, the distance between the developing particle holder and the control grid is shortened by the above position setting of the control grid, and in order to control the flying of the developing particles, a potential applied to the control grid can be set to a value which is close to a potential of the developing particle holder, namely a low value. This makes it possible to lower an output voltage of the power source section which supply a potential to the control grid. Therefore, withstand voltage of component parts in the power source section and a voltage applying section can be lowered, and lowering of costs, improvement in safety and lowering of failure late can be realized.

In other words, in order to independently control the gates which are spread two-dimensionally, it is necessary to prevent the electric field of the adjoining gates from affecting the surface of the developing particle holder. In order to achieve the above, it is necessary to shorten the distance between the control grid and the developing particle holder as close as possible. Moreover, as to the potential to be applied to the control grid, a potential, which originally exists in the position of the control grid before the potential is applied to the control grid, is used as reference, so it is necessary to raise the potential to be applied to the control grid in proportion to the distance between the control grid and the developing particle holder. Therefore, the potential supplied to the control grid for controlling the flying of the developing particles can become a value which is close to the potential of the developing particle holder, namely a low value by shortening the distance between the developing particle holder and the control grid.

Meanwhile, from a viewpoint of electromagnetism, in a system having a boundary where a potential is periodically changed at a certain pitch, a periodic change in the potential on the boundary can be ignored when being away for not less than the pitch from the boundary. Therefore, it can be considered that an affected range of the boundary where the potential periodically changes is about a pitch of the periodic change in the potential. Therefore, in order to independently control the gates which are extended two-dimensionally, the distance between the control grid and the developing particle holder may be set so as to be smaller than the pitch of the gates.

In addition, a second image forming apparatus of the present invention, is characterized by including:

a developing particle holder for holding developing particles by means of either of force or electric force and magnetic force;

a counter electrode positioned opposite to the developing particle holder;

a control grid including (1) a first electrode layer on a closer side to the developing particle holder, on which a plurality of control electrodes are arranged in one direction, (2) a second electrode layer on a far side from the developing particle holder, on which a plurality of control electrodes are arranged parallel to the control electrodes of the first electrode layer and in an opposite direction to that of the first electrode layer, and (3) an opening for composing gates as passing sections of developing particles, which is formed in a position where the control electrode on the first electrode layer are overlapped on the control electrode on the second electrode layer, the control grid being provided between the developing particle holder and the counter electrode;

a power source section for (1) applying a potential which generates a prescribed potential difference between the developing particle holder and the counter electrode, and for (2) applying a potential to each electrode on the first and second electrode layers of the control grid; and grid potential control means for changing an electric field existing between the developing particle holder and the counter electrode by changing the potential supplied from the power source section to the each control electrode of the control grid according to image signals in order to form an image by controlling flying of developing particles from the developing particle holder through the gate towards the counter electrode and by adhering the developing particles to a recording medium in a direction where the developing particles fly.

With the above arrangement, prescribed gates which is composed of the openings of the both electrodes can be controlled by applying a potential to a prescribed control electrode on the first electrode layer and a prescribed control electrode on the second electrode layer according to an image signal. In other words, the flying of developing particles from the developing particle holder through the prescribed gate towards the counter electrode can be controlled. Therefore, a number of control electrodes is decreased, thereby making it possible to simplify a constitution of the grid potential control means which controls a potential supplied to the control grid.

In addition to the arrangement of the first or second image forming apparatus, a third image forming apparatus of the present invention, is characterized by including:

a developing particle antisticking grid having a developing particle passing hole in the opposite position to the gates of the control grid, the developing particle antisticking grid being provided between the control grid and the developing particle holder, wherein a potential having same polarity as that of charged developing particles is supplied from the power source section to the developing particle antisticking grid.

With the above arrangement, the developing particles antisticking grid to which the potential having the same polarity as that of charged developing particles prevents the developing particles from flying to a section other than the gates on the control grid. This prevents the charged developing particles from adhering to the control grid, thereby preventing instability of the potential of the control grid. As a result, the control grid can stably control the flying of the developing particles, thereby making it possible to obtain an image of good quality.

In addition to the arrangement of the third image forming apparatus, a fourth image forming apparatus of the present invention, is characterized by that the developing particle passing hole is formed so that it has a larger diameter than that of the gates of the control grid.

With the above arrangement, since the developing particle passing hole on the developing particle antisticking grid is formed so as to have a larger diameter than that of the gates on the control grid, a solid angle difference between the control grid and the developing particle antisticking grid viewed from the developing particle holder can be increased. This makes it possible to apply an electric field with satisfactory distribution from the gate to the surface of the developing particle holder, and while adhesion of the developing particles to the control grid is being prevented, the flying of the developing particles can be satisfactorily controlled.

In addition to the arrangement in one of the first through fourth image forming apparatus, a fifth image forming apparatus of the present invention, is characterized by including:

a developing particle flying stabilization grid having a developing particle passing hole, the developing particle flying stabilization grid being provided between the control grid and the counter electrode, wherein a potential, which generates an electric field for promoting the flying of developing particles from the control grid towards the counter electrode, is applied from the power source section to the developing particle flying stabilization grid.

With the above arrangement, if the potential of the control grid changes in order to control the next flying of developing particles before the developing particles, which passed through the control grid, reach the counter electrode, an electric field on a flying area of the developing particles through the control grid towards the counter electrode is to be changed by the change in the potential. However, the change in the electric field is cancelled by an electric field for promoting the flying of the developing particles, which is generated by applying a potential to the developing particle flying stabilization grid. This stabilizes the flying of the developing particles which passed through the control grid, so the developing particles reach the recording medium to be carried at a constant flying speed, thereby making it possible to improve printing quality.

In addition to the arrangement of the fifth image forming apparatus, a sixth image forming apparatus of the present invention, is characterized by including flying direction deflecting means for deflecting a flying direction of the developing particles from the developing particle flying stabilization grid towards the counter electrode to a direction which is at right angles to the flying direction by at least one of the electric field and magnetic field, the flying direction deflecting means being positioned between the developing particle flying stabilization grid and the counter electrode.

With the above arrangement, the flying of developing particles towards the counter electrode after passing through the control grid is stabilized by an electric field generated in the developing particle flying stabilization grid. The direction of the stabilized flying of the developing particles can be appropriately deflected to the direction which is at right angles to the flying direction by the flying direction deflecting means. Therefore, it is possible to form an dot by developing particles at a finer pitch than the gates. This makes it possible to improve resolution, so an image of good quality can be obtained.

In addition, a seventh image forming apparatus of the present invention, is characterized by including:

a developing particle holder for holding developing particles by means of either of electric force and magnetic force;

a counter electrode positioned opposite to the developing particle holder, the counter electrode having a developing particle passing hole for allowing developing particles which flew from the developing particle holder to pass;

a control grid having a plurality of gates as a passing section of the developing particles, the control grid being provided between the developing particle holder and the counter electrode;

a power source section for applying a potential which generates a prescribed potential difference between the developing particle holder and the counter electrode and for applying a potential to the control grid; and grid potential control means for changing an electric field existing between the developing particle holder and the counter electrode by changing the potential supplied from the power source section to the control grid according image signals in order to form an image by controlling flying of developing particles from the developing particle holder through the gate towards the counter electrode and by adhering the developing particles to a recording medium in an opposite side to the developing particle holder side of the counter electrode.

With the above arrangement, the developing particles, which have flown from the developing particle holder through the control grid, further fly through the counter electrode and adhere to a recording medium on the opposite side in the counter electrode to the developing particle holder side so that an image is formed. As mentioned above, in the case where the recording medium is positioned on the opposite side of the counter electrode to the developing particle holder side, the electric field across the developing particle holder and the counter electrode is not influenced by electromagnetic properties of the recording medium. Therefore, the flying of developing particles can be controlled stably and satisfactorily. Moreover, since the flying of developing particles between the developing particle holder and the counter electrode is not influenced by electromagnetic properties of the recording medium, as the recording medium, a wide range of materials, such as the back of an envelope whose surface is rough and uneven, metal foil whose volume resistivity is low, and high-humidity paper, etc. can be used.

In addition to the arrangement of the seventh image forming apparatus, an eighth image forming apparatus of the present invention, is characterized by including:

a developing particle flying stabilization electrode positioned on an opposite side to the counter electrode side with respect to the recording medium, wherein a potential, which generates an electric field having a same direction as that of an electric field existing between the control grid and the counter electrode when the developing particles fly towards the counter electrode through the control grid, is applied from the power source section to the developing particle flying stabilization electrode.

With the above arrangement, the developing particles, which flew from the developing particle holder through the control grid, further fly through the counter electrode and adhere to the recording medium positioned on the opposite side of the counter electrode to the developing particle holder side so that an image is formed. At this time, an electric field, which has the same direction as that of the electric field existing across the control grid and the counter electrode when the developing particles fly through the control grid towards the counter electrode, is supplied from the developing particle flying stabilization electrode. Therefore, the developing particles which have passed through the counter electrode fly stably towards the recording medium. This makes it possible to obtain an image of good quality.

In addition to the arrangement in one of the first through eighth image forming apparatuses, a ninth image forming apparatus of the present invention, is characterized by including recording medium potential supplying means for supplying a potential, which generates an electric field having a same direction as that of the electric field across the control grid and the counter electrode when the developing particles fly through the control grid towards the counter electrode, to an opposite side of the recording medium to the developing particle holder side.

With the above arrangement, a potential, which generates an electric field having a same direction as that of the electric field across the control grid and the counter electrode when the developing particles fly through the control grid towards the counter electrode, is supplied to an opposite side of the recording medium to the developing particle holder side. Therefore, even in the case where the recording medium is placed apart from the counter electrode, an image formed on the recording medium by adhering the developing particles thereto is surely held on the recording medium. This prevents a problem that quality of an image is deteriorated due to a fall of the developing particles from the recording medium until the subsequent process, for example, until a process for fixing the developing particles on the recording medium.

In addition to the arrangement in one of the first through ninth image forming apparatuses, a tenth image forming apparatus of the present invention, is characterized by that the counter electrode and the control grid between the counter electrode and the developing particle holder are integrated in one unit, and the electrode group can be installed to and removed from an image forming apparatus main body as one unit.

With the above arrangement, since the counter electrode and the control grid which is between the counter electrode and the developing particle holder are integrated as one unit and the electrode group can be installed to and removed from an image forming apparatus main body, even when the electrode group is installed to and removed from an image forming apparatus main body, a relation of position between the electrodes and a relation of position between the electrodes and the counter electrode do not change. Therefore, distribution of a potential and an electric field do not change between the electrode groups, and between the electrode group and the counter electrode. As a result, even in the case where the electrode group is installed to and removed from an image forming apparatus main body because of maintenance, for example, an excellent image forming function can be maintained.

In addition, an eleventh image forming apparatus of the present invention, is characterized by including:

a plurality of gates being selectively opened and closed for allowing developing particles, which forms an image on a recording medium, to pass, the gates being arranged in a matrix-fashion;

storing means being divided plurally;

image data writing means for successively writing image data inputted from an outer apparatus per line into a plurality of storing means;

image data reading means for reading out the image data from the storing means other than that where the image data have been written by the image data writing means; and signal converting means for creating switching data of the gates from the image data read out by the image data reading means.

With the above arrangement, image data inputted from an outer apparatus are successively written per line to the storing means respectively. At the same time, image data which have been already written to another storing means are read out, and keying data of the gates are created based upon the read image data. Therefore, the process for storing the image data inputted from the outer apparatus per line and the process for reading out the stored image data are simultaneously executed. For this reason, compared to the case where after image data for all picture elements are temporarily stored, the image data are successively read out so as to be converted into keying data of the gates, time required for a signal converting process from the input of the image data to the creation of the keying data of the gates is shortened.

In addition to the arrangement of the eleventh image forming apparatus, a twelfth image forming apparatus of the present invention, is characterized by that the storing means includes:

an odd memory for storing the image data on odd lines; and an even memory for storing the image data on even lines.

With the above arrangement, the storing means is composed of the odd memory for storing the image data on odd lines and the even memory for storing the image data on even lines. Therefore, the image data on odd lines or on the even lines are stored into the odd memory or the even memory, and at the same time the image data on the even lines or on the odd lines can be read out from the even memory or the odd memory. For this reason, time required to write and read out the image data can be shorten.

In addition to the the arrangement of twelfth image forming apparatus, a thirteenth image forming apparatus of the present invention, is characterized by that the gates include a matrix where an interval for an odd picture element is provided uniformly between lines.

With the above arrangement, the gates are arranged so that an uniform interval for an odd picture element is provided between each line. Therefore, each line of the gates correspond to alternately either of the odd lines and the even lines of the image data. In other words, in the case where the image data on odd lines are set for the gates on one line, the image data on odd lines are set also for the gates on another lines, and similarly, in the case where the image data on even lines are set for the gates on one line, the image data on even lines are set also for the gates on another lines. In other words, it is unnecessary to simultaneously set the image data on even lines and on the odd lines.

For this reason, in one process for reading out the image data, it is unnecessary to read out the image data from both of the odd memory and the even memory, so either of the image data on odd lines and on even lines are read out alternately from the odd memory or even memory. This makes it possible to write and read out the image data by repeated use of the odd memory and the even memory, so even in the case where the gate on an arbitrary number of lines are formed in a matrix fashion, the signal converting process can be performed at high speeds.

BRIEF DESCRIPTION OF THE DRAWINGS

FIG. 11(b) is an explanatory drawing of a potential supplied to each section for a toner flying control which is different from that in FIG. 10(b) in the image forming section shown in FIG. 11(a), and FIG. 11(c) is an explanatory drawing of intensity of an electric field by a potential shown in FIG. 10(b).

FIG. 21(a) is an explanatory drawing which shows an arrangement that the toner antisticking grid is provided correspondingly to the control grid shown in FIG. 14; and FIG. 21(b) is a perspective view which shows a configuration of the toner antisticking grid.

FIG. 26(a) is an explanatory drawing which shows an arrangement that the toner antisticking grid is provided correspondingly to the control grid shown in FIG. 16, and FIG. 26(b) is a perspective view which shows a configuration of the toner antisticking grid.

FIG. 28(a) is an explanatory drawing which shows a solid angle difference between the control grid and the toner antisticking grid viewed from the toner holder side in the image forming section including the toner antisticking grid shown in FIG. 18, and FIG. 28(b) is an explanatory drawing which shows the solid angle difference in the image forming section including the toner antisticking grid shown in FIG. 23.

FIG. 29 is an explanatory drawing which shows an arrangement of an image forming section which is included in a digital copying machine of still another embodiment of present invention.

FIG. 30(a) is an explanatory drawing which shows an arrangement that the toner flying stabilization grid shown in FIG. 29 is provided correspondingly to the control grid shown in FIG. 7, and FIG. 30(b) is a perspective view which shows a configuration of the toner flying stabilization grid.

FIG. 35(a) is an explanatory drawing which shows an arrangement of an image forming section in a digital copying machine of still another embodiment of the present invention, and FIG. 35(b) is a perspective view which shows the arrangement shown in FIG. 35(a).

FIG. 36 is an explanatory drawing which shows an arrangement of an image forming section in a digital copying machine of still another embodiment of the present invention.

FIG. 40(a) is an explanatory drawing which shows another example of the image forming section, and FIG. 40(b) is a perspective view which shows a constructional example of each section shown in FIG. 40(a).

FIGS. 60 through 91 are explanatory drawings which show a switching state of the electrode and an image forming state in the image forming apparatus shown in FIG. 52.

DESCRIPTION OF THE EMBODIMENTS

[Embodiment 1]

The present embodiment will discuss the case where an arrangement of the image forming apparatus of the present invention is applied to a digital copying machine. Furthermore, the following will discuss an arrangement that negative charged toner is used, but in the case where positive charged toner is used, polarity of an applied voltage may be appropriately set according to this case.

Figure 3:
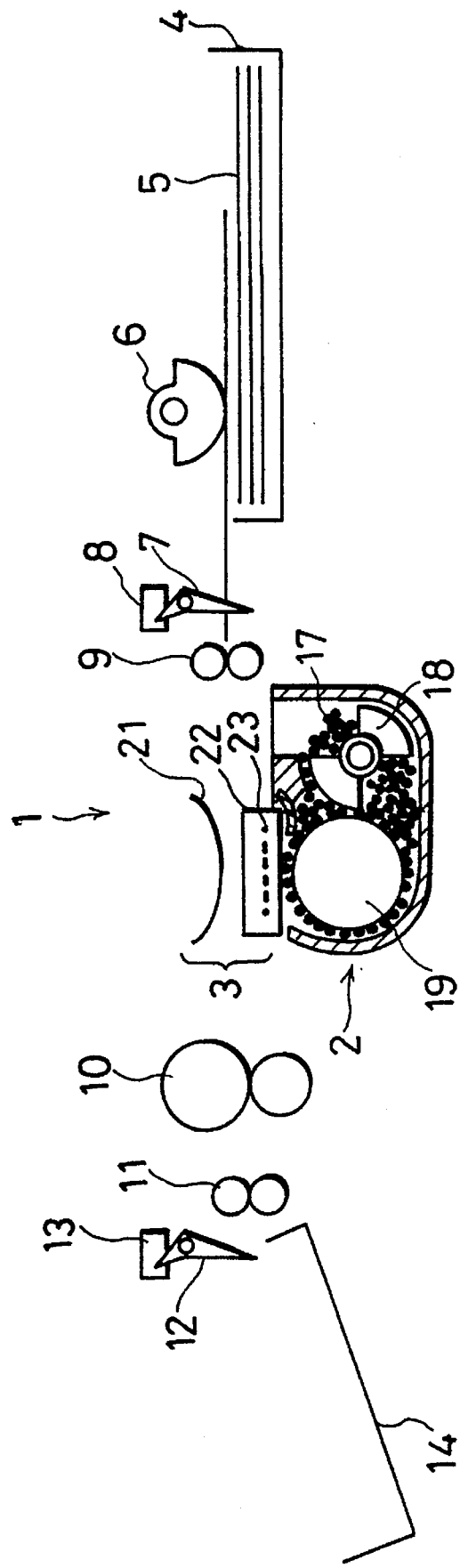
FIG. 3 is an explanatory drawing which roughly shows the whole arrangement of the digital copying machine.

As shown in FIG. 3, the digital copying machine of the present embodiment includes an image forming section 1 having a toner feeding section 2 and a print section 3. The image forming section 1 develops an image according to an image signal on a sheet as a recording medium by using toner which is developing particles.

On a sheet inserting side to the image forming section 1, a sheet cassette 4 for storing sheets 5 as a recording medium, a feeding roller 6 for feeding sheets from the sheet cassette 4, a sheet detecting member 7 which is moved by driving the fed sheets 5, a feeding sensor 8 for detecting that the sheets are fed by the move of the sheet detecting member 7, and a register roller 9, for feeding the sheets fed from the sheet cassette 4 to the image forming section 1 at predetermined intervals, are provided. Moreover, on a sheet discharge side from the image forming section 1, a fixing section 10 for fixing a toner image, which has been formed on a sheet by the image forming section 1, on the sheet by heating, pressuring or both of them, a discharge roller 11 for discharging the sheet processed in the fixing section 10 to a discharge tray 14, a sheet detecting member 12 which is moved by driving the sheet 5 to be discharged, a discharge sensor 13 for detecting that the sheet is discharged by the move of the sheet discharging member 12 and a discharge tray 14 which receives discharged sheets, are provided.

Figure 4:
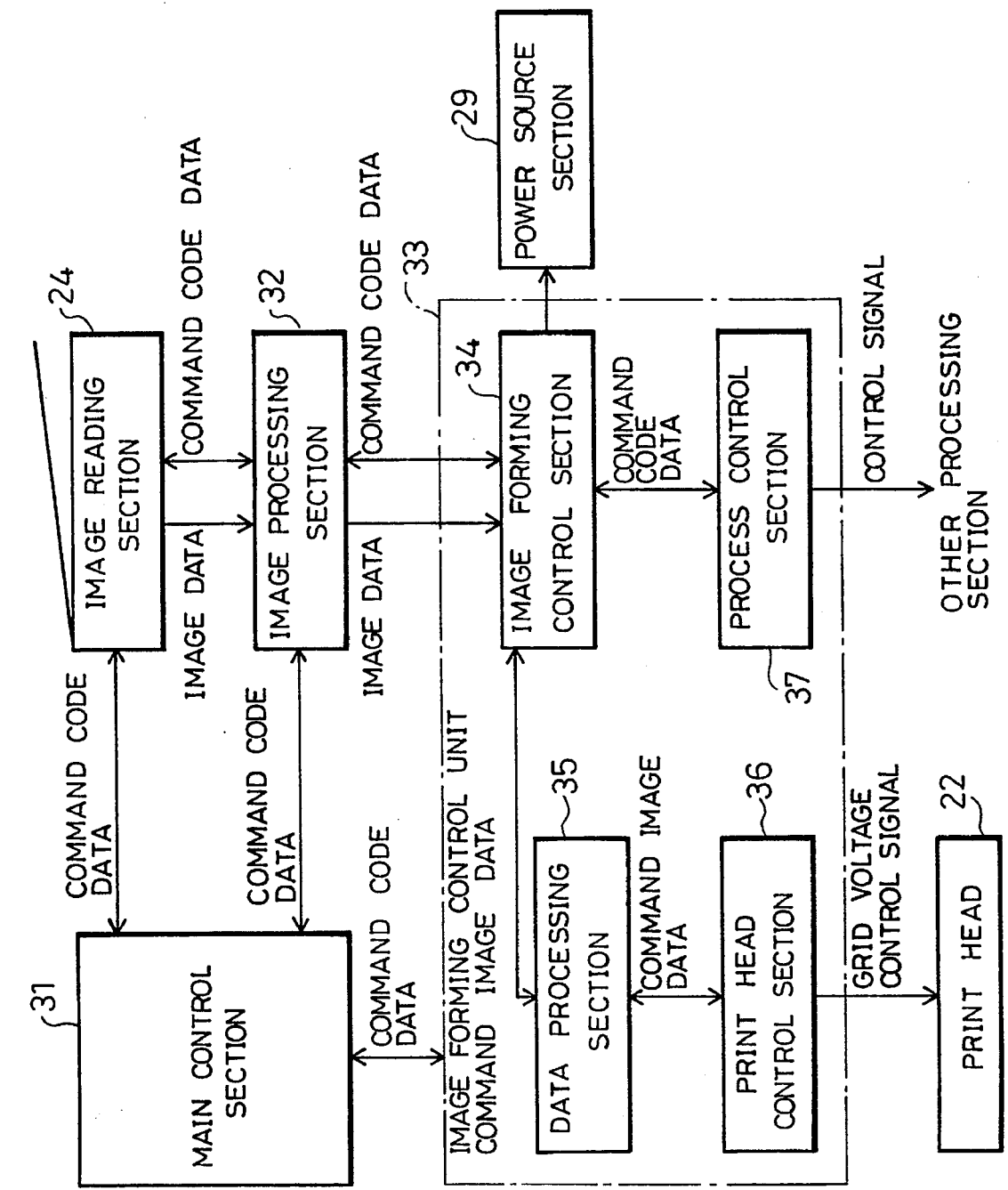
FIG. 4 is a block diagram which shows an arrangement of a control circuit which is included in the digital copying machine.

In addition, as shown in FIG. 4, the digital copying machine includes a main control section 31 for entirely controlling the digital copying machine, an image processing section 32 for converting image data obtained from an image reading section 24 into a pattern of image data to be printed, an image forming control unit 33 and a power source section 29 for applying a potential to each electrode section, etc. of the image forming section 1.

The image reading section 24, for example, scans a document placed on a translucent document platen by means of optical scanning means, and converts its reflected light into an image signal by means of a CCD (Charge Coupled Device) so that image data are obtained. The image processing section 32, for example, includes a semiconductor memory or an image memory which is composed of a magnetic recording medium such as a hard disk. After the image data obtained from the image reading section 24 are subject to the above process, the processed image data are stored in the image memory.

The image forming control unit 33 includes an image forming control section 34, a data processing section 35, a print head control section 36 which constitutes grid potential control means together with the image forming control section 34 and the data processing section 35, and a process control section 37. The image forming control section 34 converts the image data obtained from the image processing section 32 into image data which are given to the print head control section 36. To be concrete, the image control section 34 converts, for example, a character code shown by the image data into a dot list. Moreover, the image forming control section 34 applies a voltage outputted from the power source section 29 to each electrode section in the image forming section 1. The data processing section 35 decomposes the image data processed in, the image forming control section 34 according to a number of strings in a control grid 23, mentioned later. The print head control section 36 generates a grid control signal for controlling a potential of the control grid 23 according to the image data inputted from the data processing section 35, and supplies the grid control signal to a print head 22. The process control section 37 supplies a control signal according to each process to each section according to command given from the image forming control section 34.

Figure 5:
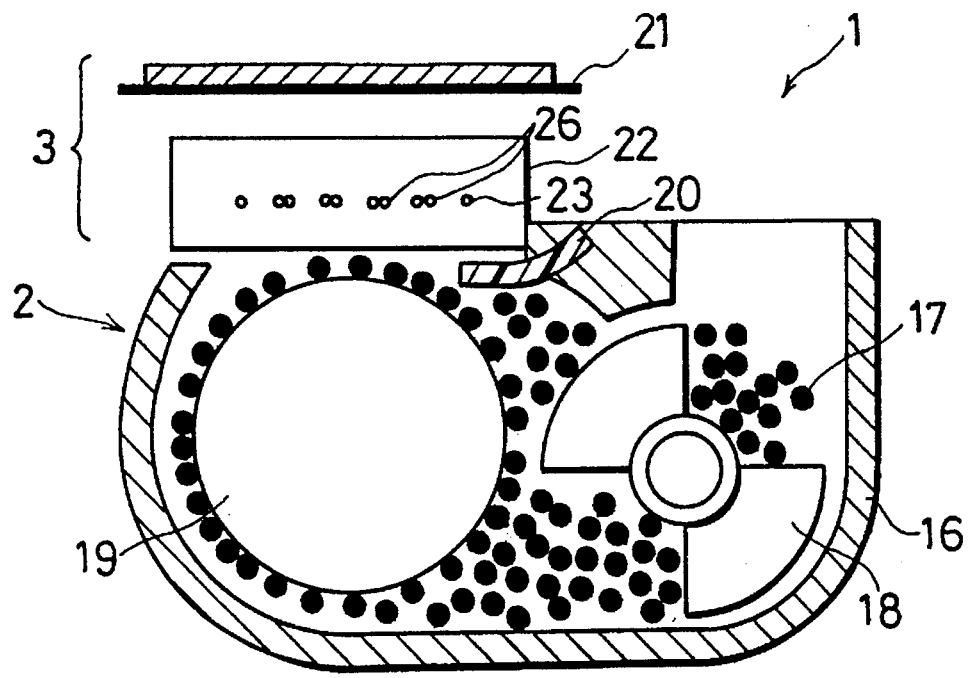
FIG. 5 is an enlargement which refers to the image forming section shown in FIG. 3.

As shown in FIG. 5, in the toner feeding section 2 of the image forming section 1, toner 17 as developing particles is stored in a toner store tank 16, and an agitating roller 18 for agitating the toner 17 so that the toner 17 is charged, and a toner holder 19 which is a cylindrical developing particle holder for holding the toner 17 with electric force, magnetic force or both of them are provided. A thickness of the toner layer held on the periphery of the toner holder 19 is restricted by a doctor blade 20 provided in the toner store tank 16.

The print section 3 includes a counter electrode 21 which is opposite to the periphery of the toner holder 19, and a printhead 22 which is provided between the counter electrode 21 and the toner holder 19. The counter electrode 21 is composed of, for example, a flat conductive plate which is provided parallel to the direction of a tangent of the toner holder 19, an arc-like conductive plate which is provided parallel to the toner holder 19 or a conductive cylinder. An electric field, which is stronger or weaker than a toner flying start electric field required for allowing the toner held by the toner holder 19 to fly towards the counter electrode 21, is given to the vicinity of the toner holder 19 by a voltage applied from the power source section 29 across the toner holder 19 and the counter electrode 21.

The print head 22 includes the control grid 23 and controls a voltage applied from the power source section 29 to the control grid 23 based upon the grid control signal supplied from the print head control section 36. The control grid 23 extends two-dimensionally so that it is parallel to and also opposite to the counter electrode 21 and is arranged so that the toner stream can pass from the toner holder 19 to the counter electrode 21. Then, the electric field supplied between the toner holder 19 and the counter electrode 21 is changed by the potential supplied to the control grid 23, and the flight of toner from the toner holder 19 to the counter electrode 21 is controlled.

Here, in the case where the electric field between the toner holder 19 and the counter electrode 21 is stronger than the toner flying start electric field, the potential which is supplied to the control grid 23 based upon the grid control signal prevent the toner from flying, but in the case where the electric field is weaker than the toner flying start electric field, the potential allows the toner to fly.

Figure 6:
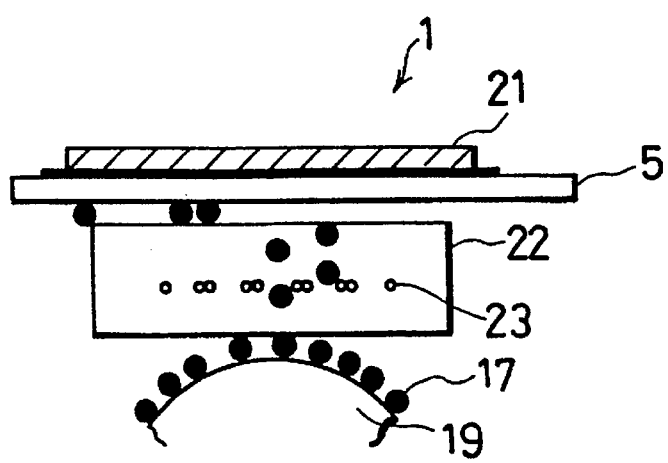
FIG. 6 is an explanatory drawing which shows an image forming operation in the image forming section.

In addition, an image is formed by the toner 17 in the image forming section 1 based upon the following principles. In general, in the case where charged particles are placed on air (vacuum) material boundary surface, electrostatic force causes attraction between the material boundary surface and the charged particles. This is well known from a point of electromagnetism. Therefore, the toner 17 is held on the surface of the toner holder 19 by the electrostatic force. In this state, when an electric field, which is stronger than electromagnetic attraction across the toner 17 and the toner holder 19, is applied to the surface of the toner holder 19, the toner 17 detaches from the toner holder 19 and is accelerated by the force of the electric field so that it moves in a specified direction. Therefore, an electric field, which is capable of allowing the toner 17 held on the toner holder 19 to fly to the counter electrode 21, is generated on the surface of the toner holder 19 by a relationship between the potential supplied to the control grid 23 and the potential across the toner holder 19 and the counter electrode 21. As shown in FIG. 6, the electric field allows the toner 17 to pass through the control grid 23 and to fly to the counter electrode 21. In this case, the potential supplied to the control grid 23 is controlled according to an image signal, and when the sheet 5 is placed on the counter surface of the counter electrode 21 to the toner holder 19, a toner image according to the image signal is formed on the surface of the sheet. Here, the electric field which allows the toner 17 to start flying is called a toner flying start electric field Eth, and a value of 1.0 M(v/m) was obtained by a certain experiment.

Figure 7:
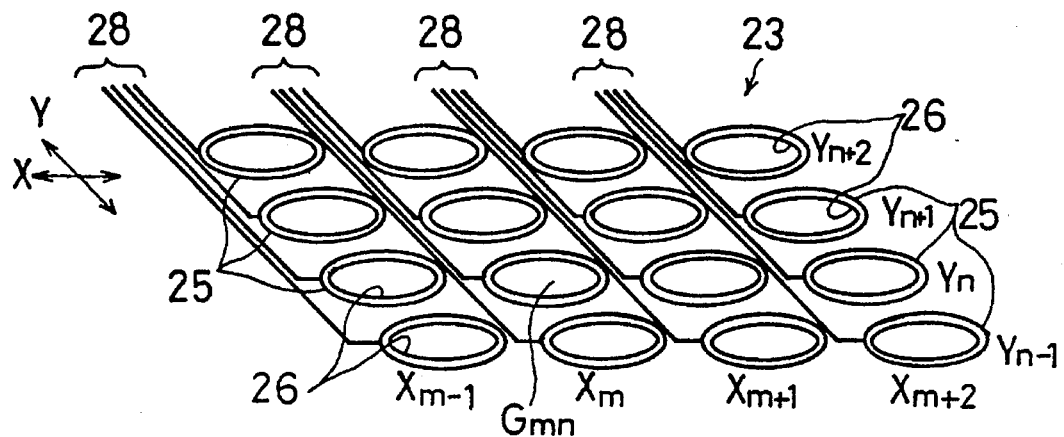
FIG. 7 is a perspective view which shows an arrangement of a control grid which is included in the image forming apparatus.
Figure 8:
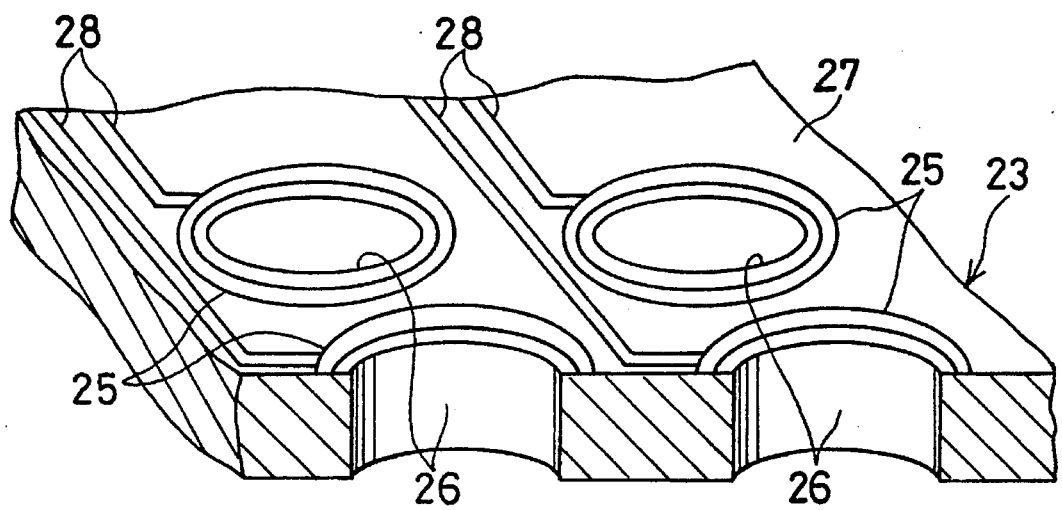
FIG. 8 is a perspective view which shows the concrete arrangement of the control grid.

As shown in FIG. 7, the control grid 23 is composed of independent ring-like conductors, i.e., a plurality of control electrodes 25 placed in a direction of X and a direction of Y which is at right angles to the direction of X. The inside of each control electrode 25 is a passage section of toner which flies from the toner holder 19 to the counter electrode 21, and hereinafter, it is referred to as a gate 26. The arrangement of the control grid 23 is shown in FIG. 8. Holes which are the gate 26 are provided on a insulating control electrode substrate 27, and the control electrodes 25 are provided in the circumference of the holes on one surface of the control electrode substrate 27 by an evaporation method, etc.

In the present embodiment, as shown in FIG. 7, the control electrodes 25 are placed such that they form four lines in the direction of X: Xm−1, Xm, Xm+1 and Xm+2, and they form four lines in the direction of Y: Yn−1, Yn, Yn+1 and Yn+2. In this case, The gate positioned in the line Xm and the Yn line is represented by Gmn. Here, if a transportation direction of the sheet 5 in the print section 3 is the direction of Y, at least not less than 2 lines of the gates 26 are provided in the direction of Y.

Figure 9:
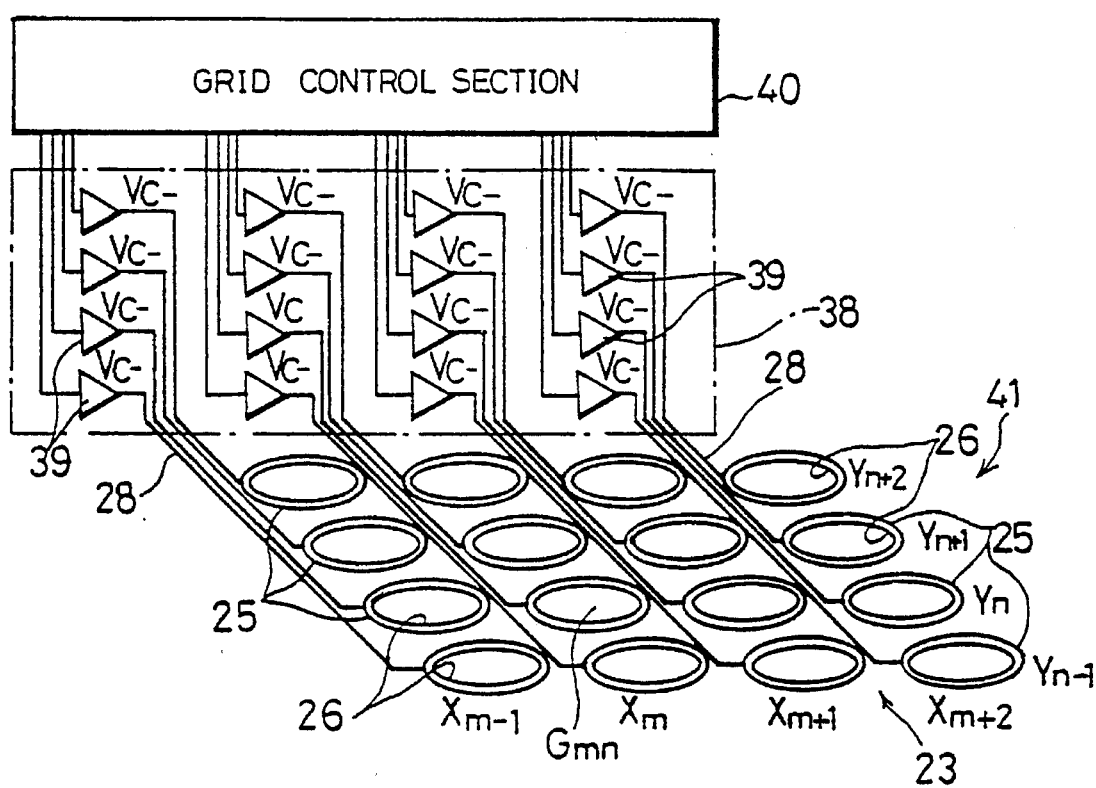
FIG. 9 is an explanatory drawing which shows an arrangement that a potential is supplied to the control grid.

As shown in FIG. 9, each control electrode 25 is connected to drivers 39 which are provided correspondingly to each control electrode 25 in a high voltage driver section 38 through feeders 28 connected to each control electrode 25. Each driver 39 is connected to a grid control section 40 for controlling each driver 39 according to a grid control signal which is supplied from the print head control section 36. The high voltage driver section 38 and the grid control section 40 are included in the print head 22. Here, in the state shown in FIG. 9, a toner flying potential Vc which makes it possible to fly the toner from the toner holder 19 to the counter electrode 21 is supplied from the driver 39 only to the gate Gmn, and a toner flying restricting potential Vc− which prevents the toner 17 to fly is supplied to the other gates.

Figure 1:
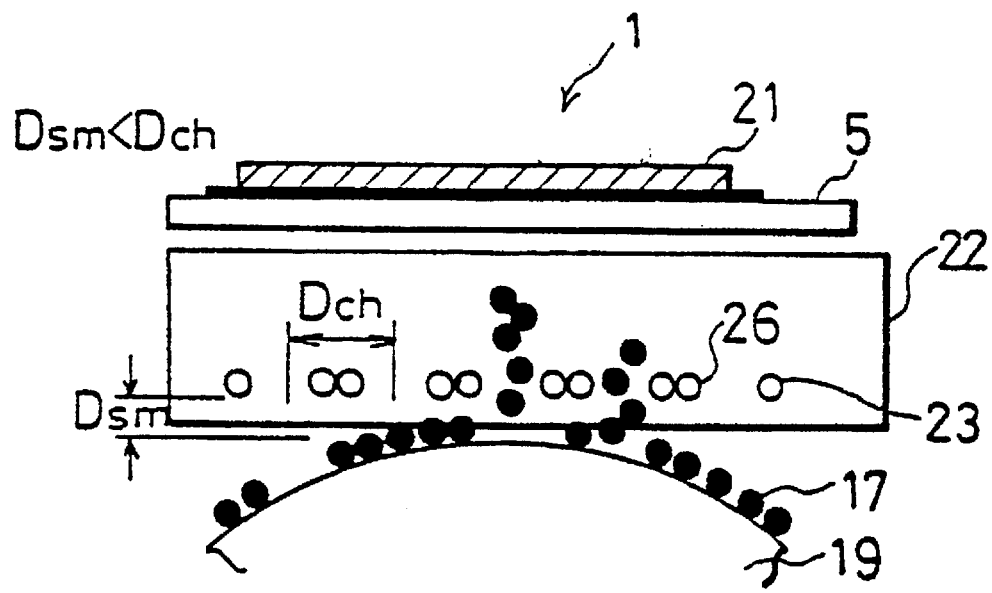
FIG. 1 is an explanatory drawing which shows a constitution of an image forming section in a digital copying machine of one embodiment of the present invention.

In addition, as shown in FIG. 1, if a distance from the toner holder 19 to the control grid 23 is Dsm and the pitch of the gate 26 is Dch, the control grid 23 is provided so that the following relationship is obtained:

$$Dsm < Dch.$$

This reason is as follows.

In order to independently control the gates 26 which are extended two-dimensionally, it is necessary that the electric fields of the adjoining gates 26 do not affect the surface of the toner holder 19. Therefore, it is necessary to shorten the distance between the control grid 23 and the toner holder 19 as close as possible. Furthermore, a potential, which has existed in the control grid 23 before a potential is supplied to the control grid 23, is used as reference, so it is necessary to rise a potential to be supplied to the control grid 23 in proportion to the distance between the control grid 23 and the toner holder 19. Therefore, the potential, which is supplied to the control grid 23 in order to allow the toner 17 to fly, can be brought close to a potential of the toner holder 19 by shortening the distance between the toner holder 19 and the control grid 23.

On the contrary, from the point of electromagnetism, generally, in a system having a boundary where a potential changes periodically at a certain pitch, in a place away from the boundary for not less than a pitch, periodic change in the electric field of the boundary can be ignored. Therefore, it is considered that an effective range of the boundary where a potential changes periodically is about a pitch of the periodic change in the potential. For this reason, in order to independently control the gates 26 which are extended two-dimensionally, the distance Dsm from the control grid 23 to the toner holder 19 may be set to a smaller value than the pitch Dch of the gate 26 so that the potential of the adjoining gate 26, namely, the electric field, does not affect the surface of the toner holder 19.

Figure 2:
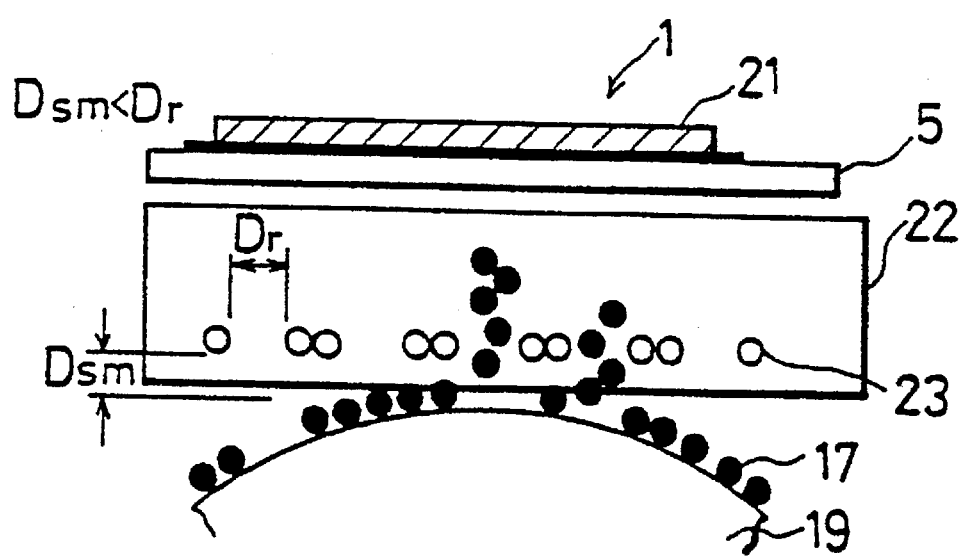
FIG. 2 is an explanatory drawing which shows another example of the image forming section.

Further, as shown in FIG. 2, if the distance from the toner holder 19 to the control grid 23 is Dsm and a diameter of the gate 26 is Dr, the control grid 23 is provided so that the following relationship is obtained:

$$Dsm < Dr.$$

Here, the diameter of the gate 26 is not a diameter of the hole which has been formed on the control electrode substrate 27 shown in FIG. 8, but a potential diameter of the gate 26, namely, an inner diameter of the control electrode 25. The change in the electric field of the gate 26 by supply of the potential to the control grid 23 surely affects the surface of the toner holder 19 by the above setting so that the flying of toner from the toner holder 19 to the counter electrode 21 is well controlled.

Next, the following will discuss an image forming operation by the digital copying machine.

When documents to be copied is placed on the image reading section 24 shown in FIG. 4 and a copy start button is operated, the main control section 31 which receives the above input starts the image forming operation. In other words, an document image is read by the image reading section 24 and the image data are processed in the image processing section 32. Moreover, a main motor, not shown, is operated and the sheet 5 in the sheet cassette 4 is transferred towards the image forming section 1 by the feeding roller 6 which is driven by the main motor. When sheet detecting member 7 is lifted by the sheet 5, normal sheet feeding state is detected by this operation in the feeding sensor 8. Thereafter, the sheet makes contact with the end of the register roller 9 which is at a standstill and the operation is suspended.

When normal sheet feeding is detected by the feeding sensor 8, the image data stored in the image memory are transferred to the image forming control unit 33. In the image forming control unit 33, the inputted image data is begun to be converted into a grid control signal to be supplied to the print head 22. Furthermore, when receiving a fixed amount of the grid control signals, the image forming control unit 33 operates the register roller 9 and carries the sheet 5 to a surface of the counter electrode 21 in the print head 3 of the image forming section 1 which is opposite to the toner holder 19. Here, the fixed amount of the grid control signal differs with the arrangement of the digital copying machine, etc.

Thereafter, the image forming control unit 33 feeds the grid control signal to the print head 22. The grid control signal is supplied at intervals in synchronization with the feeding of the sheet 5 to the print section 3 by the register roller 9. In the print head 22, the grid control section 40 controls each driver 39 in the high voltage driver section 38 based upon the grid control signal. As a result, a voltage is appropriately applied from the driver 39 to the prescribed control electrode 25, and an electric field in the vicinity of the print head 22 is controlled. In other words, in the gate 26 of the control grid 23, the flying of toner from the toner holder 19 to the counter electrode 21 is appropriately prevented and the prevention is released according to the image data. Then, a toner image according to the image signal is formed on the sheet 5.

The sheet 5 on which the toner image has been formed is carried to the fixing section 10, and the toner image is fixed on the sheet in the fixing section 10. The sheet 5 on which the toner image is fixed is discharged onto the discharge tray 14 by the discharge roller 11. At this time, the sheet detecting member 12 is lifted by the sheet 5 so that the discharge sensor 13 detects that the sheet 5 is normally discharged. The main control section 31 judges whether or not the printing operation is normally completed according to the detecting operation.

Here, in the case where the electric field between the toner holder 19 and the counter electrode 21 which is generated by applying a voltage across the toner holder 19 and the counter electrode 21 is weaker than the toner flying start electric field Eth, a potential to be supplied to the control grid 23 based upon the grid control signal is a potential for allowing toner to fly. In other words, in the image forming section 1 shown in FIG. 10(a), as shown in FIG. 10(b), when Vs is a potential of the toner holder 19, Vb is a potential of the counter electrode 21, Vm is a potential to be applied to the control grid 23, and Vo is a potential at the position of the control grid 23 which is generated by applying a voltage across the toner holder 19 and the counter electrode 21 before the potential Vm is supplied to the control grid 23, the potential Vm is higher than the potential Vo. Therefore, when the potential Vm is given, the potential across the toner holder 19 and the control grid 23 changes with respect to a potential change line A before the giving of the potential Vm, and it is represented by a potential change line B.

In addition, as shown in FIG. 10(c), if Eth is the toner flying start electric field, Em is strength of the electric field when the potential Vm is given to the control grid 23 and Eo is strength of the electric field before the potential Vm is given to the control grid 23, strength of an electric field in the proximity of the toner holder 19 is stronger than the toner flying start electric field Eth according to the change in the potential as shown in FIG. 10(b).

Meanwhile, in the case where the electric field across the toner holder 19 and the counter electrode 21 which is generated by applying a voltage across the toner holder 19 and the counter electrode 21 is stronger than the toner flying start electric field Eth, a potential to be given to the control grid 23 is a potential which prevents toner from flying. In other words, in the image forming section 1 shown in FIG. 11(a), as shown in FIG. 11(b), the potential Vm is lower than the potential Vo. Therefore, when the potential Vm is given, a change in the potential across the toner holder 19 and the counter electrode 21 is represented by a potential change line C. Moreover, as shown in FIG. 11(c), the strength of the electric field Em in the proximity of the toner holder 19 becomes smaller than the toner flying start electric field Eth according to the change in the potential as shown in FIG. 11(b).

Figure 10:
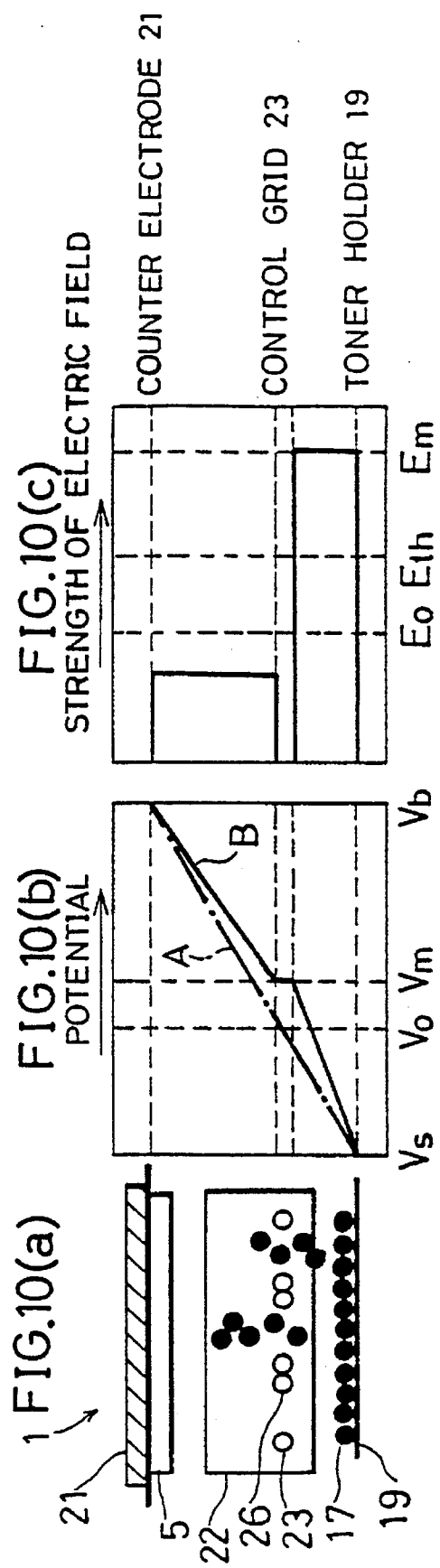
FIG. 10(a) is a schematic drawing of an image forming section.
FIG. 10(b) is an explanatory drawing of a potential applied to each section for a toner flying control in the image forming section shown in FIG. 10(a)
FIG. 10(c) is an explanatory drawing of intensity of an electric field in each section by the potential shown in FIG. 10(b).
Figure 11:
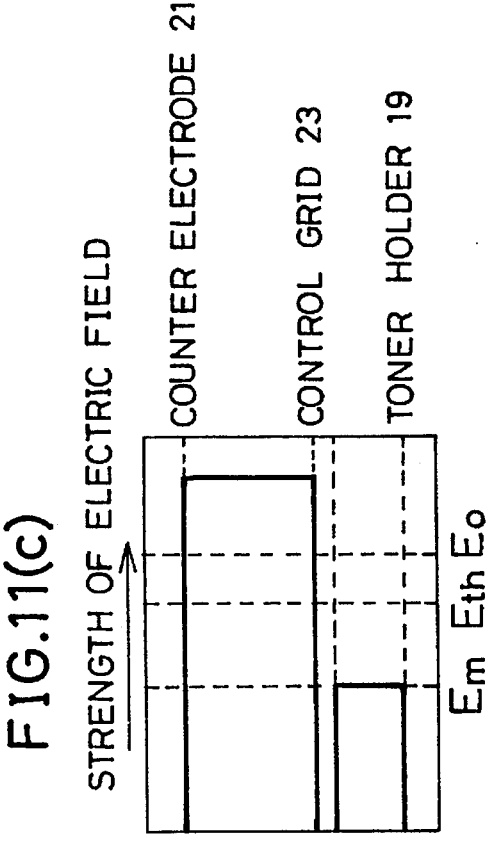
FIG. 11 (a) is a schematic drawing of an image forming section.

Here, as is clear by comparing the control shown in FIG. 10 with the control shown in FIG. 11, the control shown in FIG. 11 makes it possible to set a potential which is given to the control grid 23 to a lower value than the control shown in FIG. 10. Therefore, in the toner flying control from a viewpoint of the potential which is given to the control grid 23, the control shown in FIG. 11 is advantageous from viewpoints of a fall in an output voltage of the power source section 29 which gives a potential to the control grid 23, and withstand voltage of power source members and the voltage applying section, etc. On the contrary, in the toner flying control from a viewpoint of the influence of a failure due to a faulty potential in the control grid 23, the control in FIG. 11 causes solid-black in an image, whereas the control shown in FIG. 10 causes only blank. Therefore, the control in FIG. 10 is advantageous.

In addition, in the digital copying machine, since the distance from the toner holder 19 to the control grid 23 Dsm is set so as to be smaller than the pitch of the gate 26 Dch, the electric field of the adjoining gate 26 does not affect the surface of the toner holder 19 which corresponds to the prescribed gate 26. Therefore, independent toner flying control can be executed by means of each gate 26, thereby making it possible to obtain an image of good quality.

In addition, the above setting with respect to the control grid 23 shortens the distance between the toner holder 19 and the control grid 23, so the potential to be given to the control grid 23 for the control of flying of the toner 17 can be set to a value which is close to the potential of the toner holder 19, namely, a low value.

Figure 12:
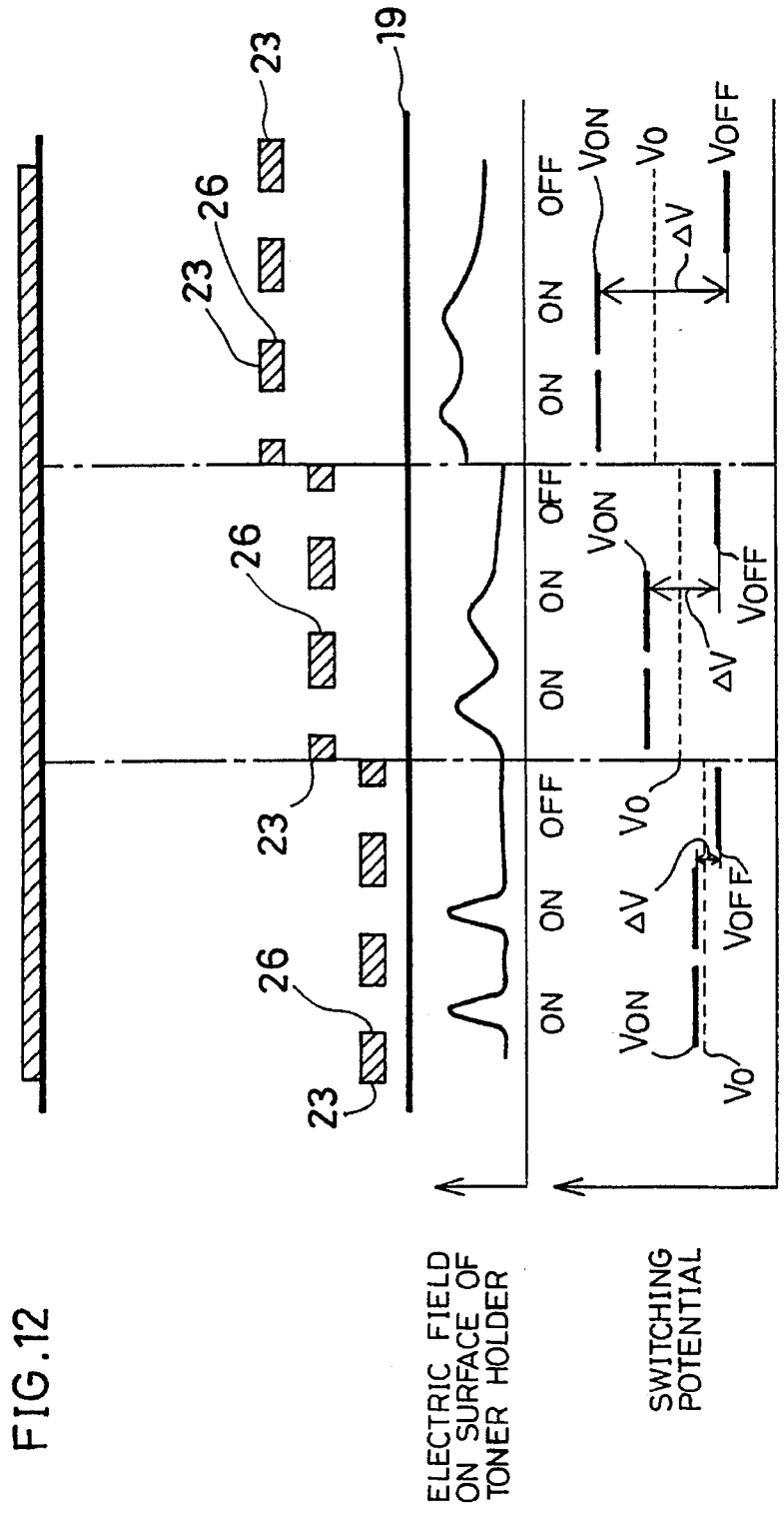
FIG. 12 is an explanatory drawing which shows relationships between an arrangement position of the control grid and the toner holder surface electric field and between a switching potential of the gates and the toner holder surface electric field in the image forming section.

This principle is shown in FIG. 12. Here, in FIG. 12, Vo is a potential at the position of the control grid 23 which is generated by applying a voltage across the toner holder 19 and the counter electrode 21 (hereinafter, referred to as reference potential) as mentioned above. $V_{ON}$ is a potential which is given to the control grid 23 for allowing the toner 17 to fly from the toner holder 19 to the counter electrode 21, namely, a gate ON potential. $V_{OFF}$ is a potential which is given to the control grid 23 for preventing the toner 17 from flying, namely, a gate OFF potential. Furthermore, $\Delta V$ is a potential difference between the gate ON potential $V_{ON}$ and the gate $O_{FF}$ potential $V_{OFF}$, namely, a switching potential difference.

As shown in FIG. 12, in the case where the control grid 23 is provided near the toner holder 19, the reference potential Vo becomes close to a potential which is given to the toner holder 19, namely, becomes lower. Therefore, the gate ON potential $V_{ON}$ and the gate OFF potential $V_{OFF}$ become low accordingly, so the switching potential difference $\Delta V$ also becomes smaller. Meanwhile, as the control grid 23 is positioned further from the the toner holder 19, the reference potential Vo becomes higher, so the gate ON potential $V_{ON}$ and the gate OFF potential $V_{OFF}$ become high and the switching potential difference $\Delta V$ also becomes great accordingly.

As mentioned above, if the gate ON potential $V_{ON}$ and the gate OFF potential $V_{OFF}$ become low and the switching potential difference $\Delta V$ becomes small, an output voltage from the power source section 29 can be lowered, it is satisfactory that withstand voltage of the power source members and the voltage applying section is low. Therefore, lowering of costs, improvement in safety and lowering of a failure rate can be realized.

In addition, in the digital copying machine, since the distance between the toner holder 19 and the control grid 23 is set so as to be smaller than the diameter of the gate 26, the control grid 23 is provided close to the toner holder 19. Therefore, similarly to the above case, lowering of costs, improvement in safety and lowering of a failure rate can be realized. Moreover, with the above setting, a change in the electric field of the gate 26 due to apply of a voltage to the control grid 23 can surely affect the surface of the toner holder 19, and the flying of toner from the toner holder 19 to the counter electrode 21 can be satisfactorily controlled.

Figure 13:
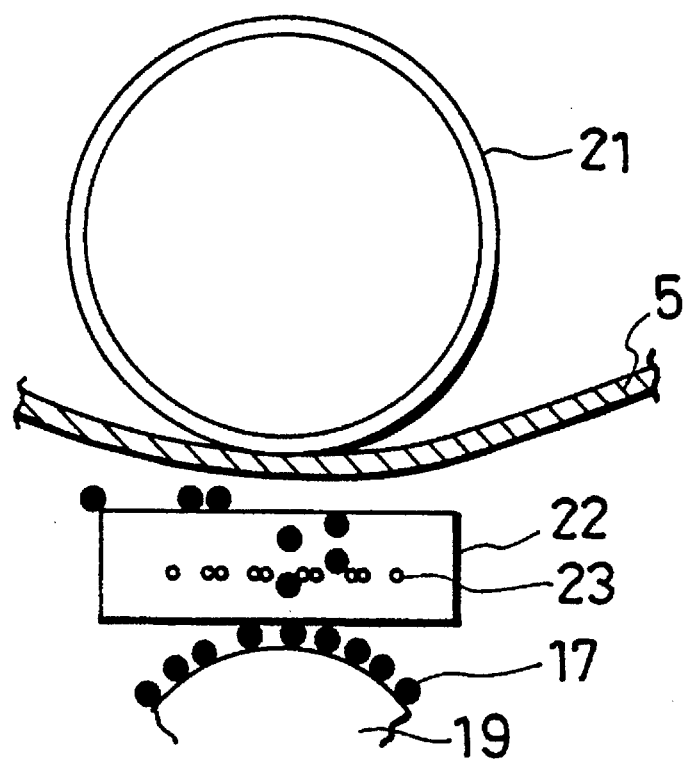
FIG. 13 is an explanatory drawing which shows an example of a configuration of a counter electrode in the image forming section.

Here, as a configuration of the counter electrode 21, a flat board type shown in FIG. 1, an arc type shown in FIG. 3 and also a cylindrical type shown in FIG. 13 may be adopted. The counter electrode 21 can be used as a carrying guide for the sheet 5 which is carried to a counter surfaces side of the counter electrode 21 to the toner holder 19. This does not require a special carrying guide, thereby making it possible to miniaturize the apparatus and simplify its arrangement.

[Embodiment 2]

Figure 14:
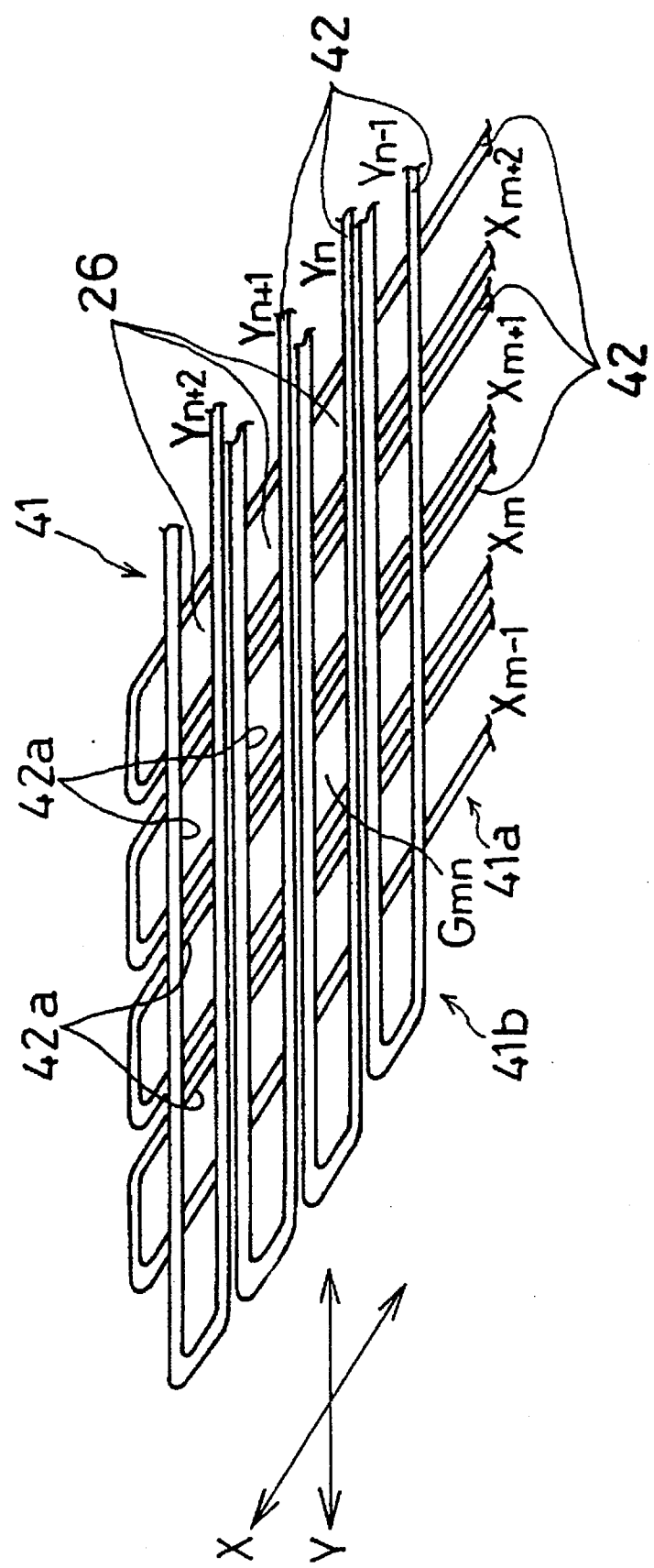
FIG. 14 is a perspective view which shows an arrangement of a control grid of an image forming section which is included in a digital copying machine of another embodiment according of the present invention.
Figure 15:
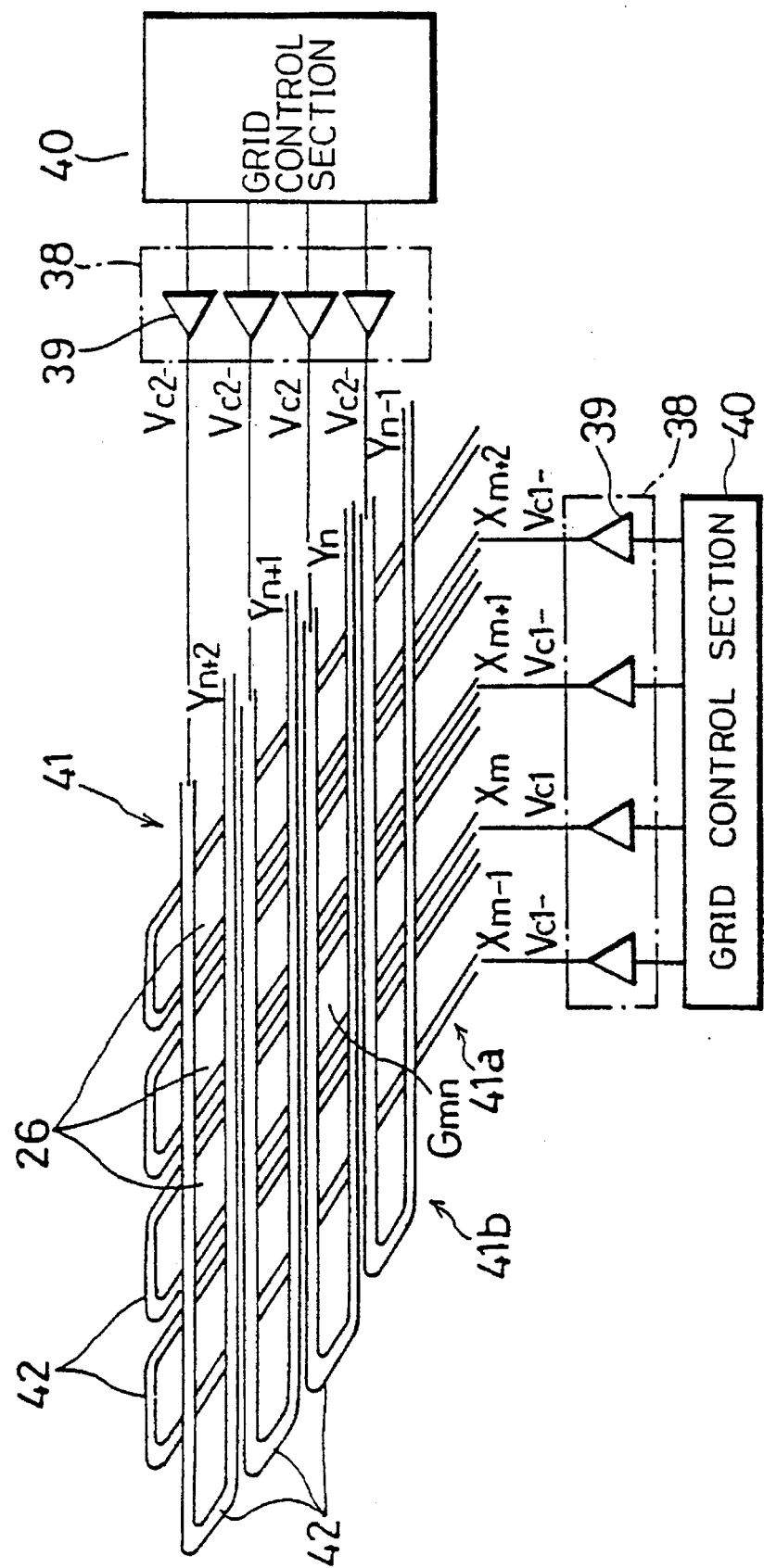
FIG. 15 is an explanatory drawing which shows an arrangement that a potential is applied to the control grid.

The following will discuss another embodiment of the present invention referring to FIGS. 14 and 15. Here, for convenience of explanation, those members that have the same arrangement and functions, and that are described in the aforementioned embodiment 1 are indicated by the same reference numerals and the description thereof is omitted.

The digital copying machine of the present embodiment includes a control grid 41 with a two-layer mesh arrangement shown in FIG. 14 instead of the control grid 23 in the image forming section 1 described in embodiment 1.

The control grid 41 is formed so that a plurality of control electrodes 42 are placed parallel to one another. The control electrodes 42 are composed of wire rods which are folded back at an angle of 180 degrees at their center. In other words, a X channel layer 41a as a first electrode layer is formed by placing the control electrodes 42 parallel to one another in a direction of X, and a Y channel layer 41b as a second electrode layer is formed by placing the control electrodes 42 parallel to one another in a direction of Y. The X channel layer 41a and the Y channel layer 41b constitutes the mesh arrangement. Space between the both wire rods in the control electrode 42 is an opening 42a which for constituting gates 26. Here, an up and down relationship between the both layers 41a and 41b is not particularly limited.

In the control grid 41, the gate 26 is an area which is surrounded by two lines being parallel to each other in one control electrode 42 of the X channel layer 41a and two lines being parallel to each other in one control electrode 42 of the Y channel layer 41b. The former control electrode 42 and the latter control electrode 42 intersect. In the present embodiment, four control electrodes 25 Xm−1, Xm, Xm+1 and Xm+2 are positioned in the direction of X and four control electrodes 25 Yn−1, Yn, Yn+1 and Yn+2 are positioned in the direction of Y. Here, in the case where the carrying direction of the sheet 5 in the printing section 3 is the direction of Y, at least two or more lines of the gates 26 are provided in the direction of Y. As shown in FIG. 15, each control electrode 42 is connected to the drivers 39 provided correspondingly to the individual control electrodes 42 in the high voltage driver section 38.

Next, the following will describe the control of the gate 26 in the control grid 41. The potential Vo, which is a potential in the control grid 23 generated by applying a voltage across the toner holder 19 and the counter electrode 21 and a potential before a control potential (potential Vm) is given to the control grid 23, varies according to the positions of the X channel layer 41a and Y channel layer 41b. Therefore, the toner flying potential and the toner flying restricting potential vary on the X channel layer 41a and on the Y channel layer 41b. Here, in FIG. 14, toner flying potentials on the X channel layer 41a which is close to the toner holder 19 and on the Y channel layer 41b which is far from the toner holder 19 are respectively represented by Vc1 and Vc2, and the toner flying restricting potential by Vc1- and Vc2- . At this time, there exist four combinations of the potentials to be given to each gate 26: (Vc1, Vc2), (Vc1, Vc2-), (Vc1-, Vc2) and (Vc1-, Vc2-). The combination (Vc1, Vc2) in the both channel layers 41a and 41b is a potential for allowing the toner 17 to fly, and the toner 17 passes through the gate 26 and flies. Meanwhile, in the remained three combinations, since the potential for restricting the flying of the toner 17 is given to the electrode 42 on at least one channel layer, the toner 17 cannot fly. In other words, in order to allow the toner 17 to fly only at the gate Gmn, Vc1 and Vc2 are supplied to the electrode Xm and the electrode Yn, and Vc1- and Vc2- may be supplied to the control electrodes 42 on the X channel layer 41a other than Xm and to the control electrodes 42 on the Y channel layer 41b other than Yn. That is, the potentials to be given to each control electrodes 42 and ON/OFF states of each gate 26 are as follows:

Xm−1 = Vc1−    Yn−1 = Vc2−
Xm   = Vc1     Yn   = Vc2
Xm+1 = Vc1−    Yn+1 = Vc2−
Xm+2 = Vc1−    Yn+2 = Vc2−

Gm−1,n+2:OFF  Gm,n+2:OFF  Gm+1,n+2:OFF  Gm+2 n+2:OFF
Gm−1,n+1:OFF  Gm,n+1:OFF  Gm+1,n+1:OFF  Gm+2 n+1:OFF
Gm−1,n  :OFF  Gm,n  :ON   Gm+1,n  :OFF  Gm+2 n  :OFF
Gm−1,n−1:OFF  Gm,n−1:OFF  Gm+1,n−1:OFF  Gm+2 n−1:OFF

The above control grid 41 has two-layer arrangement, but a number of the control electrodes 42 is smaller than that in the control grid 23 shown in embodiment 1. This can reduce a number of the drivers 39, so the composition of the high voltage driver section 38 and the control over the high voltage driver 38 become simple. Moreover, a number of wirings by the feeder 28 is decreased. Here, the control electrodes 42 on the X channel layer 41a and the Y channel layer 41b which constitute two-layer arrangement can be arranged so as to have an arrangement which is close to an one-layer arrangement as to the configuration by weaving each insulated control electrode. Therefore, the control electrodes 42 can be treated as one component at the time of manufacturing.

Here, arrangement other than the above are same as that of the digital copying machine in embodiment 1, and each arrangement mentioned in embodiment 1 can be applied to the digital copying machine of the present embodiment.

[Embodiment 3]

Figure 16:
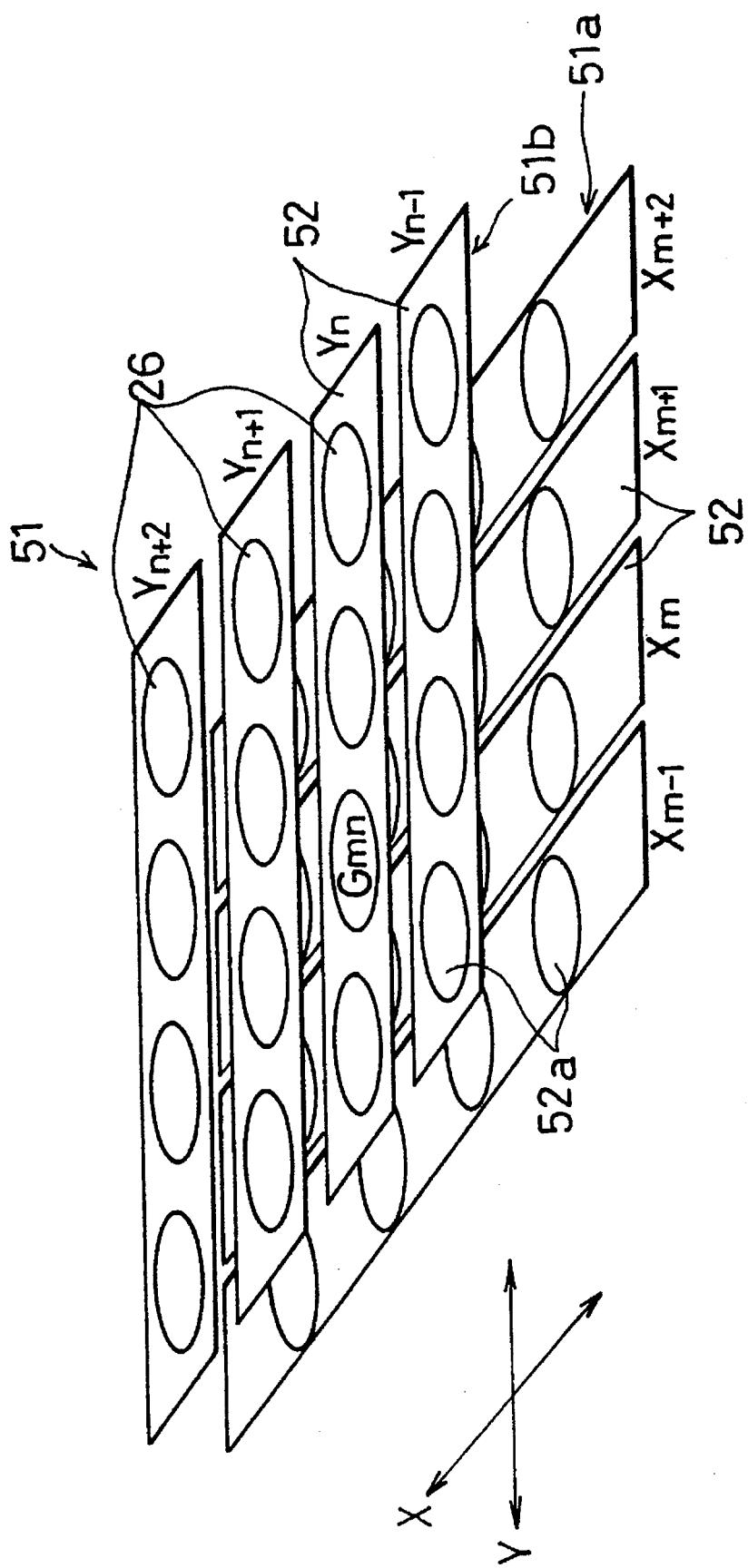
FIG. 16 is a perspective view which shows an arrangement of a control grid in an image forming section which is included in a digital copying machine of still another embodiment of the present invention.
Figure 17:
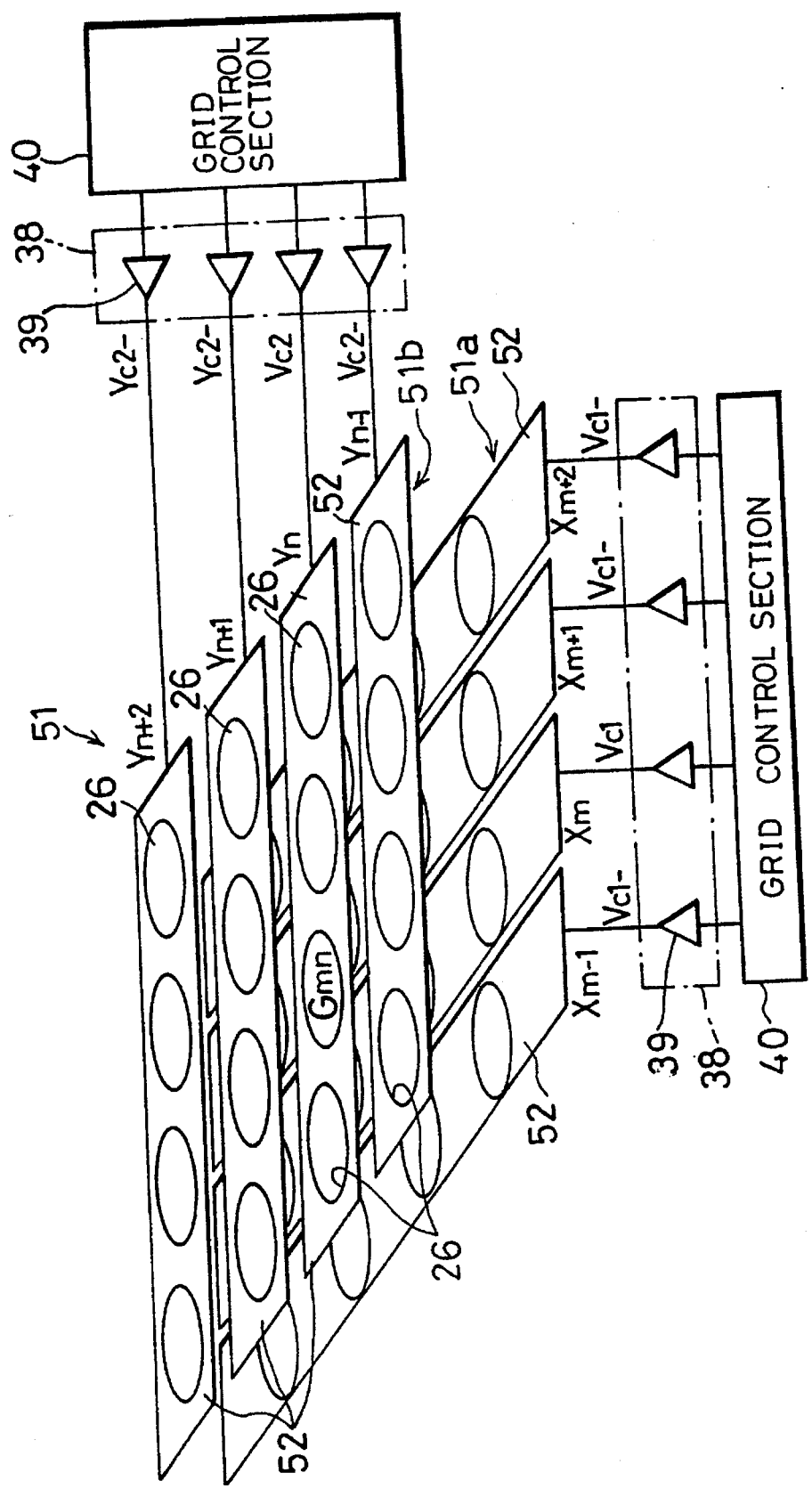
FIG. 17 is an explanatory drawing which shows an arrangement that a potential is supplied to the control grid.

The following will discuss still another embodiment of the present invention referring to FIGS. 16 and 17. Here, for convenience of explanation, those members that have the same arrangement and functions, and that are described in the aforementioned embodiments are indicated by the same reference numerals and the description thereof is omitted.

The digital copying machine of the present embodiment includes a control grid 51 with a two-layer-perforated-plate arrangement shown in FIG. 16 instead of the control grid 23 in the image forming section 1 mentioned in embodiment 1.

The control grid 51 is formed such that a plurality of slender plate-like control electrodes 52 are placed parallel to one another. In other words, circular openings 52a for constituting the gate 26 are formed in a lengthwise direction of the control electrodes 52. An X channel layer 51a as a first electrode layer is formed by arranging the control electrodes 52 in the direction of X, and a Y channel layer 51b as a second electrode layer is formed by arranging the control electrodes 52 in the direction of Y. The control grid 51 is formed by arranging the X channel layer 51a and the Y channel layer 51b parallel in an up-and-down direction. In this case, the openings 52a·52a on the control electrodes 52 of the X channel layer 51a and the Y channel layer 51b are coincide in the up-and-down direction. Here, in the case where the carrying direction of the sheet 5 in the print section 3 is the direction of Y, at least 2 lines or more of the gates 26 are provided in the direction of Y.

As shown in FIG. 17, each control electrode 52 is connected to drivers 39 provided correspondingly to each control electrode 52 in the high voltage driver section 38. This arrangement is same as that of the control grid 41. Therefore, the gate 26 of the control grid 51 is controlled in the same manner as of the control grid 41.

The control grid 51 has a two-layer arrangement which is same as of the control grid 41, but a number of the control electrodes 51 becomes smaller compared to the control grid 23. This makes it possible to decrease a number of the drivers 39, so the arrangement of the high voltage driver section 38 and the control over the high voltage driver section 38 become simple. Furthermore, a number of wirings by using the feeder 28 is decreased.

Here, arrangements other than the above are same as of the digital copying machine in embodiment 1, so the arrangements mentioned in embodiment 1 can be applied to the digital copying machine of the present embodiment.

[Embodiment 4]

The following will discuss still another embodiment of the present invention. Here, for convenience of explanation, those members that have the same arrangement and functions, and that are described in the aforementioned embodiments are indicated by the same reference numerals and the description thereof is omitted.

Figure 18:
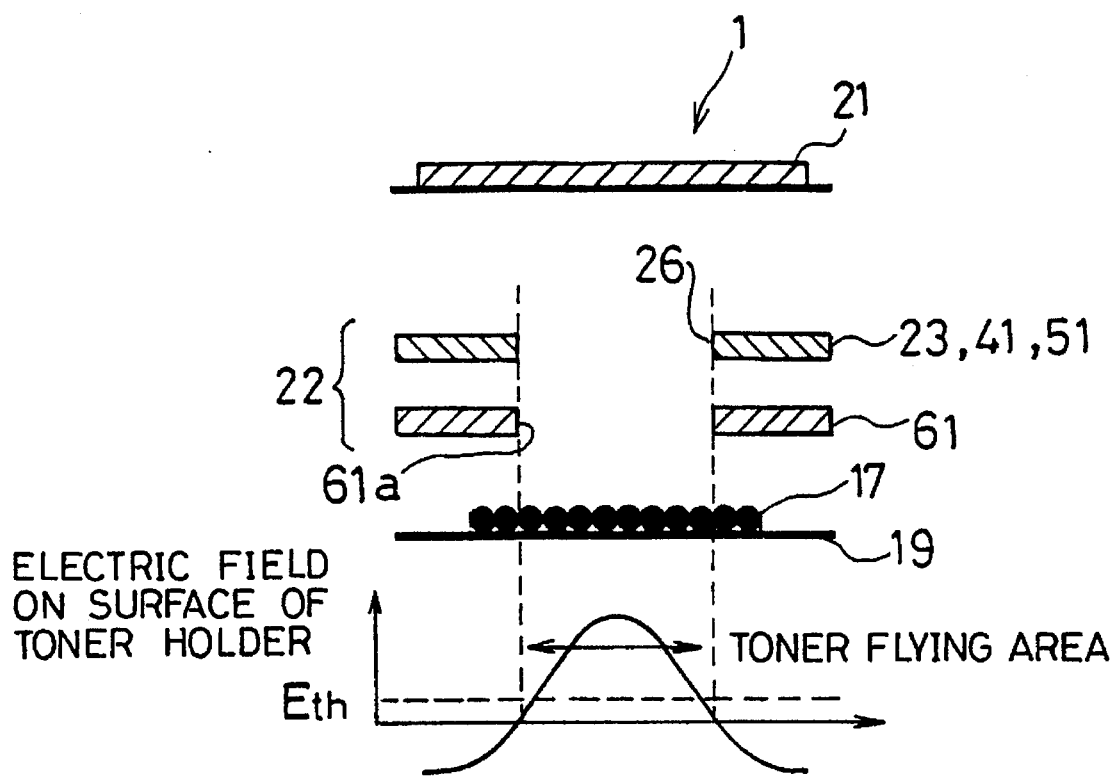
FIG. 18 is an explanatory drawing which shows an arrangement of an image forming section, which is included in a digital copying machine of still another embodiment of present invention, and ideal distribution of an electric field by its gates.

As shown in FIG. 18, the digital copying machine of the present embodiment is provided with a toner antisticking grid 61 as developing particle antisticking grid, which is parallel to the control grid (23, 41 or 51) and is extended two-dimensionally on the toner holder 19 side of the control grid (23, 41 or 51) in the image forming section 1.

In the toner antisticking grid 61, a toner passing hole 61a having the same diameter as of the gate 26, which is a developing particle passing hole, is formed in a position which coincide with the gate 26 of the corresponding control grid (23, 41 or 51) in the up-and-down direction. Moreover, a potential whose polarity is same as of the toner 17 is given to the toner antisticking grid 61 so as to prevent the toner 17 which flies from the toner holder 19 to the counter electrode 21 from adhering. The potential is given to the toner antisticking grid 61 by the power source section 29.

Figure 19B:
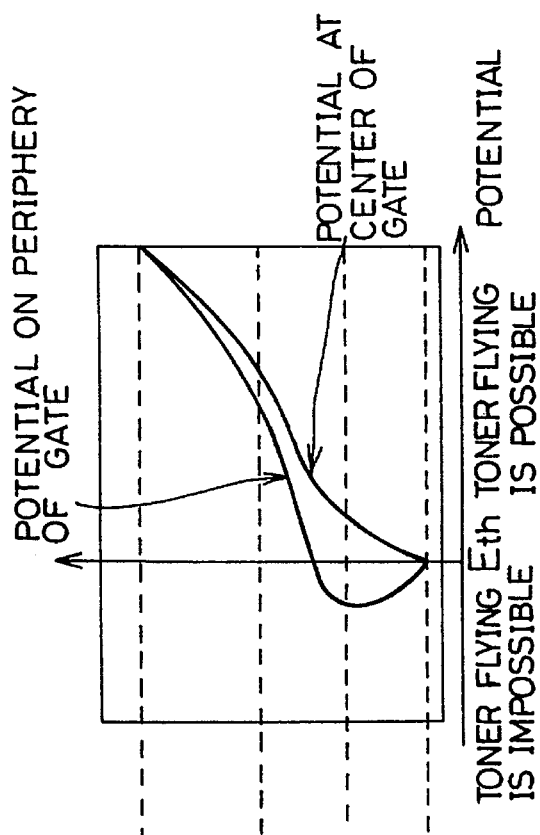
FIG. 19(b) is a graph which shows a change in a potential from the toner holder to the counter electrode shown in FIG. 19(a), namely, a gate center section and a gate peripheral section.
Figure 19A:
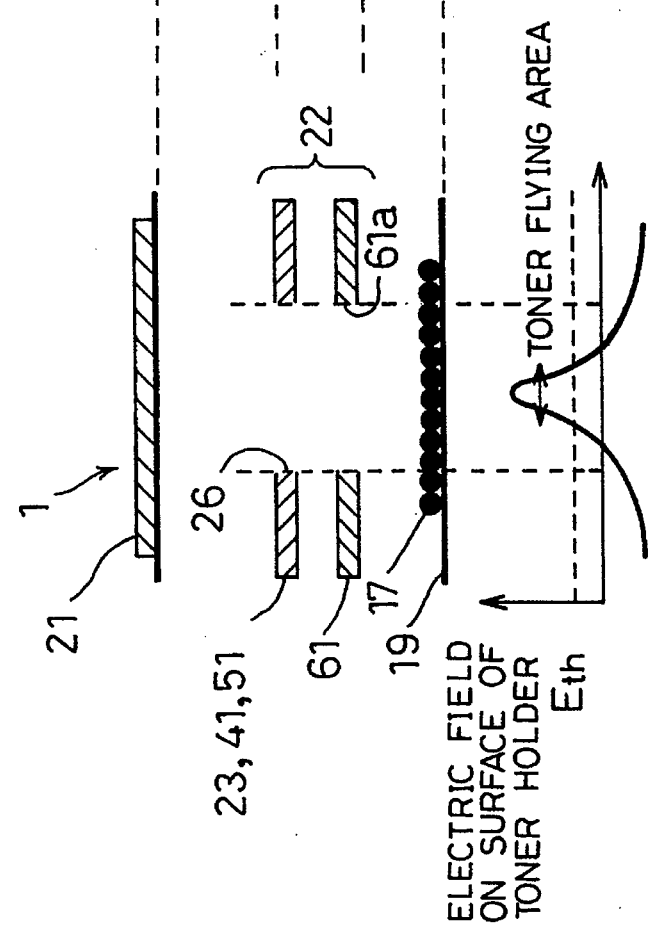
FIG. 19(a) is an explanatory drawing which shows an arrangement of the image forming section and actual distribution of an electric field by its gates.

An electric field, which is generated on the surface of the toner holder 19 by applying a voltage to the gate 26, changes according to the diameter of the gate 26 as shown in a graph of FIG. 18. This is an ideal distribution of the electric field. Meanwhile, as to actual distribution of the electric field generated on the surface of the toner holder 19, its region becomes narrow due to the function of the toner antisticking grid 61 as shown in FIG. 19(a). The change in the potential across the toner holder 19 and the counter electrode 21 in this case is shown in FIG. 19(b). In other words, the potential at the center of the gate 26 changes in an area of the potential where toner can fly by voltage to be applied across the toner holder 19 and the counter electrode 21 and by the potential to be given to the control grid (23, 41 or 51). However, after temporarily moving to the area of a potential where the toner cannot fly in the up-and-down direction in the proximity of the toner antisticking grid 61 due to the potential whose polarity is same as of the toner 17 to be applied to the toner antisticking grid 61, namely, a potential with negative polarity, the potential in the circumference of the gate 26 changes in the area of the potential where the toner can fly from the position near the control grid 23, 41 or 51.

Figure 20B:
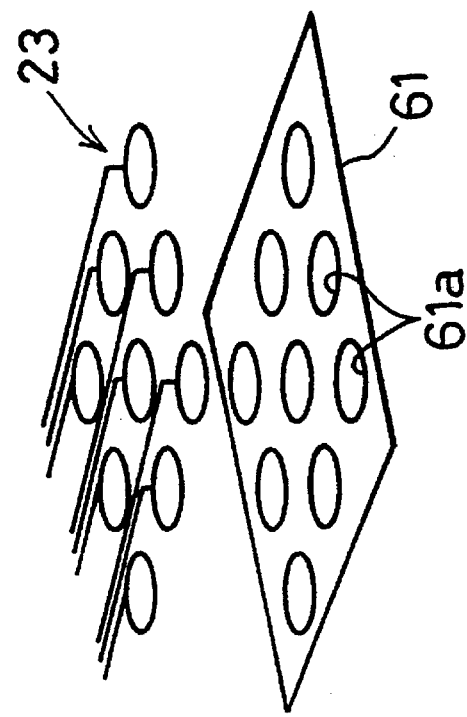
FIG. 20(b) is a perspective view which shows a configuration of the toner antisticking grid.
Figure 20A:
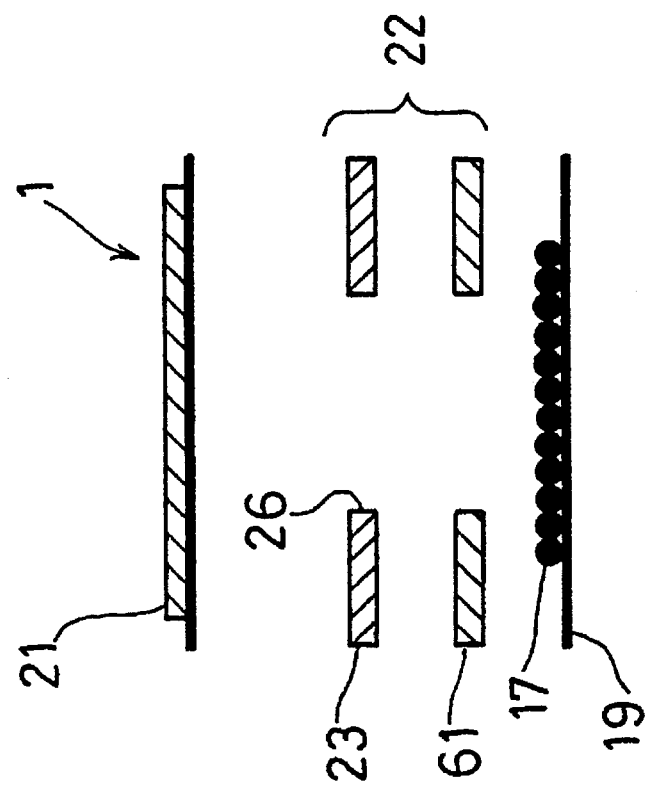
FIG. 20(a) is an explanatory drawing which shows an arrangement that a toner antisticking grid shown in FIG. 18 is provided correspondingly to the control grid shown in FIG. 7.

The arrangement that the toner antisticking grid 61 is provided opposite to the control grid 23 mentioned in embodiment 1 is shown in FIGS. 20(a) and (b). In this case, the toner antisticking grid 61 is arranged such that the toner passing hole 61a is provided in a metal plate opposite to the gate of the control grid 23, for example.

The arrangement that the toner antisticking grid 61 is provided opposite to the control grid 41 mentioned in embodiment 2 is shown in FIGS. 21(a) and (b). In this case, similarly to the control grid 41, the toner antisticking grid 61 has a mesh arrangement that a wire rod is provided in a position which is opposite to the control electrode 42 of the control grid 41. Such an arrangement is same as of the control grid 41.

Figure 22B:
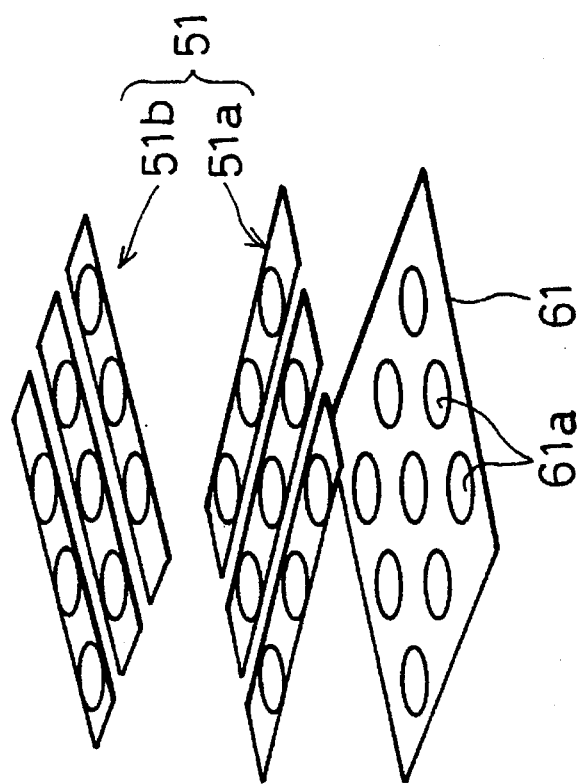
FIG. 22(b) is a perspective view which shows a configuration of the toner antisticking grid.
Figure 22A:
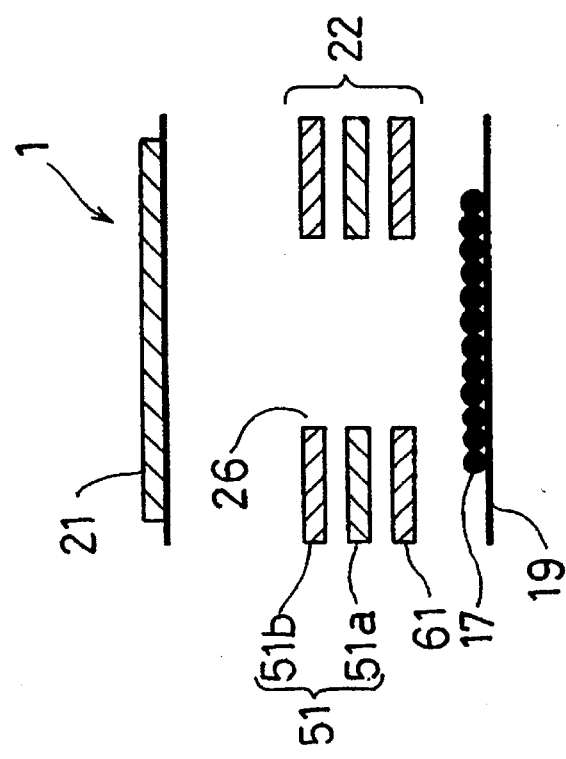
FIG. 22(a) is an explanatory drawing which shows an arrangement that the toner antisticking grid is provided correspondingly to the control grid shown in FIG. 16.

In addition, the arrangement that the toner antisticking grid 61 is provided opposite to the control grid 51 mentioned in embodiment 3 is shown in FIGS. 22(a) and (b). In this case, the toner antisticking grid 61 has the same arrangement as of the toner antisticking grid 61 shown in FIG. 20(b).

As mentioned above, with the arrangement that the toner antisticking grid 61 is provided, adhesion of toner to the control grid 23, 41 or 51 is prevented by applying a voltage having the same polarity as of the toner 17 to the toner antisticking grid 61. Therefore, a problem that the charged toner 17 adheres to the control grid (23, 41 or 51) and the potential of the control grid (23, 41 and 51) becomes instable is prevented. As a result, the flying of toner is stably controlled, so an image of good quality can be obtained.

In the case particularly where the control grid 41 shown in FIGS. 21 and 14 is formed such that the X channel layer 41a and the Y channel layer 41b are woven, the toner antisticking grid 61 effectively functions. In other words, a difference between an X channel layer toner flying potential Vc1 to be given to the X channel layer 41a of the control grid 41 and a Y channel layer toner flying potential Vc2 to be given to the Y channel layer 41b, and a difference between an X channel layer toner fly restricting potential Vc1- and a Y channel layer toner fly restricting potential Vc2- are small, and as to combinations (Vc1, Vc2-) and (Vc1-, Vc2) of the potential applied to the control grid 41, Vc may overcome Vc- according to the position of the gate 26. In this case, the toner 17 flies and adheres to the gate 26, but this can be surely prevented by providing the toner antisticking grid 61.

Here, the arrangement other than the above are same as those of the digital copying machine in embodiments 1 through 3.

[Embodiment 5]

The following will discuss still another embodiment of the present invention. Here, for convenience of explanation, those members that have the same arrangement and functions, and that are described in the aforementioned embodiments are indicated by the same reference numerals and the description thereof is omitted.

Figure 23:
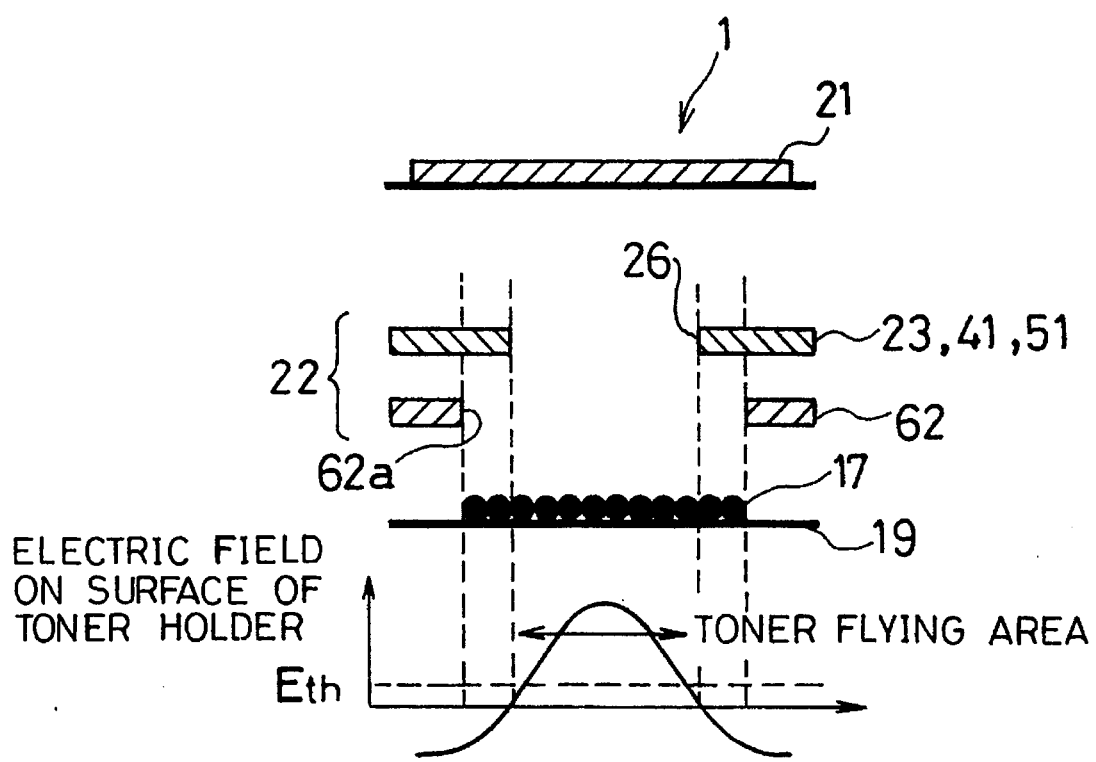
FIG. 23 is an explanatory drawing which shows an arrangement of an image forming section, which is included in a digital copying machine of still another embodiment of the present invention, and distribution of an electric field by its gates.

As shown in FIG. 23, the digital copying machine of the present embodiment is provided with a toner antisticking grid 62 as a developing particle antisticking grid which is parallel to the control grid (23, 41 or 51) and is extended two-dimensionally on the toner holder 19 side of the control grid (23, 41 or 51) in the image forming section 1. The toner antisticking grid 62 is a substitute for the toner antisticking grid 61 in the image forming section 1 mentioned in embodiment 4.

In the toner antisticking grid 62, a toner passing hole 62a with a larger diameter than that of the gate 26 which is a developing particle passing hole is formed in a position which conform with the gate 26 of the control grid (23, 41 or 51) in the up-and-down direction. The diameter of the toner passing hole 62a in this case is not a constructional hold diameter but a hole diameter of an electrode of the toner antisticking grid 62. In addition, a potential having the same polarity as of the toner 17 is given to the toner antisticking grid 62 so as to prevent the toner 17 which flies from the toner holder 19 to the counter electrode 21 from adhering. The potential is given to the toner antisticking grid 62 by the power source section 29.

Figure 24B:
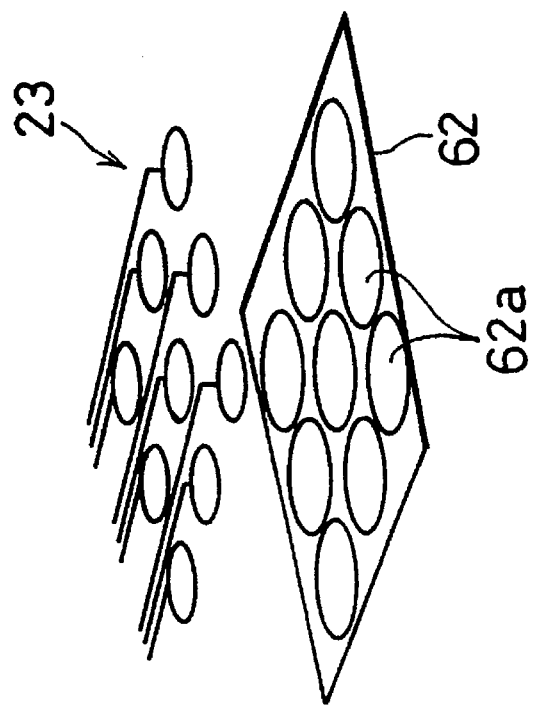
FIG. 24(b) is a perspective view which shows a configuration of the toner antisticking grid.
Figure 24A:
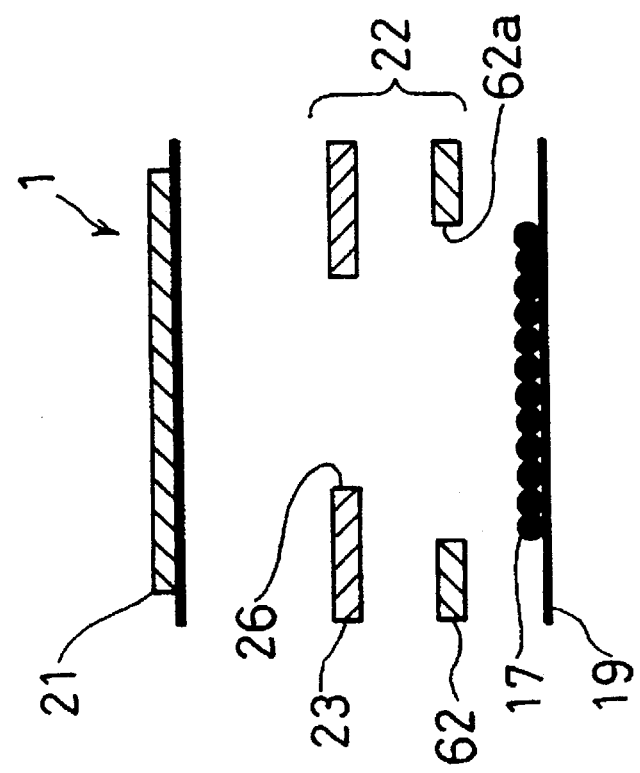
FIG. 24(a) is an explanatory drawing which shows an arrangement that a toner antisticking grid shown in FIG. 23 is provided correspondingly to a control grid shown in FIG. 7.
Figure 25A:
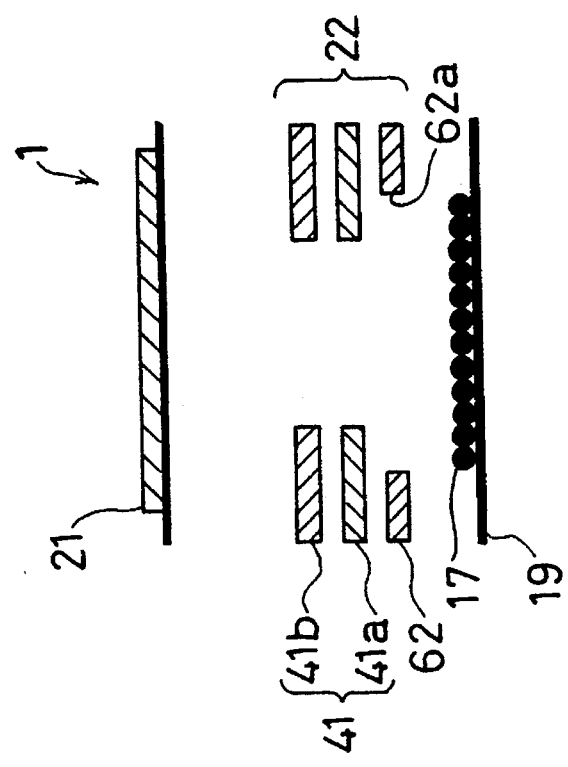
FIG. 25(a) is an explanatory drawing which shows an arrangement that the toner antisticking grid is provided correspondingly to the control grid shown in FIG. 14.
Figure 25B:
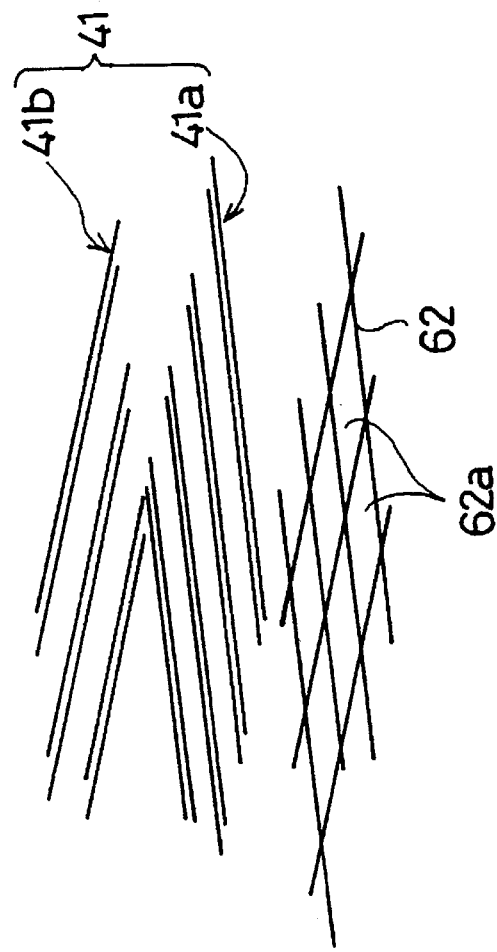
FIG. 25(b) is a perspective view which shows a configuration of the toner antisticking grid.
Figure 27:
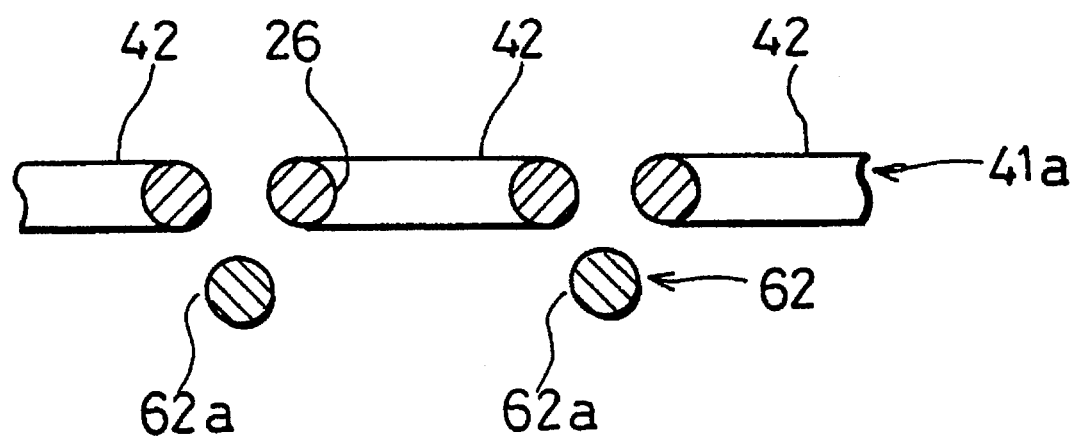
FIG. 27 is a vertical cross-section which shows a relationship of a position between an X channel layer and a toner antisticking grid shown in FIG. 25.

The arrangements that the toner antisticking grid 62 is provided opposite to the control grid 23, the control grid 41 and the control grid 51 are respectively shown in FIGS. 24(a) and (b), FIGS. 25(a) and (b) and FIGS. 26(a) and (b). Each toner antisticking grid 62 has the same configuration as of each toner antisticking grid 61 excluding the toner passing hole 62a. Here, a position relationship between the toner antisticking grid 62 and the X channel layer 41a which are shown in FIG. 25(b) is as one shown in FIG. 27, for example.

With the above arrangement of the toner antisticking grid 62, a solid angle difference 62 between the control grid (23, 41 or 51) and the toner antisticking grid 62 viewed from the toner holder 19 which is shown in FIG. 28(b) becomes larger than a solid angle difference $\theta_1$ between the control grid (23, 41 or 51) and the toner antisticking grid 61 in the case where the toner antisticking grid 61 is provided shown in FIG. 28(a). Therefore, in the case where the toner antisticking grid 62 is provided, a distribution of the electric field generated on the surface of the toner holder 19 due to the giving of a potential to the gate 26 is as shown in FIG. 23, and compared to a distribution in FIG. 19 in the case where the toner antisticking grid 61 is provided, the distribution in FIG. 23 suitably spreads correspondingly to the area of the gate 26, which is ideal. With this arrangement, the digital copying machine prevents the toner 17 from adhering to the control grid (23, 41 or 51) and makes it possible to easily provide a satisfactory electric field by means of the gate 26.

In other words, with the arrangement including the toner antisticking grid 61, the solid angle difference $\theta_1$ between the control grid (23, 41 or 51) and the toner antisticking grid 61 becomes smaller. Therefore, in order to generate an electric field, which allows only the toner 17 in the area with almost same size as the diameter of the gate 26 to fly towards the counter electrode 21, on the surface of the toner holder 19, it is necessary to supply a fairly high potential which promotes the flying of the toner 17 or to greatly shorten the distance between the control grid (23, 41 or 51) and the toner holder 19. However, the increase in the potential for the flying of the toner 17 easily causes dielectric breakdown, so it involves difficulty. Meanwhile, it is limited to bring the control grid (23, 41 or 51) close to the toner holder 19, so the setting of the position of the control grid (23, 41 or 51) becomes difficult. Therefore, the toner antisticking grid 62 with the toner passing hole 62a having a larger diameter than that of the gate 26 is provided in the digital copying machine so that the adhesion of the toner 17 to the control grid (23, 41 or 51) is prevented and a satisfactory electric field can be easily provided by means of the gate 26.

Here, the arrangements other than the above are same as of the digital copying machine in embodiments 1 through 3.

[Embodiment 6]

The following will discuss still another embodiment of the present invention. Here, for convenience of explanation, those members that have the same arrangement and functions, and that are described in the aforementioned embodiments are indicated by the same reference numerals and the description thereof is omitted.

As shown in FIG. 29, in the image forming section 1, the digital copying machine of the present embodiment is provided with a toner flying stabilization grid 71 as a developing particle flying stabilization grid which is two-dimensionally extended parallel to the control grid (23, 41 or 51) on the counter electrode 21 side in the control grid (23, 41 or 51).

As to the toner flying stabilization grid 71, a toner passing hole 71a as a developing particle passing hole is formed in a position, which is in conformity with the gate 26 in the control grid (23, 41 or 51) in an up-and-down direction. In the present embodiment, the diameter of the toner passing hole 71a is same as that of the gate 26, but it may be larger than that of the gate 26. Moreover, in order to stabilize the flying of the toner 17 which has passed through the control grid (23, 41 or 51), a constant potential ($V_{const}$) for generating an electric field which promotes the flying of toner is applied to the toner flying stabilization grid 71. The the potential is given by the power source section 29.

The arrangement that the toner flying stabilization grid 71 is provided opposite to the control grid 23 described in embodiment 1 is shown in FIGS. 30(a) and (b). In this case, the toner flying stabilization grid 71 is arranged so as to have the toner passing hole 71a, which is opposite to the gate 26 in the control grid 23, on a metal plate, for example.

Figure 31B:
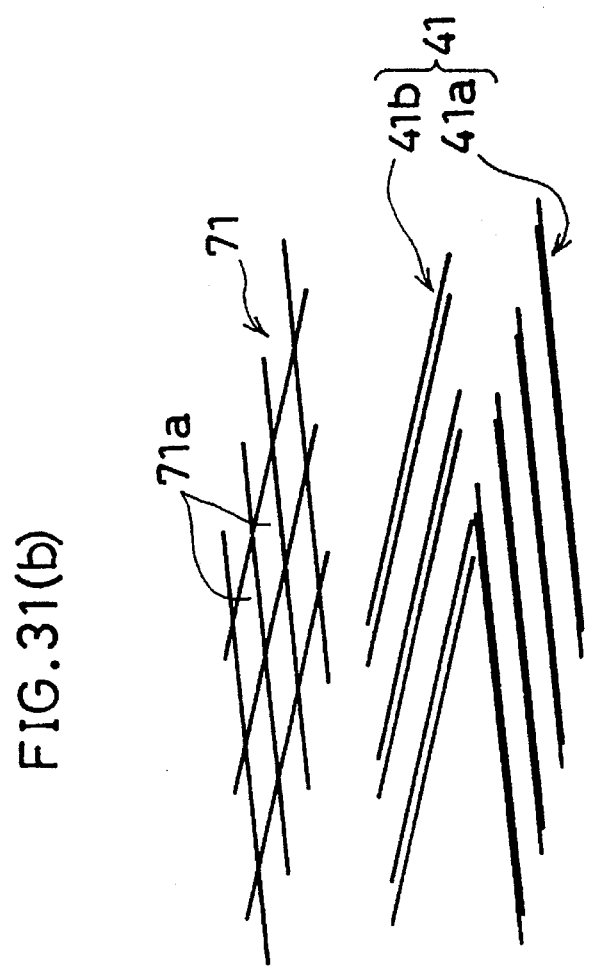
FIG. 31(b) is a perspective view which shows a configuration of the toner flying stabilization grid.
Figure 31A:
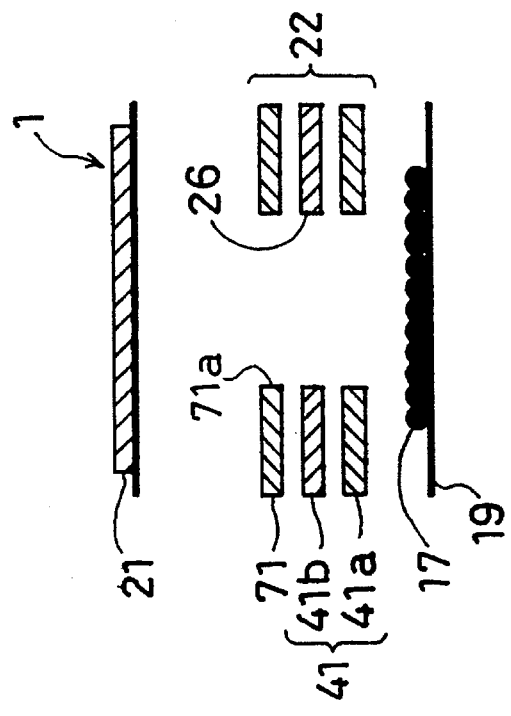
FIG. 31(a) is an explanatory drawing which shows an arrangement that the toner flying stabilization grid is provided correspondingly to the control grid shown in FIG. 14.

The arrangement that the toner flying stabilization grid 71 is provided opposite to the control grid 41 described in embodiment 2 is shown in FIGS. 31(a) and (b). In this case, the toner flying stabilization grid 71 has a mesh arrangement that wire rods are provided in a position corresponding to the control electrode 42 of the control grid 41. Such a mesh arrangement is also applied to the control grid 41.

Figure 32B:
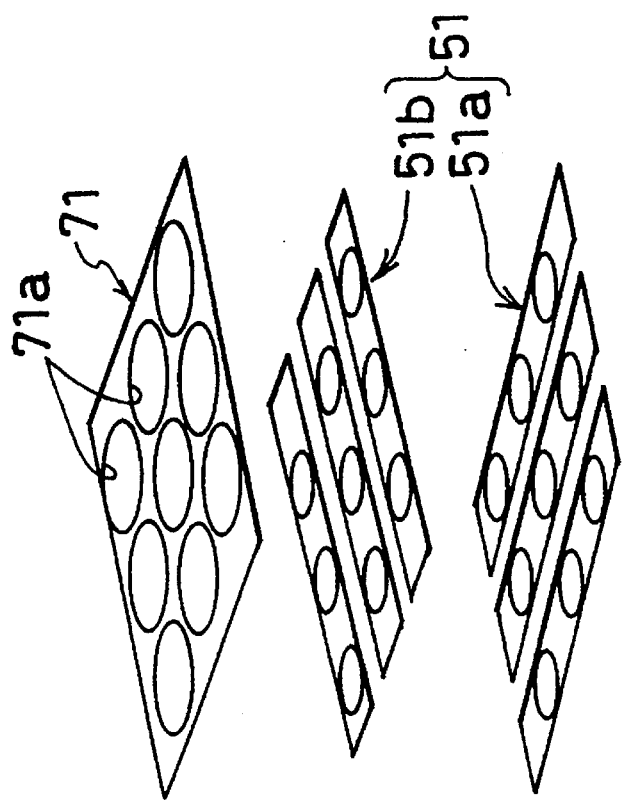
FIG. 32(b) is a perspective view which shows a configuration of the toner flying stabilization grid.
Figure 32A:
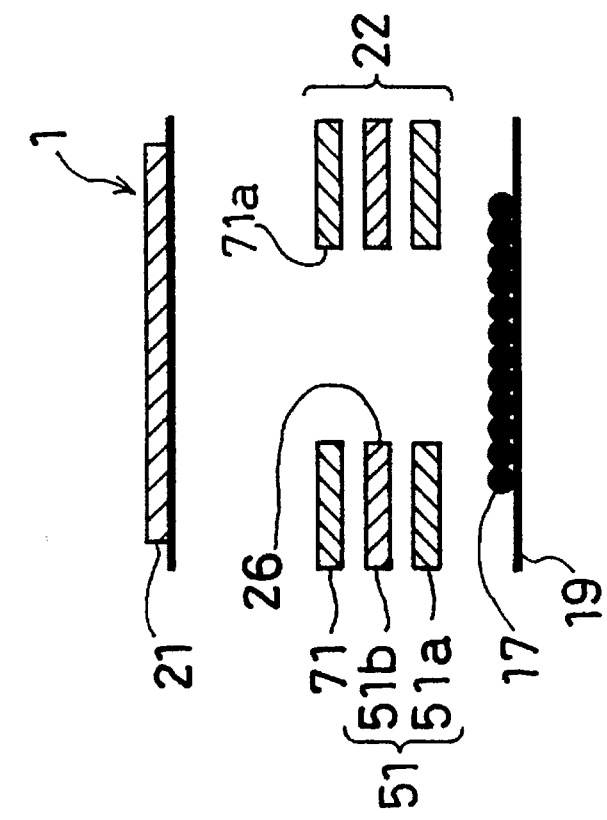
FIG. 32(a) is an explanatory drawing which shows an arrangement that the toner flying stabilization grid is provided correspondingly to the control grid shown in FIG. 16.

In addition, the arrangement that the toner flying stabilization grid 71 is provided opposite to the control grid 51 described in embodiment 3 is shown in FIGS. 32(a) and (b). In this case, the toner flying stabilization grid 71 is similar to the toner flying stabilization grid 71 shown in FIG. 30(b).

With the above arrangement that the toner flying stabilization grid 71 is provided, it is possible to stabilize the flying of the toner to the counter electrode 21 after the toner has passed through the control grid (23, 41 or 51), so an image of good quality can be obtained. The reason for it is as follows. Here, as an example, the arrangement including the control grid 23 will be explained.

In the digital copying machine, the flying of the toner 17 from the toner holder 19 to the counter electrode 21 is executed by controlling the giving of the potential to the control grid 23 according to an image signal. Therefore, the potential is momentarily given to the control grid 23, and the toner flies momentarily.

Figure 33A:
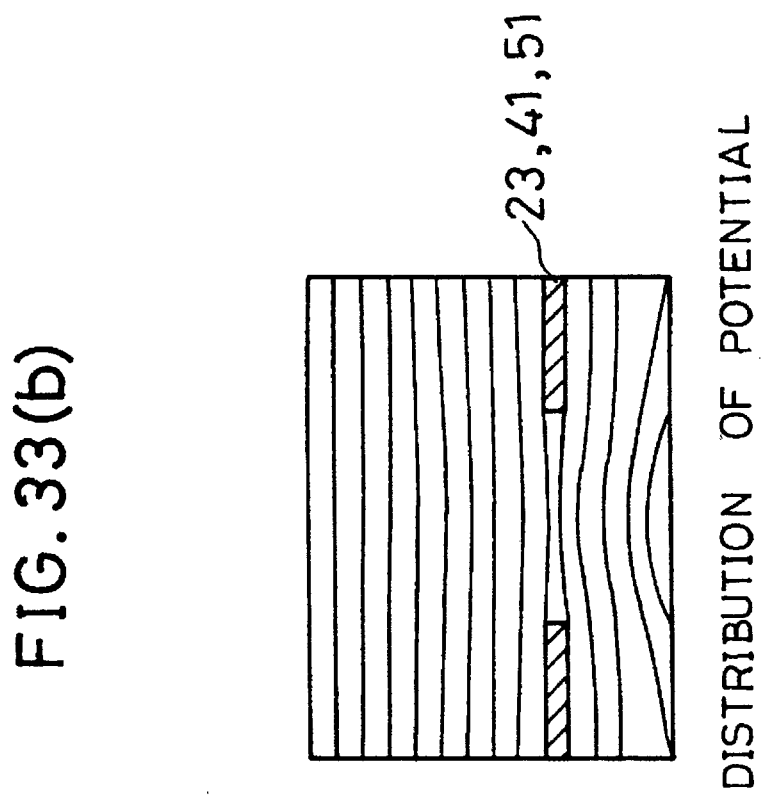
FIG. 33(a) is an explanatory drawing which shows an example of an image forming section without the toner flying stabilization grid.
Figure 33B:
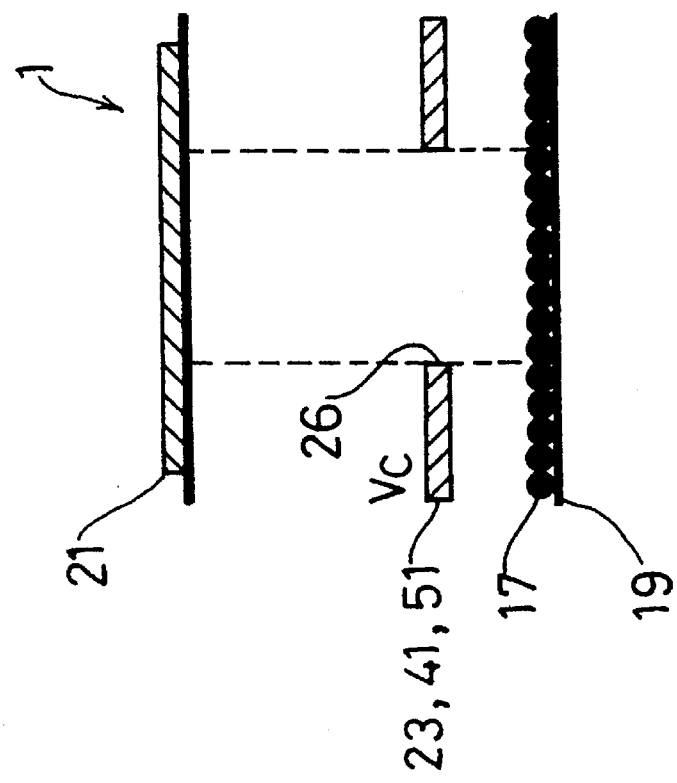
FIG. 33(b) is an explanatory drawing which shows distribution of a potential in the image forming section shown in FIG. 33(a).

Meanwhile, the distance between the control grid 23 and the toner holder 19 is restricted as explained in embodiment 1 in order to satisfactorily control the flying of toner, but allowing for a thickness of the sheet 5, bending of the sheet 5 at the time of carrying, etc., the distance between the control grid 23 and the counter electrode 21 is comparatively set long. Therefore, compared to the flying time of the toner 17 from the toner holder 19 to the control grid 23, the flying time of the toner 17 from the control grid 23 to the counter electrode 21 becomes longer. As a result, as shown in FIG. 33(a), in the case where the toner flying stabilization grid 71 is not provided, the potential of the control grid 23 changes during the flying of the toner 17 from the control grid 23 and the counter electrode 21. As shown in FIG. 33(b), the electric field across the control grid 23 and the counter electrode 21 changes according to the change in the potential. For this reason, the speed of the flying of the toner 17 changes. In this case, irregularity of print dots occur depending upon the carrying speed of the sheet 5 on the counter side on the counter electrode 21 to the toner holder 19, thereby causing a drop in quality of printing.

Figure 34B:
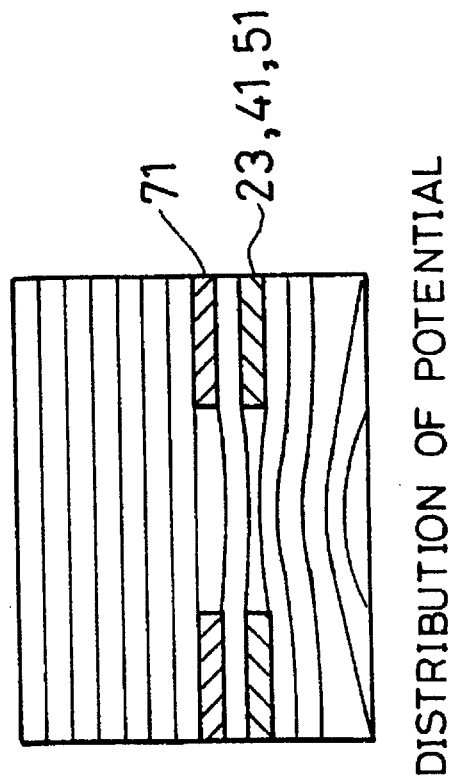
FIG. 34(b) is an explanatory drawing which shows distribution of a potential in the image forming section shown in FIG. 34(a).
Figure 34A:
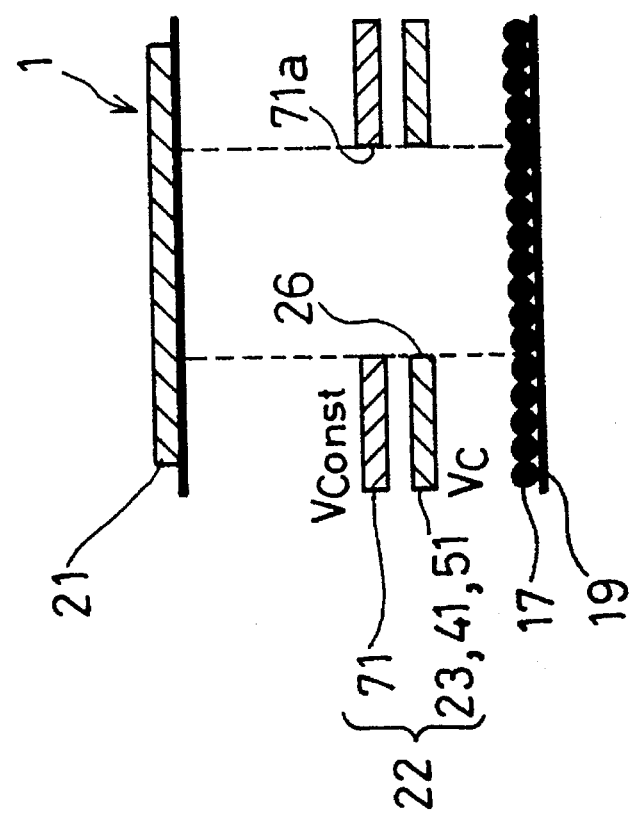
FIG. 34(a) is an explanatory drawing which shows an arrangement of an image forming section which includes the toner flying stabilization grid.

On the contrary, as shown in FIG. 34(a), in the case where the toner flying stabilization grid 71 is provided, and a constant potential for generating the electric field which promotes the flying of toner is given to the toner flying stabilization grid 71, as shown in FIG. 34(b), a change in the electric field across the control grid 23 and the counter electrode 21 due to a change in the potential of the control grid 23 is cancelled by the electric field which promotes the flying of toner. This stabilizes the flying of the toner 17 after the toner 17 has passed through the control grid 23, and the toner 17 reaches the on-moving sheet 5 at a constant flying speed, thereby making it possible to improve the quality of printing.

Here, arrangements other than the above are same as the digital copying machine in embodiments 1 through 3. Furthermore, it may be possible to arrange the image forming section 1 such that the toner flying stabilization grid 71 mentioned in the present embodiment is added to the arrangements of the embodiments 4 and 5.

[Embodiment 7]

The following will discuss still another embodiment of the present invention. Here, for convenience of explanation, those members that have the same arrangement and functions, and that are described in the aforementioned embodiments are indicated by the same reference numerals and the description thereof is omitted.

As shown in FIG. 35, the digital copying machine of the present embodiment is provided with a toner flying stabilization grid 71 on the counter electrode 21 side of a control grid (23, 41 or 51) in an image forming section 1, and a pair of deflecting electrodes 81•81 and a pair of deflecting magnetic poles 82•82 on the counter electrode 21 side of the toner flying stabilization grid 71. A potential is given to the deflecting electrodes 81•81 and the deflecting magnetic poles 82•82 by a power source section 29. Therefore, flying direction deflecting means is composed of the deflecting electrode 81•81 and the power source section 29, and the deflecting magnetic pole 82•82 and the power source section 29 source section 29.

If a direction in which the sheet 5 is carried is a direction of Y, each deflecting electrode 81 is positioned parallel in the outer positions at one end and the other end of the gate 26 positioned in the direction of Y so that the deflecting electrodes 81•81 are opposite to each other at one end and the other end. Moreover, each deflecting magnetic pole 82 is positioned parallel in the outer position of each deflecting electrode 81 so that they are opposite to each other. Further, the gates 26 are placed in staggered fashion.

With the above arrangement, according to magnetism, force F which is given to the particles of the toner 17 to fly is represented by the following formula:

$$\vec{F} = q(\vec{Et} + \vec{Es} + \vec{v} \times \vec{Bs}),$$

where Et is an electric field which is applied from the first between the toner holder 19 and the counter electrode 21 in order to allow the toner 17 to fly from the toner holder 19 to the counter electrode 21, Es is a deflecting electric field by the deflecting electrodes 81•81, Bs is a deflected magnetic field by the deflected magnetic poles 82•82, q is an electric charge of the toner 17 and v is a flying speed of the toner 17.

In addition, a direction of deflection of the toner 17 due to the deflecting electric field Es is Y, whereas a direction of deflection due to the deflecting magnetic field Bs is X which is vertical to a direction Y and a direction Z where the toner 17 flies.

Here, in the digital copying machine adopting the printing system in present embodiment, resolution greatly depends upon a pitch of the gate 26 and the arrangement of a control grid, for example, the control grid 23. Therefore, in order to improve resolution, the pitch of the gate 26 is divided finely, but as mentioned in embodiment 1, the distance between the toner holder 19 and the control grid 23 is prescribed based upon a relationship with the pitch of the gate 26. For this reason, there is limitation of dividing finely the pitch of the gate 26. In other words, the limitation is about 0.2 mm with the current technical skill. Therefore, in the digital copying machine, the gates 26 are arranged in staggered fashion and the flying direction of the toner 17 is deflected so that the resolution is improved.

In the above arrangement, as to the toner 17 which passes through the control grid (23, 41 or 51) and flies towards the counter electrode 21, its flying is stabilized as mentioned above by the electric field by the toner flying stabilization grid 71. Furthermore, the flying direction of the toner 17 is suitably deflected to the direction of Y and the direction of X by the deflecting electric field Es by the deflecting electrodes 81•81 and the deflecting magnetic field Bs by the deflecting magnetic poles 82•82. In this case, the deflection can be controlled by stabilization by means of the electric field of the toner flying stabilization grid 71.

In the above control, the deflection cannot be controlled per gate 26, but when passing the deflecting electrodes 81•81 and the deflecting magnetic poles 82•82, all the toner 17 is simultaneously deflected, and dots can be formed by the toner 17 at more fine pitch than that of the gate 26. Therefore, the resolution can be improved and an image of good quality can be obtained.

In addition, in the case where the line of the gate 26 in the carrying direction of the sheet 5 does not exist for the whole length of the sheet 5, an image is formed by the toner 17 while the sheet 5 is being carried. In this case, when the carrying direction of the sheet 5 is the direction of Y, a relative speed exists in the direction of Y between the flying toner 17 and the sheet 5. For this reason, a configuration of dots to be printed becomes elliptic when a configuration of dots to be printed in a stationary state of the sheet 5 is circular and becomes rectangular when square.

With regard to this point, in the digital copying machine, since the configuration of the dots to be printed on the on-carrying sheet 5 can be determined by the strength of the deflecting electric field Es, the relative speed between the toner 17 and the sheet 5 can be set to 0 by adjusting an amount of deflection in the direction of Y with respect to the flying toner 17. Therefore, even in the case where printing is executed while the sheet 5 is being carrying, the printing can be executed with the configuration of the dots to be printed in a stationary state of the sheet 5.

In addition, in the case where the flying toner 17 is deflected toward the direction of X, the resolution can be improved by decreasing the pitch in the direction of X of the dots, and the dot forming position is vibrated towards the direction of X by changing the strength of the deflecting magnetic field Bs for a short time so that a size of the dots in the direction of X can be changed according to the amplitude of the vibration.

Here, in the present embodiment, the deflecting electric field Es and the deflecting magnetic field Bs are applied to the direction of Y, but the following deflection controls can be also made by suitably changing the arrangements of the deflecting electrodes 81·81 and the deflecting magnetic poles 82·82.

The deflecting electric field Es is applied to the direction of Y and the deflecting magnetic field Bs is applied to the direction of X.

In this case, the toner 17 which flies to the direction of Z is deflected to the direction of Y by the deflecting electric field Es in the direction of Y, and the toner 17 which flies to the direction of Z is deflected to the direction of Y by the deflecting magnetic field Bs in the direction of X. Namely, in this case, the deflecting directions by the deflecting electric field Es and the deflecting magnetic field Bs are same, so if the carrying direction of the sheet 5 is the direction of Y, the toner 17 can be greatly deflected to the carrying direction of the sheet 5 by the deflecting electric field Es and the deflecting magnetic field Bs.

The deflecting electric field Es is applied to the direction of X and the deflecting magnetic field Bs is applied to the direction of Y.

In this case, the toner 17 which flies to the direction of Z is deflected to the direction of X by the deflecting electric field Es in the direction of X, and the toner 17 which flies to the direction of Z is deflected to the direction of X by the deflecting magnetic field Bs in the direction of Y. In this case, the deflecting directions by the deflecting electric field Es and the deflecting magnetic field Bs are same, so the toner 17 can be greatly deflected to the direction of X by the deflecting electric field Es and the deflecting magnetic field Bs.

The deflecting electric field Es and the deflecting magnetic field Bs are applied to the direction of X.

In this case, the toner 17 which flies to the direction of Z is deflected to the direction of X by the deflecting electric field Es in the direction of X, and the toner 17 which flies to the direction of Z is deflected to the direction of Y by the deflecting magnetic field Bs in the direction of X. In this case, the deflecting directions of the toner 17 are the same direction mentioned in the above embodiment.

In addition, in the above explanation, both of the deflecting electrodes 81·81 and the deflecting magnetic poles 82·82 are used, but an arrangement that one of them is provided may be adopted as the need arises.

In addition, the arrangements other than the above are same as of the digital copying machine mentioned in embodiments 1 through 3. Moreover, the arrangement mentioned in the present embodiment can be added to the arrangement mentioned in embodiments 4 through 5 so as to constitute the image forming section 1.

[Embodiment 8]

The following will discuss still another embodiment of the present invention referring to FIG. 36. Here, for convenience of explanation, those members that have the same arrangement and functions, and that are described in the aforementioned embodiments are indicated by the same reference numerals and the description thereof is omitted.

As shown in FIG. 36, the digital copying machine of the present embodiment includes a board-like counter electrode 91 having a toner passing hole 91a as a developing particle passing hole instead of the counter electrode 21, and a sheet carrying guide 92 in the flying direction side of the toner 17 on the counter electrode 91. Therefore, in the digital copying machine, the sheet 5 is carried along the sheet carrying guide 92 between the counter electrode 91 and the sheet carrying guide 92, and the toner 17 which has flown from the toner holder 19 passes through the counter electrode 91 through the toner passing hole 91a so as to further fly. The toner 17 reaches the sheet 5 and an image is formed on the sheet 5.

The configuration of the counter electrode 91 can be same as that of the toner flying stabilization grid 72 shown in FIG. 32 of embodiment 7, for example. In this case, the toner passing hole 91a of the counter electrode 91 is provided in a counter position to the gate 26 of the control grid (23, 41 or 51), and allowing for deflection of the flying direction of the toner 17, etc., the toner passing hole 91a is set so as to have a bigger diameter than that of the gate 26. Moreover, a voltage to be applied to the counter electrode 91 is same as that mentioned in each aforementioned embodiment.

With the above arrangement, since the sheet 5 is placed in an opposite position to the toner holder 19 of the counter electrode 91, distribution of potential between the toner holder 19 and the counter electrode 91, namely an electric field is not influenced by electromagnetic properties of the sheet 5. Moreover, the toner 17 which has passed through the counter electrode 91 is hardly influence by the electric field between the toner holder 19 and the counter electrode 91. Therefore, the flying of the toner can be controlled satisfactorily and stably.

In addition, with the above arrangement, since the flying of the toner 17 is not influenced by electromagnetic properties of the sheet 5, various kinds of recording medium can be used as the sheet 5. For example, the back of an envelope, etc. whose surface is rough and uneven, metallic foil, etc. whose volume resistivity is low, and high-humidity paper, etc. can be used.

Here, in the above embodiment, the counter electrode 91 having a board-like configuration is used, but it may have a mesh arrangement. The position of the toner passing hole 91a is not particularly limited as long as it does not prevent the toner 17 from flying. Furthermore, the configuration of the sheet carrying guide 92 is not limited to a board-like one, so it may be any configuration which is suited for carrying sheets, such as an arc or a cylindrical configuration.

In addition, the arrangements other than the above are same as that of the digital copying machine in embodiments 1 through 3. Moreover, the arrangement mentioned in the present embodiment can be added to the arrangements mentioned in embodiments 4 through 7 so as to constitute the image forming section 1.

[Embodiment 9]

Figure 37:
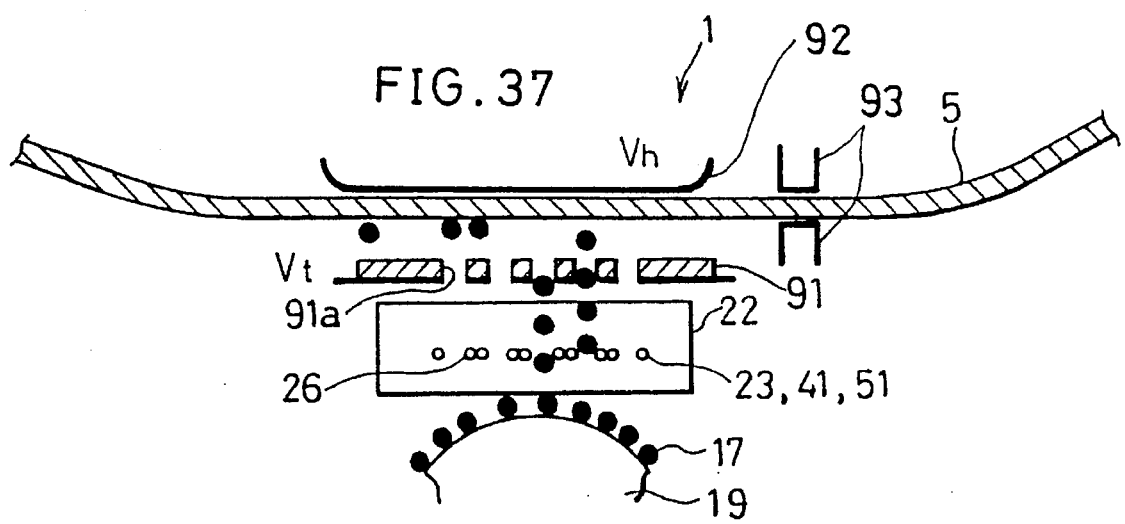
FIG. 37 is an explanatory drawing which shows an arrangement of an image forming section in a digital copying machine of still another embodiment of the present invention.

The following will discuss still another embodiment of the present invention referring to FIG. 37. Here, for convenience of explanation, those members that have the same arrangement and functions, and that are described in the aforementioned embodiments are indicated by the same reference numerals and the description thereof is omitted.

As shown in FIG. 37, in the digital copying machine of the present embodiment, a potential for generating an electric field which stabilizes the flying of the toner 17 is given to a sheet carrying guide 92 as a developing particle flying stabilization electrode in the image forming section 1 shown in FIG. 36 in the digital copying machine of the embodiment 8. The potential generates at least an electric field having a same direction as an electric field which exists between a control grid (23, 41 or 51) and the counter electrode 91, and it is same as the potential given to the counter electrode 91, for example. In the present embodiment, in the case where Vt is a counter electrode potential and Vh is a sheet carrying guide potential, the relationship between them is set as Vt<Vh. The potential is given to the sheet carrying guide 92 by the power source section 29. Moreover, in the digital copying machine of the present embodiment, a pair of up and bottom sheet carrying specific guide 93 for further stabilizing the carrying of the sheet 5 are provided on the side of the sheet carrying guide 92.

With the above arrangement, the sheet 5 is guided to the counter surface of the sheet carrying guide 92 to the counter electrode 91 by the sheet carrying specific guide 93, and guided by the sheet carrying guide 92 so as to be carried. Moreover, the toner 17, which has flown from a toner holder 19 to the counter electrode 91 and has passed through a toner passing hole 91a of the counter electrode 91, flies towards the sheet 5.

At this time, in the case where the the sheet carrying guide potential Vh is not given to the sheet transferring guide 92, since the toner 17 which has passed through the counter electrode 91 flies with only force of inertia, the flying is liable to be unstable. Therefore, if an electric field having an opposite direction to that of an electric field which exists between the control grid (23, 41 or 51) and the counter electrode 91 is applied, a flying trail of the toner 17 is greatly disturbed.

On the contrary, in the digital copying machine of the present embodiment, the sheet carrying guide potential Vh is given to the sheet carrying guide 92, and an electric field having the same direction as that of the electric field existing between the control grid (23, 41 or 51) and the counter electrode 91, exists between the counter electrode 91 and the sheet carrying guide 92. Therefore, the toner 17 flies stably towards the sheet 5. This makes it possible to obtain an image of good quality. The other arrangements are same as those mentioned in embodiment 8.

In addition, the arrangement other than the above is same as of the digital copying machine in embodiments 1 through 3. Moreover, the arrangement mentioned in the present embodiment can be added to those in embodiments 4 through 7 so as to constitute the image forming section 1.

[Embodiment 10]

Figure 38:
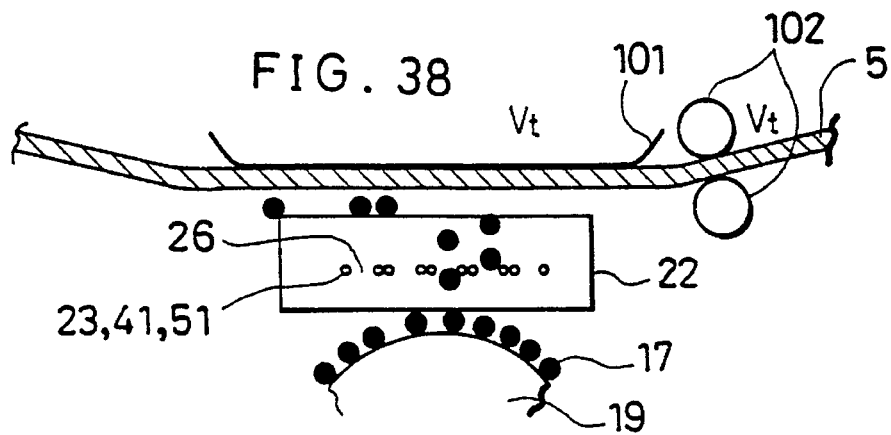
FIG. 38 is an explanatory drawing which shows an arrangement of an image forming section in a digital copying machine of still another embodiment of the present invention.
Figure 39:
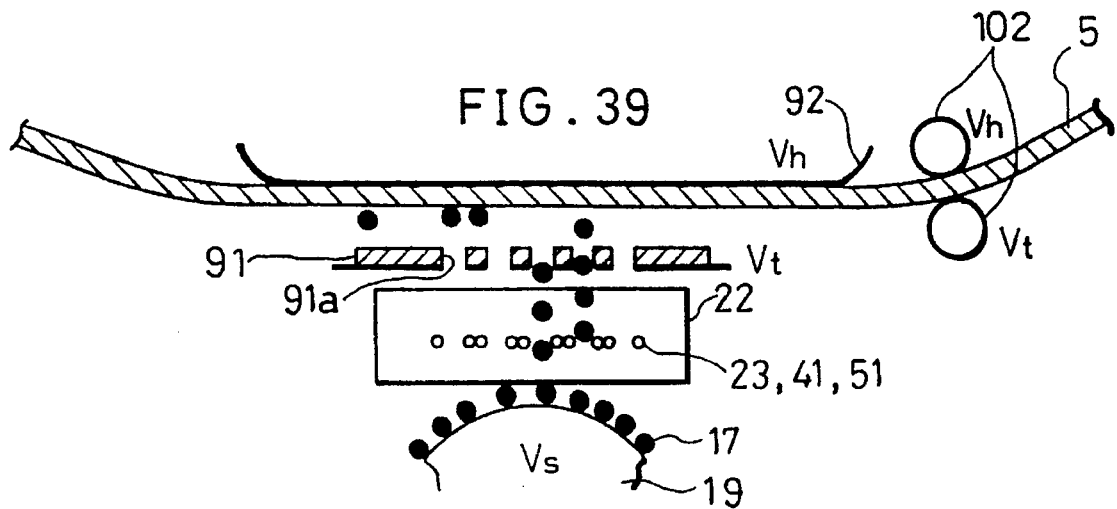
FIG. 39 is an explanatory drawing which shows an arrangement of an image forming section in a digital copying machine of still another embodiment of the present invention.

The following will discuss still another embodiment of the present invention referring to FIG. 38. Here, for convenience of explanation, those members that have the same arrangement and functions, and that are described in the aforementioned embodiments are indicated by the same reference numerals and the description thereof is omitted.

As shown in FIG. 38, the digital copying machine of the present embodiment includes a counter electrode 101 having a function as a sheet carrying guide instead of the counter electrode 21 in the image forming section 1 of the digital copying machine mentioned in embodiments 1 through 3. Therefore, a sheet 5 is carried along the counter surface of the counter electrode 101 to a toner holder 19. Furthermore, the digital copying machine of the present embodiment includes a pair of charging rollers 102•102 for injecting a charge into the sheet 5.

A potential which generates at least an electric field having a same direction as that of an electric field existing between a control grid (23, 41 or 51) and the counter electrode 101 is supplied to one charging roller 102 as recording medium potential giving means which is pressed against the counter electrode 101 side of the sheet 5 of the both charging rollers 102•102. In the present embodiment, a potential, which is same as the counter electrode potential Vt given to the counter electrode 101, is supplied to the charging roller 102. Meanwhile, for example, an appropriate potential between the potential of the toner holder 19 and the counter electrode potential Vt is given to the other charging roller 102. Here, the potential does not have to be given to this charging roller 102. The potentials are given to the counter electrode 101 and the charging roller 102 by the power source section 29.

With the above arrangement, a charge is injected into the back of the sheet 5 to be carried to an image forming position which is a counter surface of the counter electrode 101 to the toner holder 19 by the charging rollers 102•102. As a result, a potential for generating an electric field having the same direction as that of an electric field existing between the control grid (23, 41 or 51) and the counter electrode 101 is supplied to the back of the sheet 5. Therefore, after the sheet 5 on which the toner image has been formed passes through the counter electrode 101, the toner 17 is surely maintained by the charge injected into the sheet 5 even while the sheet 5 is being carried to a fixing section 10 shown in FIG. 3. This prevents deterioration of image quality due to falling of the toner 17 from the sheet 5.

In other words, if a charge is not injected into the sheet 5 by the charging roller 102, force for holding the toner 17, which flew from the toner holder 19 to the counter electrode 101, on the sheet 5 is generated by the electric field existing between the control grid (23, 41 or 51) and the counter electrode 101. Therefore, in the case where the sheet 5 having high resistance is carried outside the range of the electric field, the force for holding the toner 17 on the sheet 5 might be lost. Therefore, like the digital copying machine of the present embodiment, if a charge is preliminarily injected into the sheet 5 by the charging roller 102, even in the case where the sheet 5 is carried outside the range of the electric field, the force for holding the toner 17 on the sheet 5 is maintained, and the deterioration of image quality due to falling of toner can be prevented.

Here, in the present embodiment, a charge is injected into the sheet 5 by the charging roller 102, but the counter surface of the counter electrode 101 to the sheet 5 is not insulated so that a charge can be injected into the sheet 5 from the counter electrode 101. In this case, it is unnecessary to supply a potential to the charging roller 102.

In addition, the arrangements other than the above are same as those of the digital copying machine of embodiments 1 through 3. Moreover, the arrangement of the present embodiment can be added to the arrangements of embodiments 4 through 7 so as to constitute the image forming section 1.

[Embodiment 11]

The following will discuss still another embodiment of the present invention. Here, for convenience of explanation, those members that have the same arrangement and functions, and that are described in the aforementioned embodiments are indicated by the same reference numerals and the description thereof is omitted.

The digital copying machine of the present embodiment includes charging rollers 102·102 shown in FIG. 38 instead of the sheet carrying specific guide 93 in the image forming section 1 shown in FIG. 37 of embodiment 9. A carrying guide potential Vh, which is higher than a counter electrode potential Vt to be given to the counter electrode 91 and is same as a potential to be given to the sheet carrying guide 92, is supplied to the charging roller 102 (recording medium potential giving means), which is pressed against the sheet carrying guide 92 side of the sheet 5 of the charging rollers 102·102. Meanwhile, the counter electrode potential Vt is given to the other charging roller 102 on the opposite side to the charging roller 102. The above setting of the potentials generates an electric field having a same direction as that of an electric field existing between a control grid (23, 41 or 51) and the counter electrode 91 between the counter electrode 91 and the sheet carrying guide 92. Meanwhile, a charge is injected into the sheet 5 based upon a potential difference between the sheet carrying guide potential Vh and the counter electrode potential Vt. Further, each potential is given by the power source section 29.

As mentioned above, with the above arrangement, a charge is preliminarily injected to the sheet 5 by the charging rollers 102·102, and the toner 17 which has passed through the counter electrode 91 flies towards the sheet 5 in a stable state by means of the electric field generated by the sheet carrying guide potential Vh given to the sheet carrying guide 92 so as to adhere to the sheet 5. The toner 17 which adhered to the sheet 5 is maintained without falling at the time of subsequent carrying of the sheet 5 by the charge, which has been injected to the sheet 5 by the charging rollers 102·102, as mentioned in embodiment 10.

In addition, the arrangements other than the above are same as those of the digital copying machine in embodiments 1 through 3. Moreover, the arrangement of the present embodiment can be added to those of embodiments 4 through 7 so as to constitute the image forming section 1. The example of this arrangement is shown in FIG. 40.

With this arrangement, the flying of the toner 17 from the toner holder 19 through the gate 26 towards the counter electrode 91 is controlled by the potential of the control grid 51 which is counter to the potential across the toner holder 19 and the counter electrode 91. At this time, adhesion of the toner 17 to the control grid 51 is prevented by a toner antisticking grid 62, so the flying of the toner 17 which passed through the control grid 51 is made stable by a toner flying stabilization grid 71 and is suitably deflected to the direction of Y and the direction of X by the deflecting electrode 81·81 and the deflecting magnetic pole 82·82. Thereafter, the toner 17 passes through the counter electrode 91 and adheres to the sheet 5 which has been carried by the sheet carrying guide 92. At this time, the flying of the toner 17 which passed through the counter electrode 91 is made stable by the electric field generated by giving the potential to the sheet carrying guide 92. Moreover, the toner 17 which has adhered to the sheet 5 is surely held on the sheet 5 by the charge, which has been supplied to the sheet 5 by the charging roller 102, and is carried to a fixing section 10.

[Embodiment 12]

Figure 41:
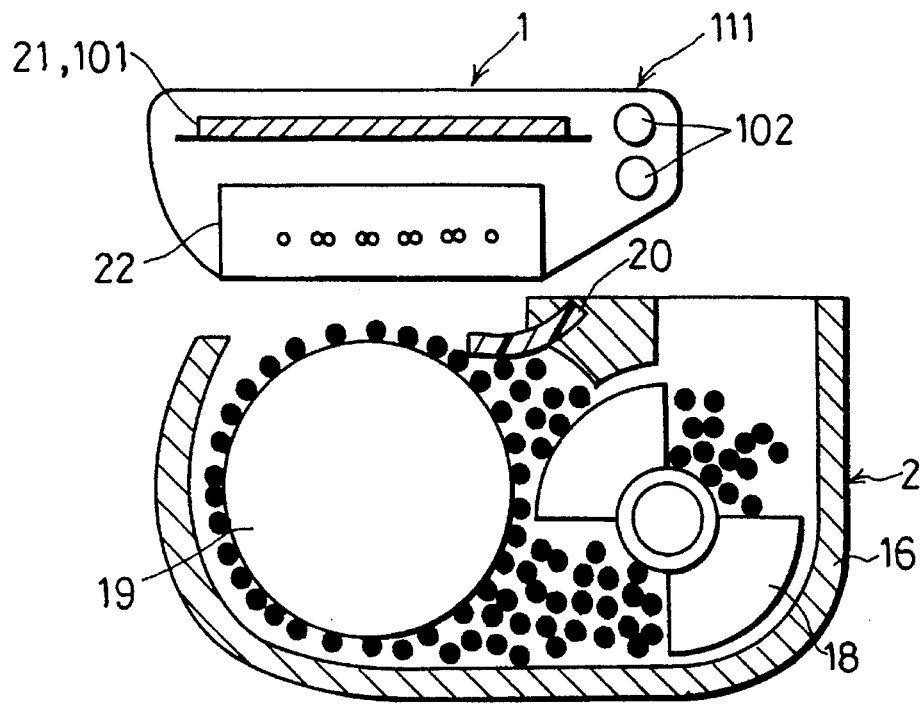
FIG. 41 is an explanatory drawing which shows an arrangement of an image forming section in a digital copying machine of still another embodiment of the present invention.
Figure 42:
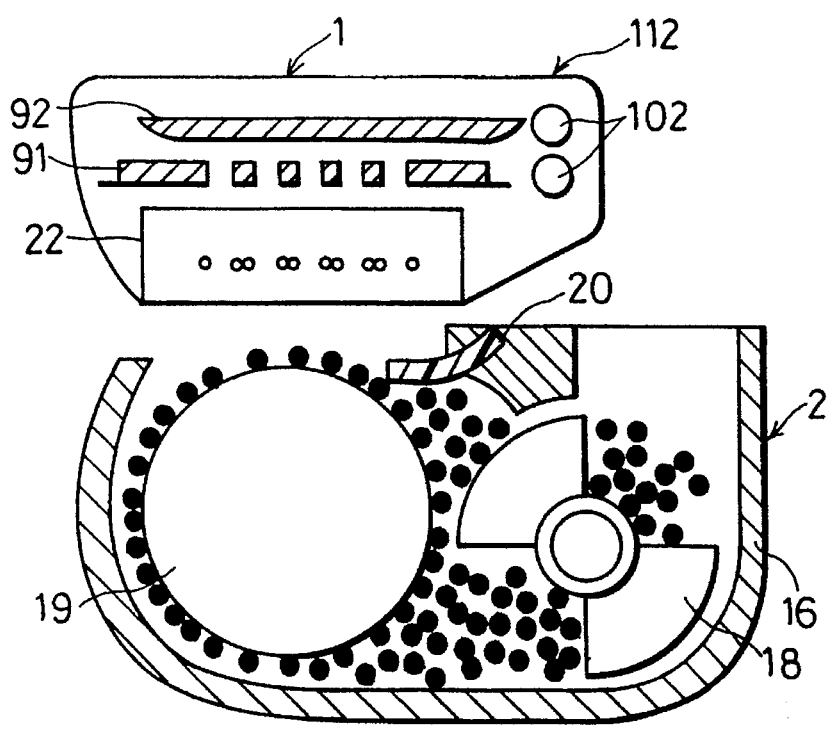
FIG. 42 is an explanatory drawing which shows another example of the image forming section shown in FIG. 41.
Figure 43:
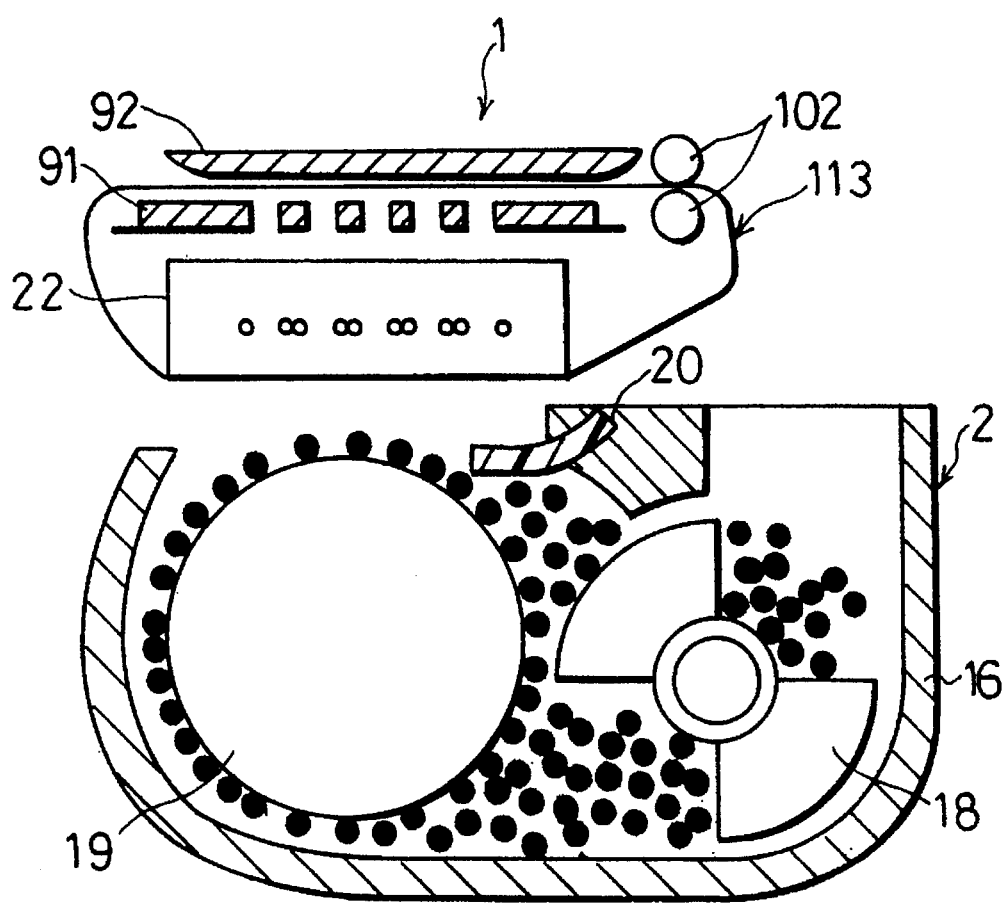
FIG. 43 is an explanatory drawing which shows still another example of the image forming section shown in FIG. 41.

The following will discuss still another embodiment of the present invention referring to FIGS. 41 through 43. Her, fore convenience of explanation, those members that have the same arrangement and functions, and that are described in the aforementioned embodiments are indicated by the same reference numerals and the description thereof is omitted.

As shown in FIG. 41, the digital copying machine of the present embodiment includes a print head unit 111 which is composed of a print head 22 and a counter electrode (21 or 101) shown in embodiments 1 through 11. Here, the print head unit 111 also includes the charging roller 102.

With this arrangement, even when the print head 22 and the counter electrodes 21·101 are installed to and removed from the copying machine, a positional relation between the electrodes in the print head 22 and a positional relation between the print head 22 and the counter electrodes 21·101 do not change. Therefore, distribution of the potentials and electric fields do not change in the print head 22 and between the print head 22 and the counter electrode 21·101. As a result, even in the case where the print head 22 and the counter electrode 21·101 are installed to and removed from the copying machine for maintenance, for example, an excellent image forming function can be maintained.

In other words, as mentioned in each embodiment, in order to form an image of good quality, distribution of the potential in the vicinity of the print head 22 is very important, so if the distribution of the potential is deviated from a set value, there arises problems that the toner 17 does not fly and on the contrary, the toner flies to an unnecessary portion. Therefore, it is necessary to prevent the distribution of the potential in the vicinity of the print head 22 from being deviated from the set value in the image forming section 1.

Meanwhile, in the digital copying machine of the present embodiment, there exists a grave problem that the control grid (23, 41 or 51) in the print head 22 becomes dirty and is clogged by the toner 17. If the dirt and the clogging occur, it is necessary to clean the control grid (23, 41 or 51). Moreover, if the print head 22 is not cleaned, it is desirable to replace only the print head 22 from a point of good use of resources. This requires the arrangement that the print head 22 is easily installed to and removed from a copying machine.

The digital copying machine of the present embodiment includes the print head unit 111 so that even if the print head 22 is installed to and removed from the digital copying machine, the positional relation between the electrodes in the print head 22 and the positional relation between the print head 22 and the counter electrodes 21·101 do not change, the distribution of the potential in the vicinity of the print head 22 is not deviated from the set value, and the cleaning process is easily executed.

In addition, in the arrangement shown in FIG. 41, the sheet 5 is guided to be carried on the counter surface of the counter electrodes 21·101 to the toner holder 19. Meanwhile, in the case where the counter electrode 91 having the toner passing hole 91a and the sheet carrying guide 92 are provided instead of the counter electrodes 21·101, as shown in FIGS. 42 and 43, they can be arranged so as to have a print head unit 112 or a print head unit 113.

The print head unit 112 is composed of the print head 22, the counter electrode 91, the sheet carrying guide 92 and the charging roller 102. Moreover, the print head unit 113 is composed of the print head 22, the counter electrode 91 and the one of the charging rollers 102. The function of the above arrangements is same as that of the arrangement shown in FIG. 41.

Figure 44:
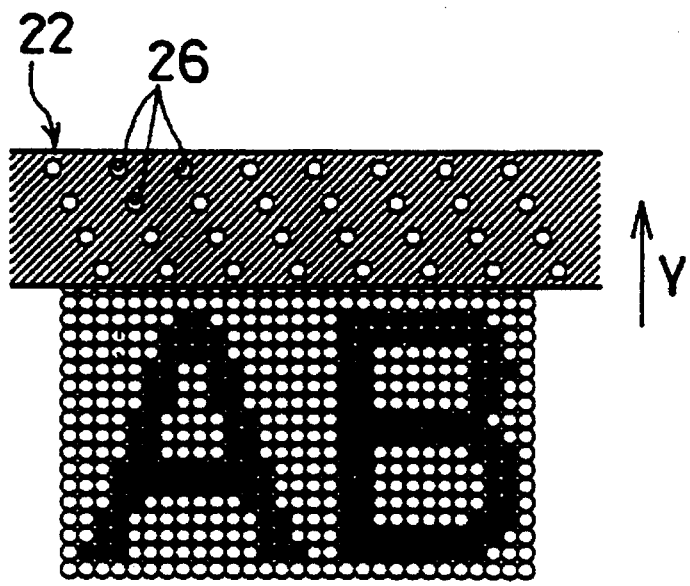
FIG. 44 is an explanatory drawing which shows a printing example by the digital copying machine of the present invention and a print head which is used for the printing.
Figure 45:
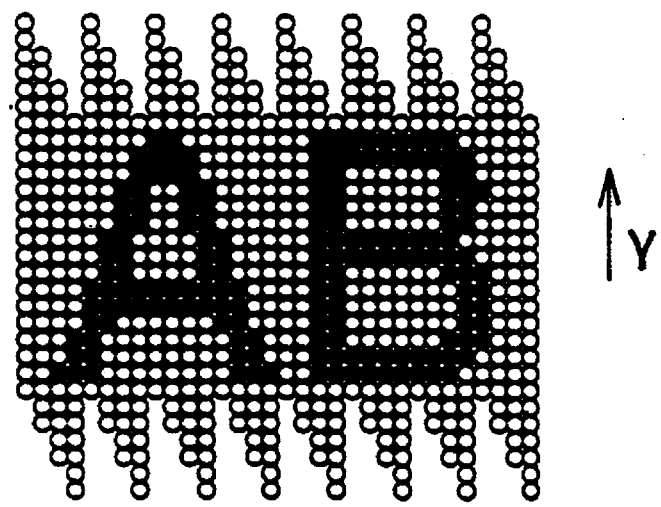
FIG. 45 is an explanatory drawing which shows a state of finished printing in the printing example.

Here, examples of printing by the digital copying machine of the present embodiment are shown in FIGS. 44 through 51. The print head 22 shown in FIG. 44 is used for the printing. The print head 22 have the gates 26 which are arranged such that each four of the gates form a line in the carrying direction of sheets (the direction of Y), and each gate 26 is provided in a staggered fashion. Therefore, in the data processing section 35, the image data which have been processed in the image forming control section 34 are divided so as to make four lines according to the lines of the gates 26. Here, characters A and B are printed, and its print is shown in FIG. 45.

Figure 46:
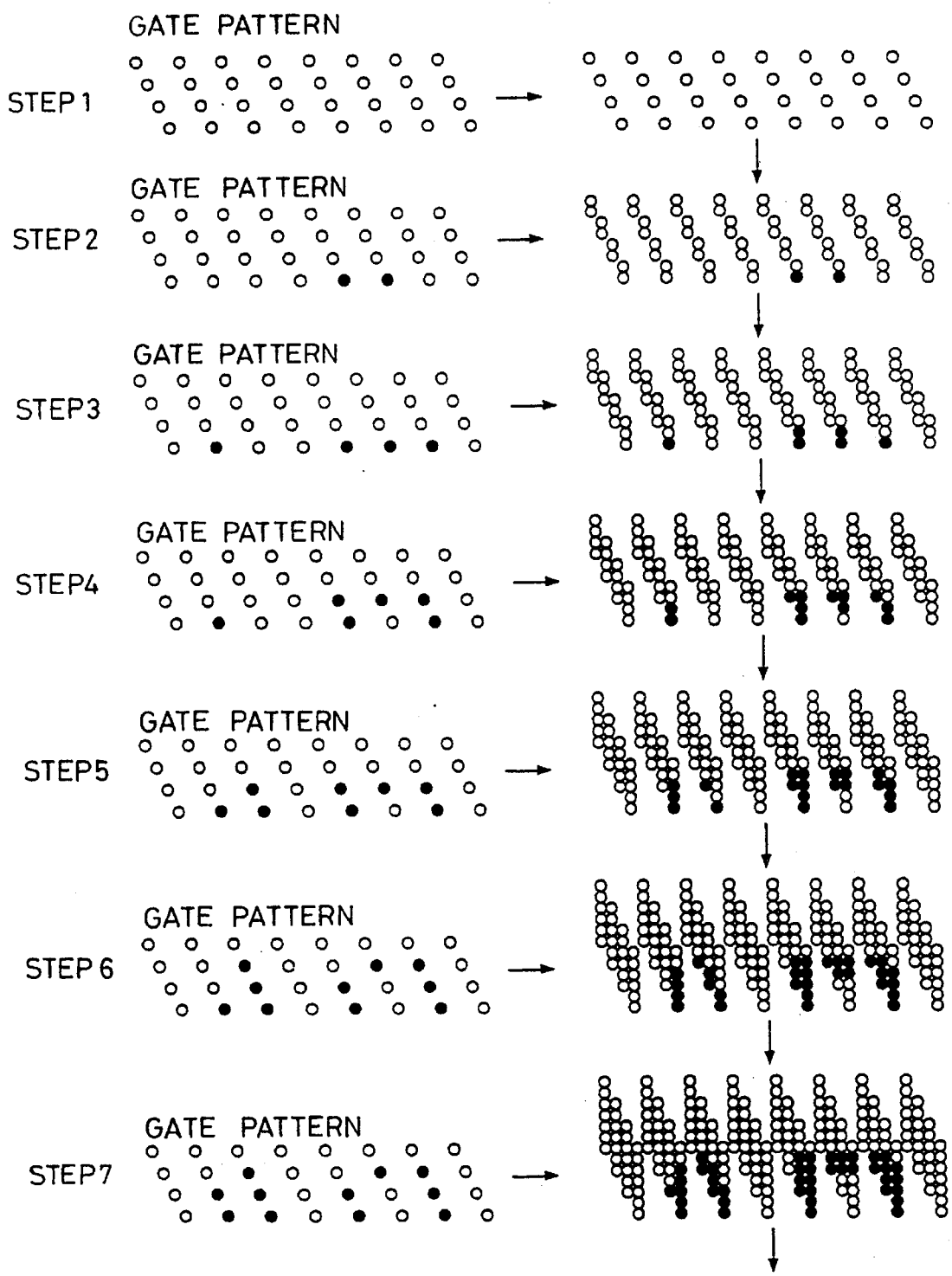
FIG. 46 is an explanatory drawing which shows a printing operation in the printing example by using the print head.
Figure 47:
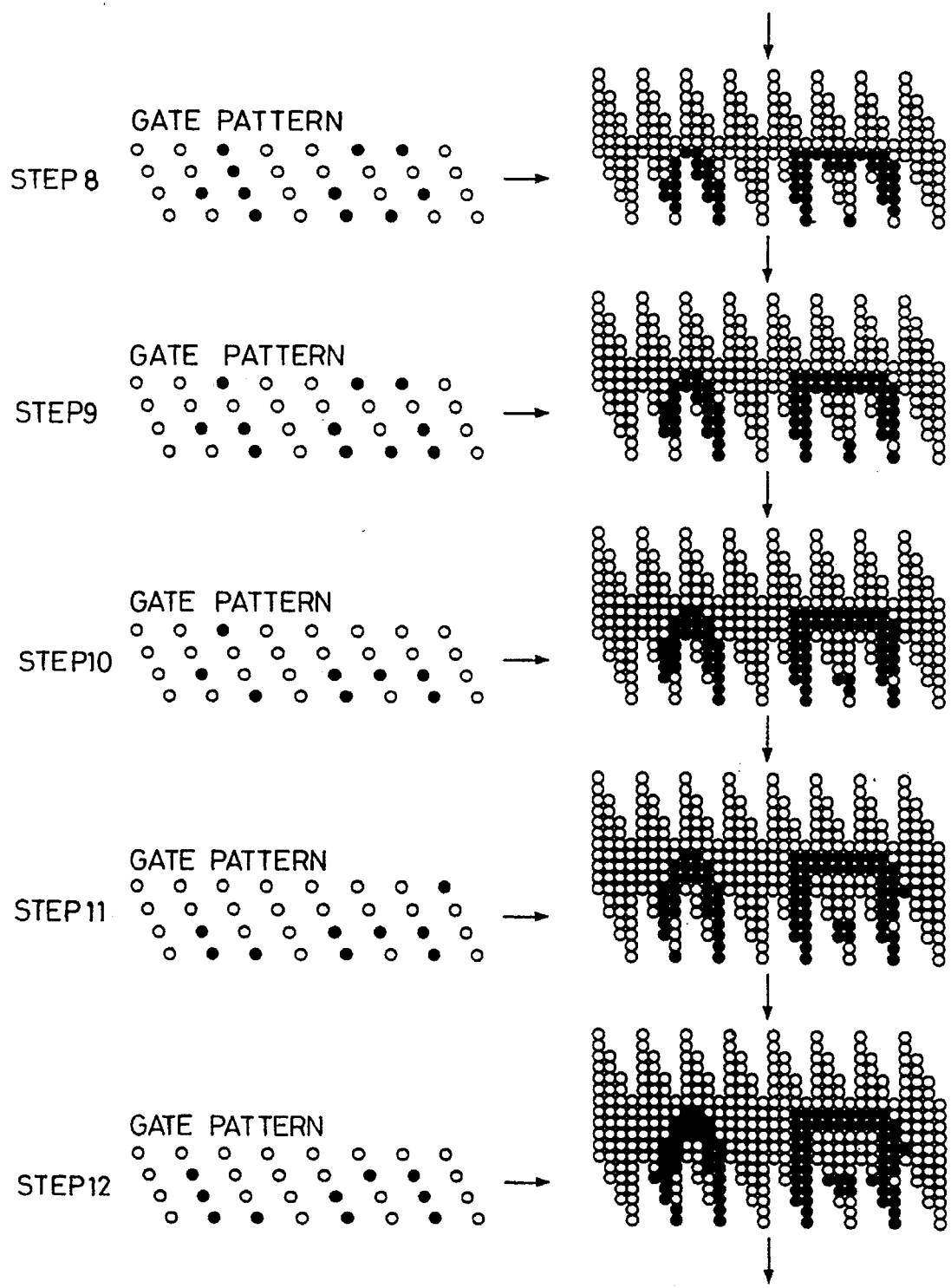
FIG. 47 is an explanatory drawing of a printing operation successively after the operation in FIG. 46.
Figure 48:
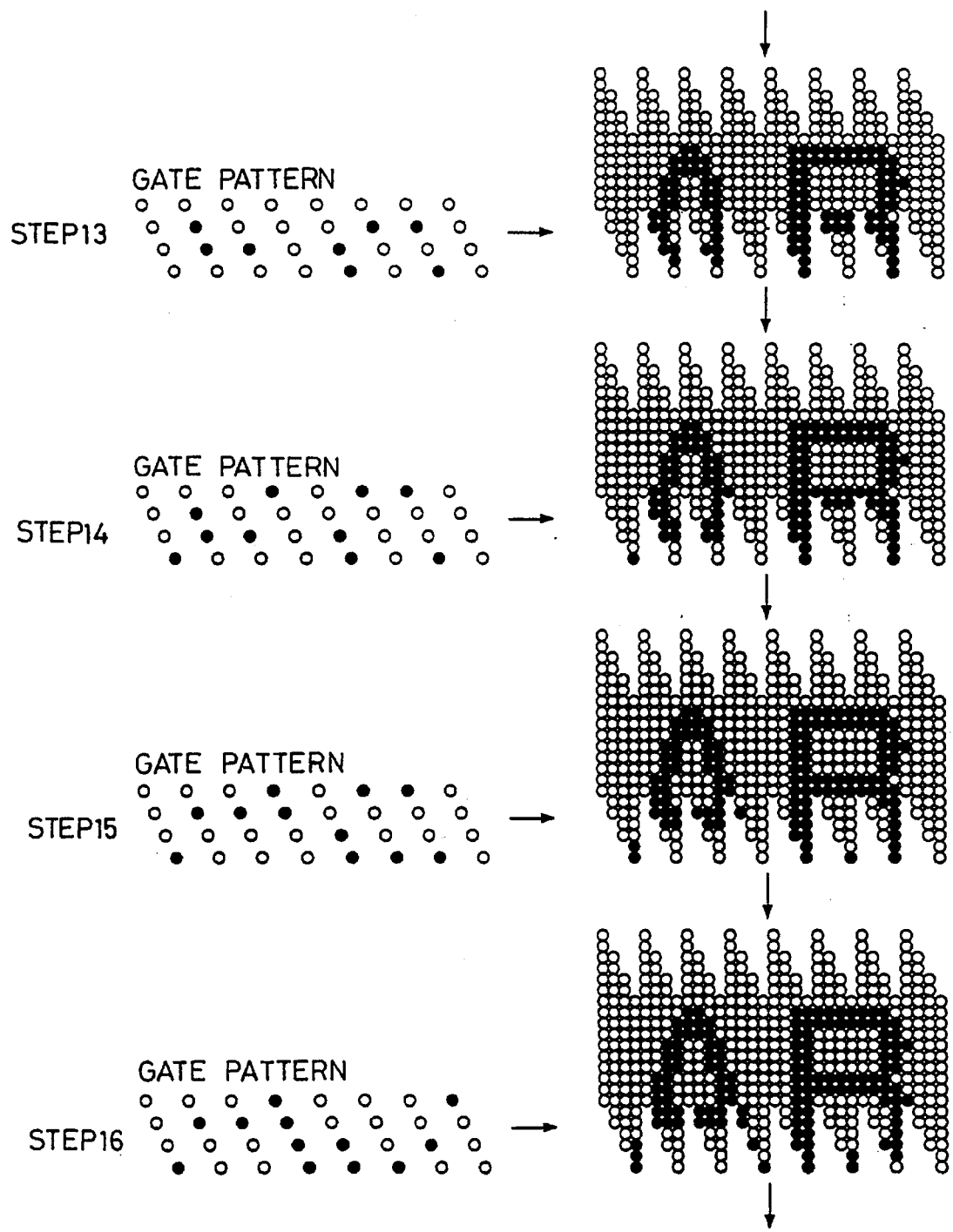
FIG. 48 is an explanatory drawing of a printing operation successively after the operation in FIG. 47.
Figure 49:
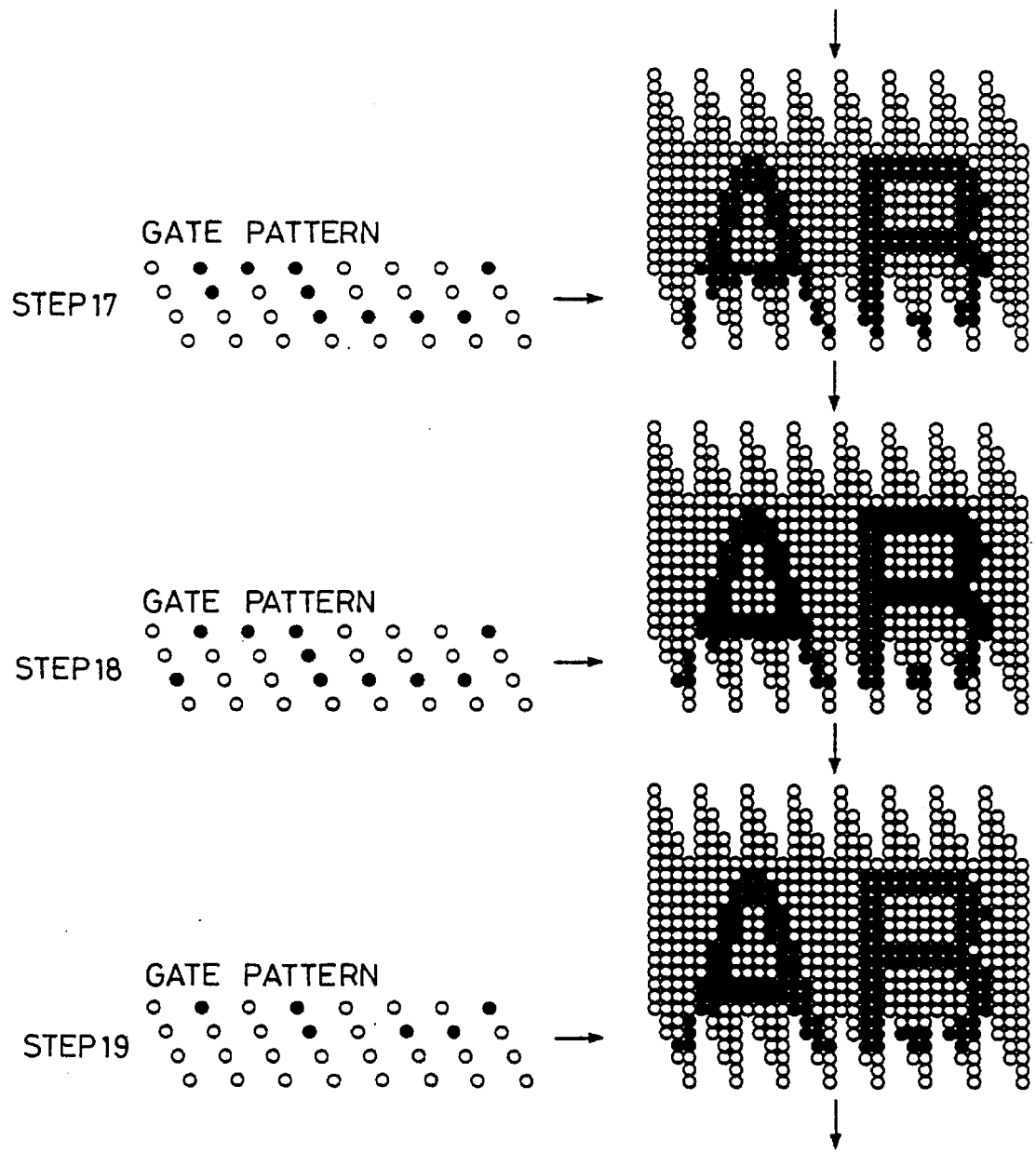
FIG. 49 is an explanatory drawing of a printing operation successively after the operation in FIG. 48.
Figure 50:
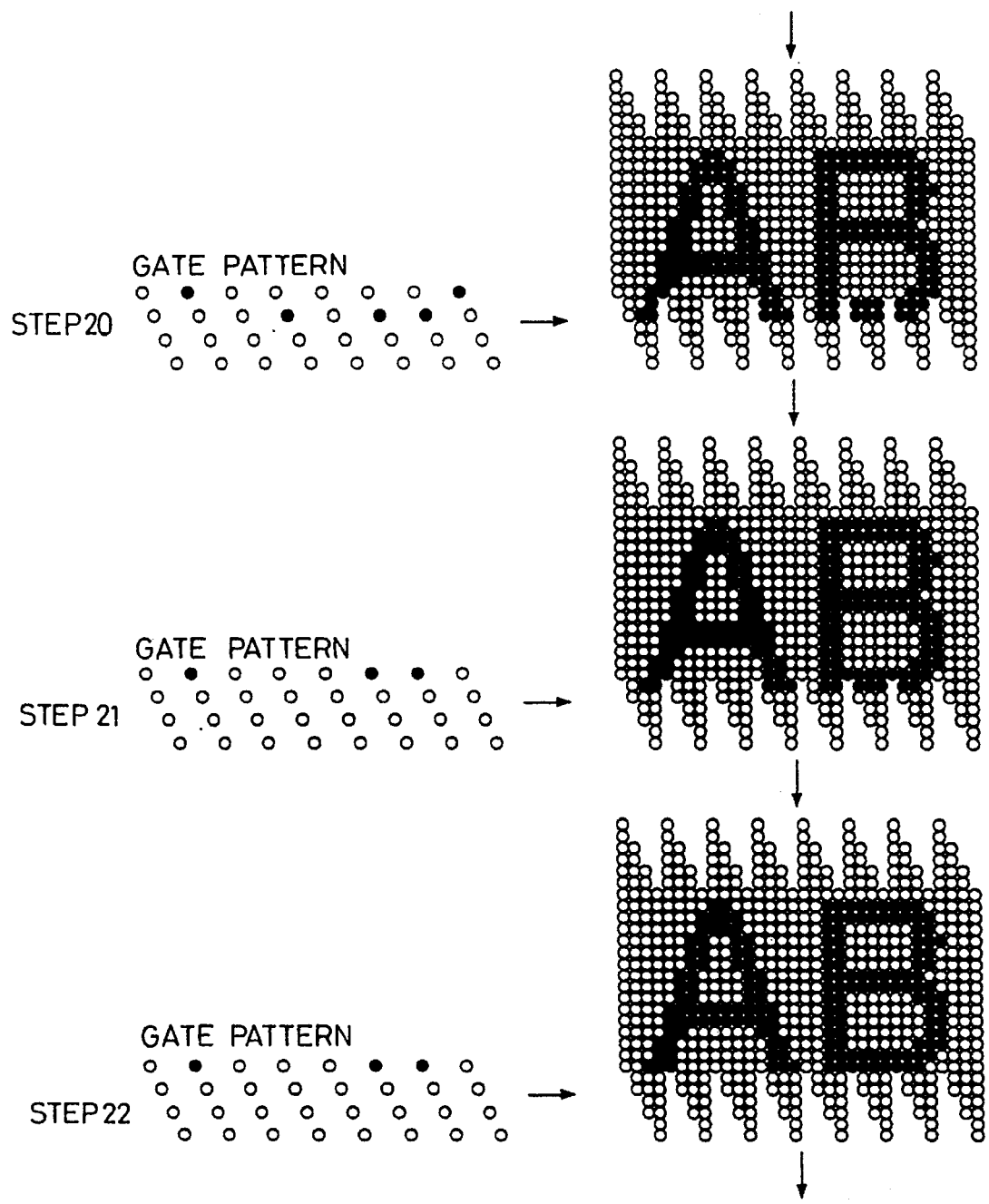
FIG. 50 is an explanatory drawing of a printing operation successively after the operation in FIG. 49.
Figure 51:
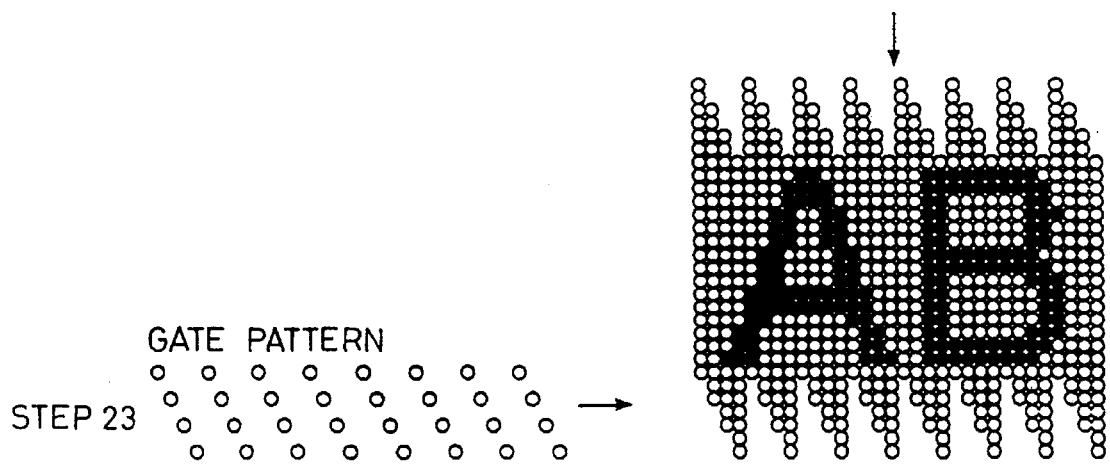
FIG. 51 is an explanatory drawing of a printing operation successively after the operation in FIG. 50.

During printing, at the step 1 shown in FIG. 46, dots are not formed at all in the gates 26 on four lines, and at the step 2, dots are formed in the gate of the first line. An amount of feeding the sheet 5 per step is for a diameter of one dot. Then, after the steps shown in FIGS. 46 through 51 proceed, the printing is completed.

[Embodiment 13]

The following will discuss still another embodiment of the present invention referring to FIGS. 52 through 91.

Figure 52:
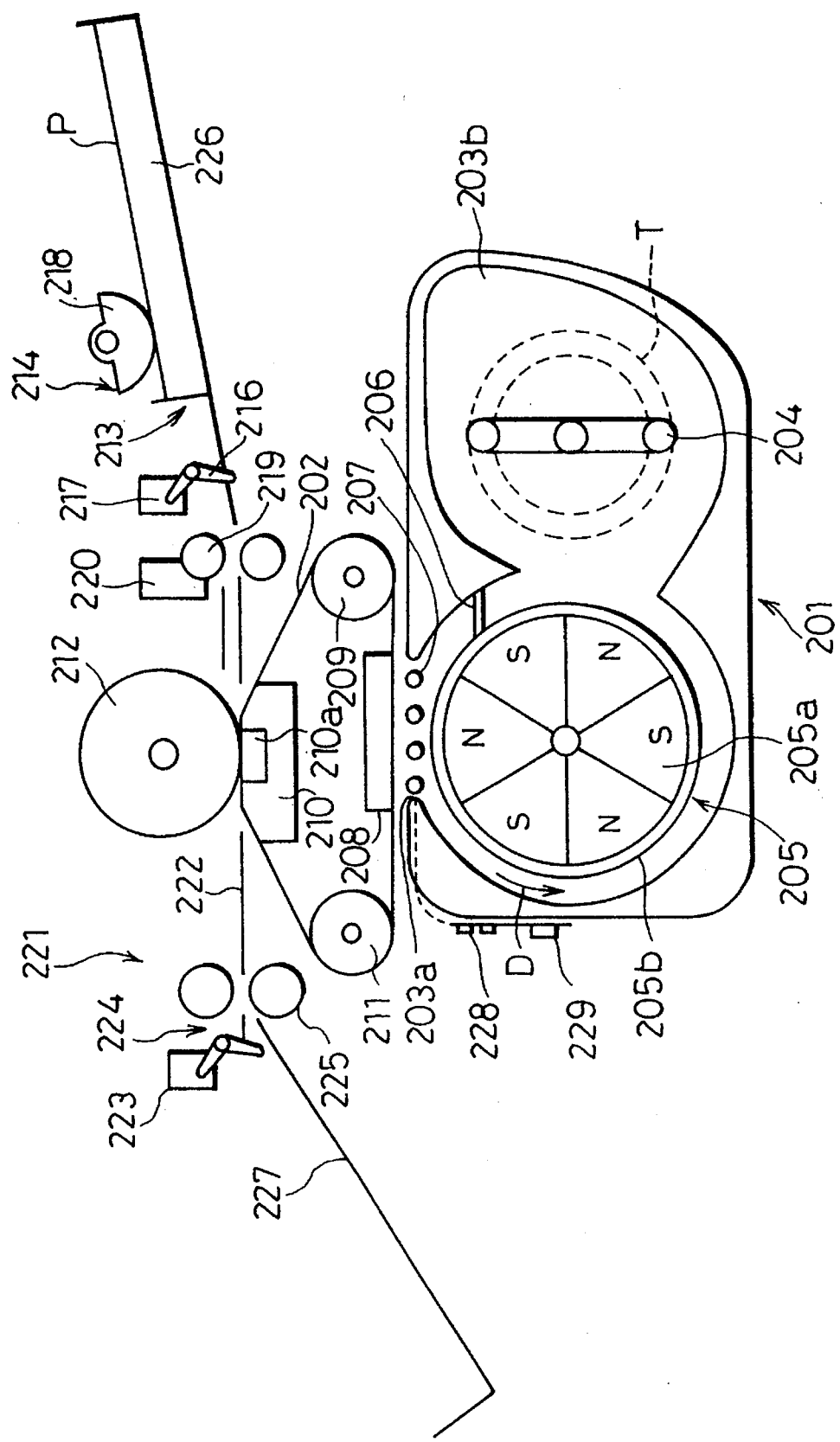
FIG. 52 is an explanatory drawing which shows an arrangement of an image forming apparatus of still another embodiment of the present invention.

FIG. 52 is a schematic drawing which shows an arrangement of an image forming apparatus of the present embodiment of the present invention. The image forming apparatus is provided with a developing unit 201 in its center, a transfer belt 202 above the developing unit 201 and a pressure roller 212 above the transfer belt 202. A sheet carrying passage 222 including a register roller 219 and a discharge roller 225 is provided from a sheet cassette 226 through the pressure roller 212 and the transfer belt 202 to a discharge tray 227. Toner stored in the developing unit 201 selectively adheres to the surface of the transfer belt 202 and is transferred to a sheet which passes between the transfer belt 202 and the pressure roller 212.

The developing unit 201 includes an agitating roller 204 and a toner holder 205 such that they are supported by a shaft of the developing unit 201. The agitating roller 204 agitates insulated magnetic toner stored in a hopper 203b. A toner holder 205 is composed of a magnet roller 205a, in which magnets having N magnetism and magnets having S magnetism are arranged alternately in a circumferential direction, and a cylinder 205b which is installed to the magnet roller 205a from outside. The toner holder 205 rotates in the direction shown by the arrow D, and an amount of adhesion of the toner to the surface of the toner holder 205 is adjusted to a prescribed amount by a doctor 206.

An electrode 207 is provided on a counter surface of the developing unit 201 opposite to the toner holder 205. The toner stored in the developing unit 201 is powder having a particle diameter of about 10 μm. Such powder is obtained by adding 50 weights of magnetite to resin composed of styrene acrylic copolymer, etc. and the mixture is kneaded, and the kneaded mixture is broken into pieces. The toner which adheres on the surface of the toner holder 205 passes through the electrode 207 by means of a magnetic field formed between a back plate 208, which is provided inside of the transfer belt 202, and the toner holder 205, and the toner flies to the surface of the transfer belt 202. The transfer belt 202 is formed by using film materials mainly composed of polyimide resin so as to have a thickness of 20 μm and have an endless configuration.

The transfer belt 202 is provided across a driving roller 209 and a tension roller 211, and a fixing holder 210 is installed inside the transfer belt 202. A ceramic heater 210a is provided in the fixing holder 210. The ceramic heater 210a is formed by plate-type Mo heat resistor on an aluminum ceramic substrate and laminating a glass coat thereon. The ceramic heater 210a in the fixing holder 210 heats the transfer belt 202 to a prescribed temperature so as to melt the toner which has adhered to the surface of the transfer belt 202. A voltage having opposite polarity to polarity of the charged toner is applied to the back plate 208, and the toner which has adhered magnetically to the surface of the toner holder 205 is absorbed towards the transfer belt 202.

Figure 53:
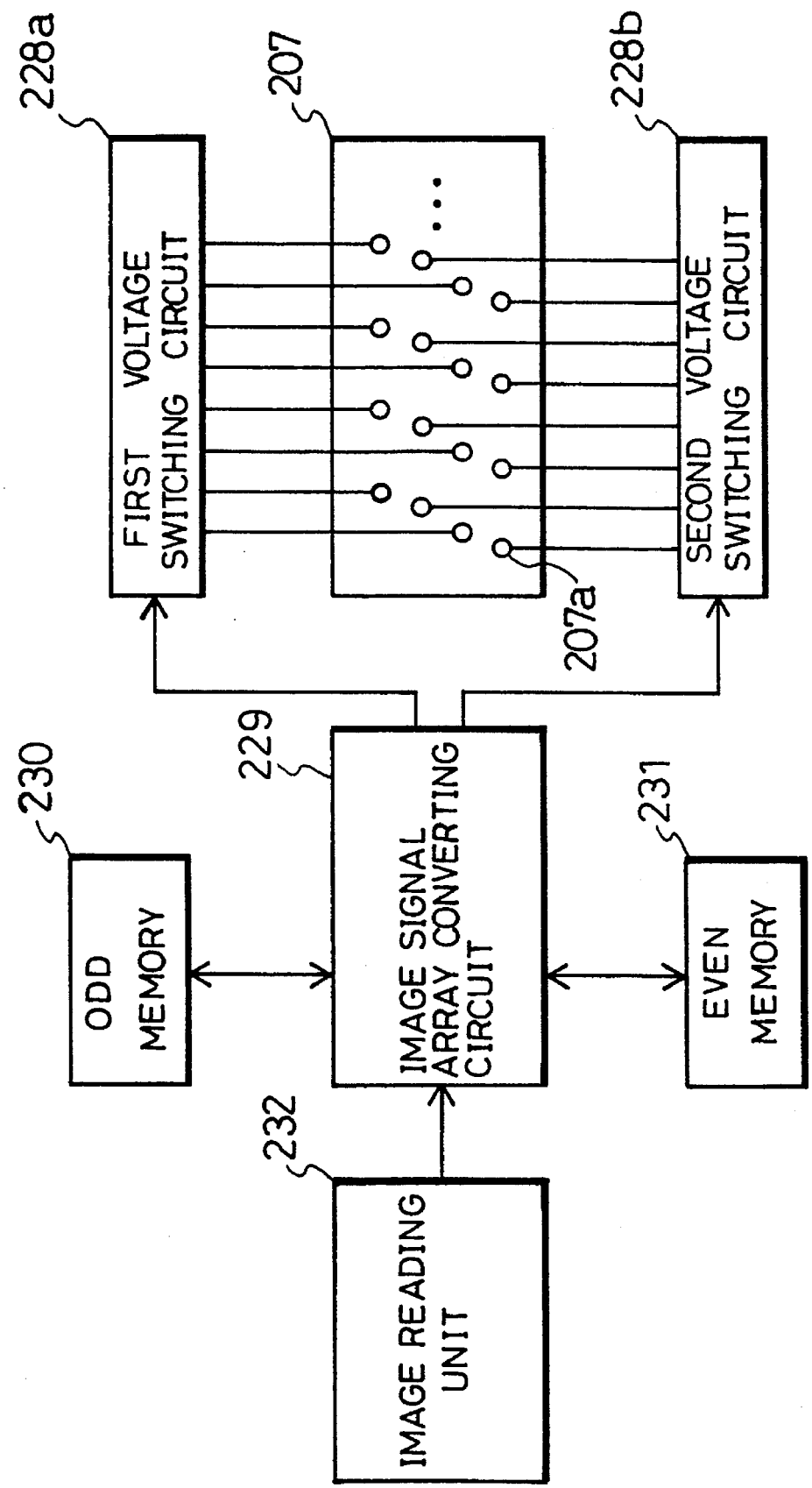
FIG. 53 is a block diagram which shows an arrangement of the image forming apparatus in FIG. 52.

FIG. 53 is a block diagram which shows the arrangement of the image forming apparatus. A control section of the image forming apparatus is composed of an image signal array converting circuit 229 (image data writing means, image data reading means, signal converting means), an odd memory 230, an even memory 231, and a first and a second voltage switching circuits 228a and 228b. An image signal is serially inputted from an image reading unit 232 which is an external unit to the image signal array converting circuit 229. The inputted image signal is stored into either of the odd memory 230 and the even memory 231 for every line. Moreover, the image signal array converting circuit 229 reads out an image signal from either of the odd memory 230 and the even memory 231 and outputs the image signal to the first and the second voltage switching circuits 228a and 228b as a keying signal. The keying signal inputted from the image signal array converting circuit 229 is stored in a shift register in the first and second voltage switching circuits 228a and 228b. At the moment when all the keying signals with respect to an electrode 207 are finished to be stored in the shift register, the first and second voltage switching circuits 228a and 228b selectively apply a voltage to the electrode 207 according to contents of the stored keying signals.

Figure 54:
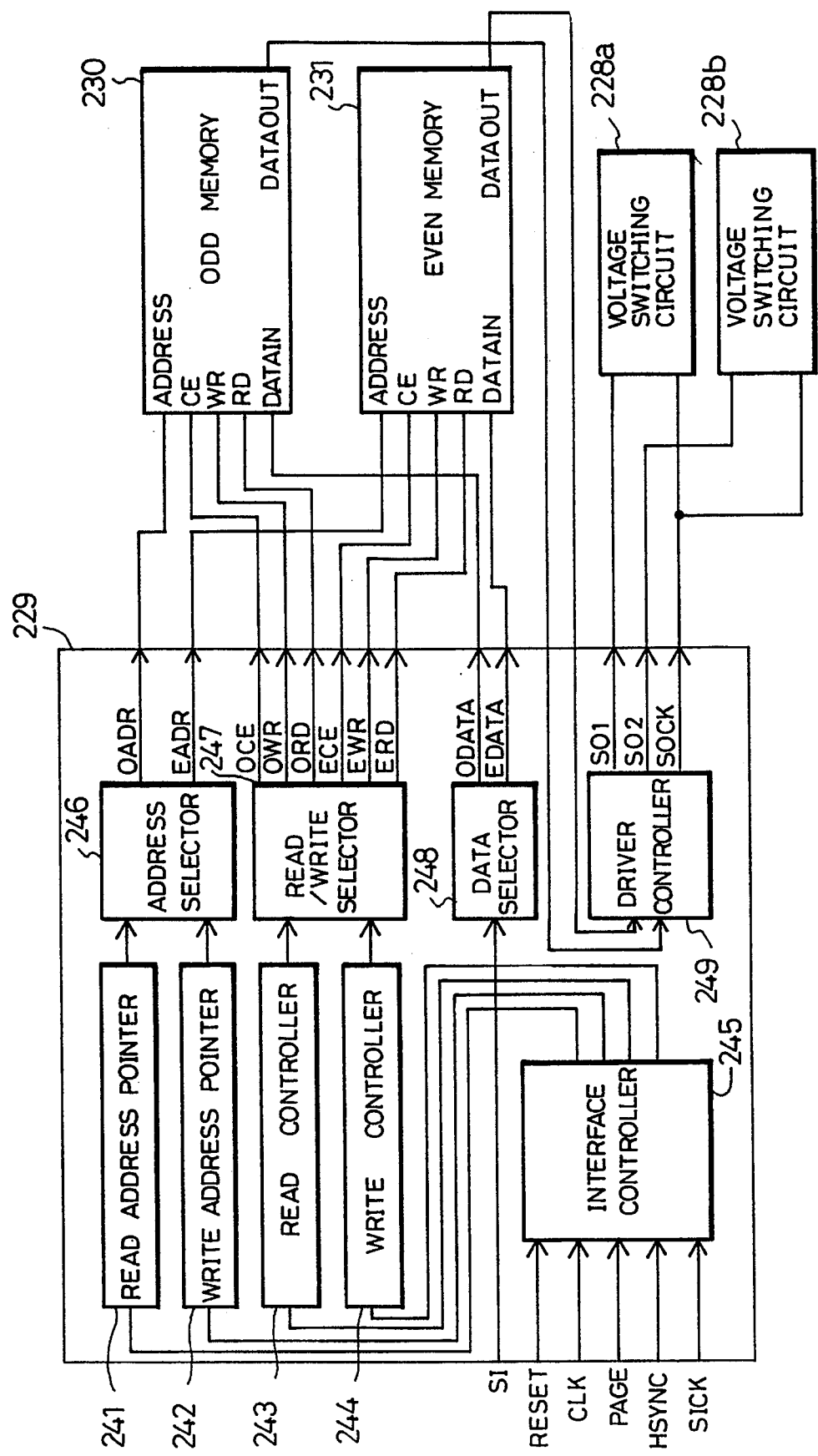
FIG. 54 is a block diagram which shows a detail of an image signal array converting circuit which composes a portion of a control section in the image forming apparatus in FIG. 52.

FIG. 54 is a block diagram which shows an arrangement of the image signal array converting circuit 229 in detail. The image signal array converting circuit 229 is composed of a read address pointer 241, a write address pointer 242, a read controller 243, a write controller 244, an interface controller 245, an address selector 246, a read/write selector 247, a data selector 248 and a drive controller 249.

The read address pointer 241 creates read address of the odd memory 230 and the even memory 231. The write address pointer 242 creates write address of the odd memory 230 and the even memory 231. The read controller 243 creates a read signal to the odd memory 230 and the even memory 231. The write controller 244 creates a write signal to the odd memory 230 and the even memory 231. The interface controller 245 controls for receiving from an external unit, such as the image reading unit 232.

The address selector 246 alternately changes the read address and the write address into address of the odd memory 230 and the address of the even memory 231. The read/write selector 247 distributes a read signal and a write signal to the odd memory 230 and the even memory 231. The data selector 248 distributes the image signal inputted from the image reading unit 232 to the odd memory 230 or the even memory 231. The driver controller 249 232 creates serial data and a transmission clock to the voltage switching circuits 228a and 228b.

An image signal SI is inputted from the image reading unit 232 to the data selector 248. A synchronizing signal (SICK), a reset signal (RESET), a synchronizing signal (CLK) in the image signal array converting circuit 229, a synchronizing signal (PAGE) generated from the image reading unit 232 when input of image data on page 1 is started, and a synchronizing signal (HSYNC) generated per line of image data which are synchronized with the image signal SI are inputted from the image reading unit 232 to the interface controller 245.

The address selector 246 outputs an address signal (OADR) of the odd memory 230 and an address signal (EADR) of the even memory 231. The read/write selector 247 outputs a chip select signal (OCE) of the odd memory 230, a chip select signal (ECE) of the even memory 231, a write signal (OWR) of the odd memory 230, a write signal (EWR) of the even memory 231, a read signal (ORD) of the odd memory 230 and a read signal (ERD) of the even memory 231.

The data selector 248 outputs image data on odd lines (ODATA) or image data on even lines (EDATA) by dividing the image signal SI. The driver controller 249 outputs a keying signal (SO1) for the first voltage switching circuit 228a, a keying signal (SO2) for the second voltage switching circuit 228b, and a synchronizing signal (SOCK) to the voltage switching circuits 228a and 228b. The keying signals SO1 and SO2 are outputted in synchronism with the synchronizing signal SOCK.

Figure 55:
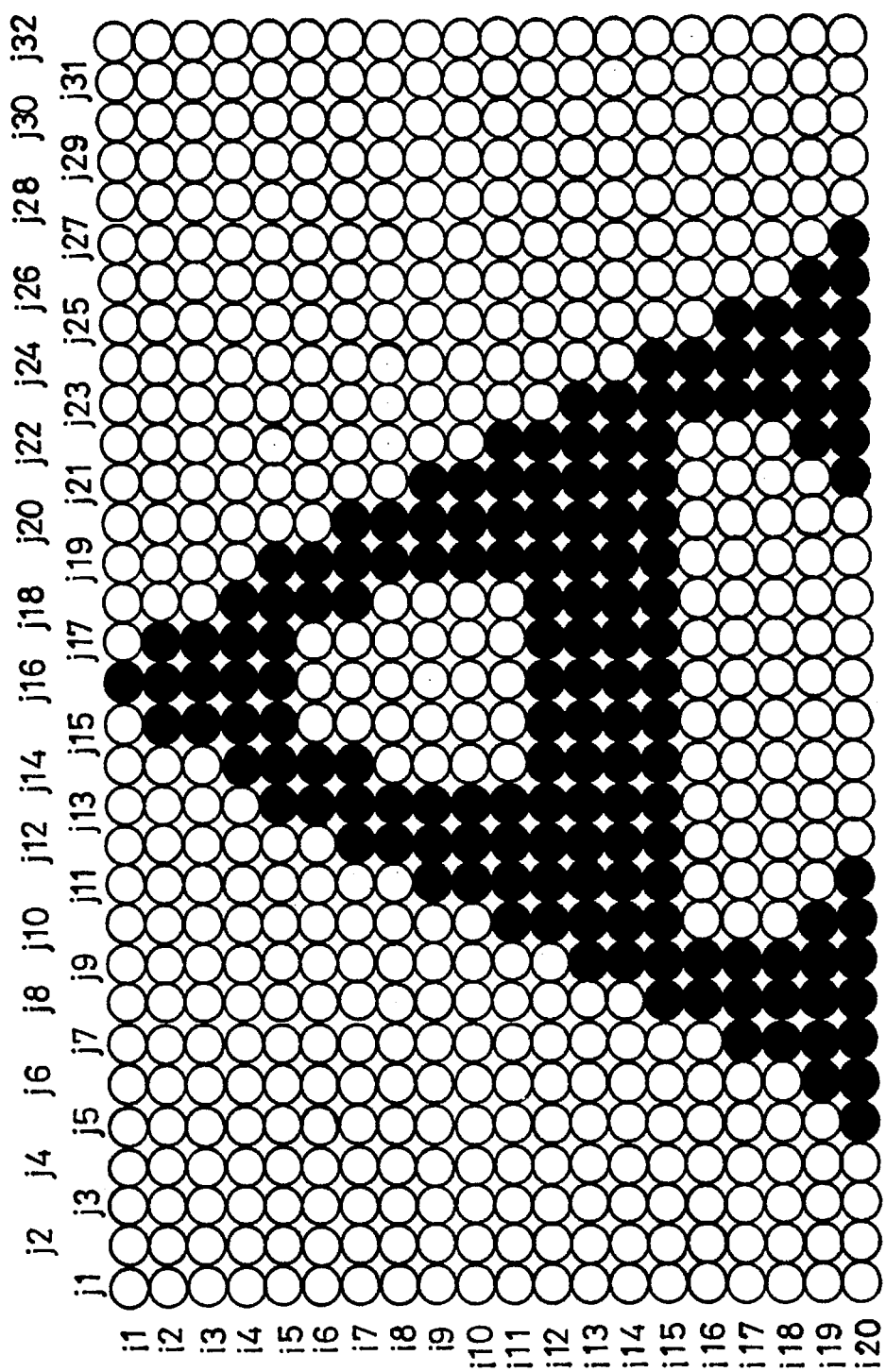
FIG. 55 is an explanatory drawing which shows one example of image data inputted from an image reading unit into the image signal array converting circuit.
Figure 56:
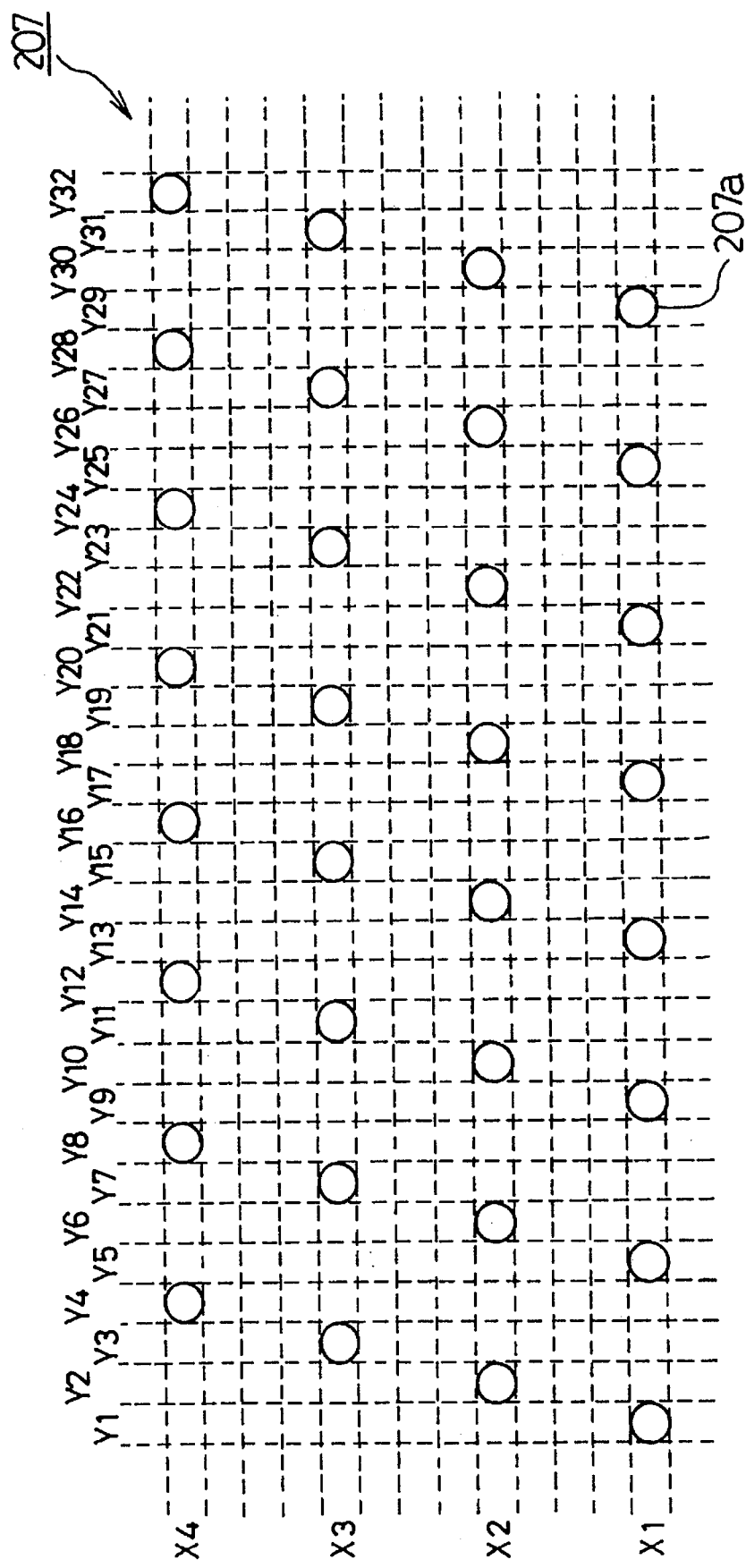
FIG. 56 is an explanatory drawing which shows a pattern of arrangements of electrodes which are used in the image forming apparatus shown in FIG. 52.

FIG. 55 is a drawing which shows one example of an image signal which is inputted to the image signal array converting circuit 229, and FIG. 56 is a drawing which shows one example of an array pattern of gates on an electrode. The image reading unit 232 develops a read image in image data, and serially outputs an image signal shown in FIG. 55, for example. The image reading unit 232 outputs the reset signal and the synchronizing signal PAGE, and successively outputs an image signal for a line serially in synchronism with the synchronizing signal HSYNC for every line. In other words, as shown in FIG. 55, image signals are outputted from the image reading unit 232 beginning from a line i1 in the order of (i1, j1), (i1, j2) . . . (i1, J32). As to lines i2 through i20, image signals are outputted in a like manner of the line i1. The electrode 207 is formed by using a conductive material such that circular electrodes are countered to each other on the both sides of an insulated plate and gates having a diameter of approximately 600 μm are drilled thereon. The gates 207a are arranged on four lines such that eight gates are on each line. An interval for 3 picture elements of the image signal is provided between the gates 207a on each line X1 through X4 on the electrode 207. Moreover, as the line is shifted from X1 to X4, the gates are formed in a position which is shifted for each one picture element of the image signal. The image signal array converting circuit 229 receives the image signal SI shown in FIG. 55 in synchronization with the synchronizing signal SICK, and the received image signal SI is stored in the odd memory 230. Similarly, the image signal array converting circuit 229 receives the image signal SI in connection with the line i2, and the received image signal is stored in the even memory 231.

Figure 57A:
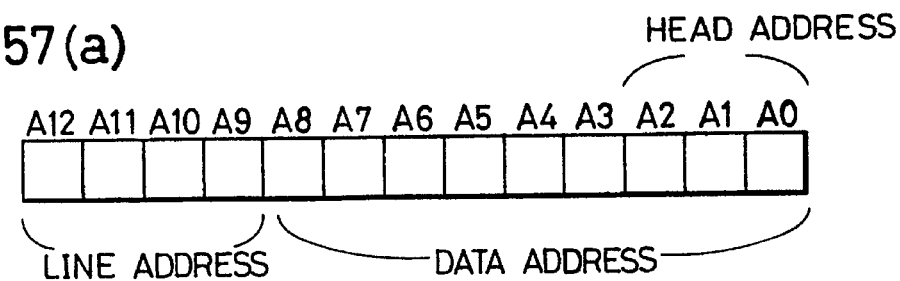
FIG. 57 is an explanatory drawing which shows an address of memory which composes the control section of the image forming apparatus shown in FIG. 52.

In general, as shown in FIG. 57, address in a memory is classified into two domains: line address and data address. When the last 2 bits of the data address is a head address, a bit width of the address is determined by an array pattern of the gates on the electrode 207. For example, in an array pattern of the gates shown in FIG. 56, a bit width of head address is determined by a value obtained by binarizing a number of lines of the gates on the electrode 207 (X1 through X4). A bit width of a data address is a total number of the gates 207a on the electrode 207, and it is determined by binarizing a value from Xmax×Y max. The value can be also obtained by multiplying a number of dots on one line of the image signal by a number of lines on the electrode 207 (j max×X max).

A bit width of a line address is obtained by obtaining a number of lines corresponding to X min when a maximum line number width of the gate 7a on the electrode 207 is allotted to 1 line memory of the image signal and by adding 1 to the obtained value. In other words, iX min+1 is a number of lines of the image signal to be stored. In the present embodiment, since two memories: the odd memory 230 and the even memory 231 are used, the bit width of the line address is obtained by binarizing (iY min+1)/2. More concretely, since the head address is a number of lines of the gates 207a on the electrode 207, it is "4", then becomes "3" by subtracting 1 from 4 in order to include an address 0. When 3 is binarized, a value "11" is obtained, so the number of bits of the head address to be obtained becomes 2 bits.

Since the data address is a total number of the gates 207a on the electrode 207, it is obtained as 4×32=128, and becomes "127" by subtracting 1 in the same manner as the above. 127 is binarized so as to be "1111111", and the number of bits of the data address becomes 8 bits. Since the line address is a maximum line number width of the electrode 207, a number of lines corresponding to X min is 13 in a state where X max corresponds to the first line. Therefore, a value is obtained as 13+1=14 from iX min+1, and a number of lines to be stored into the memory becomes 14. Here, since two memories: the odd memory 230 and the even memory 231 are used, a number of lines to be stored to one memory becomes as 14÷2=7. Therefore, since 6 which is obtained by subtracting 1 from 7 is binarized so as to be "110", a bit width of the line address becomes 3 bits.

Figure 57B:
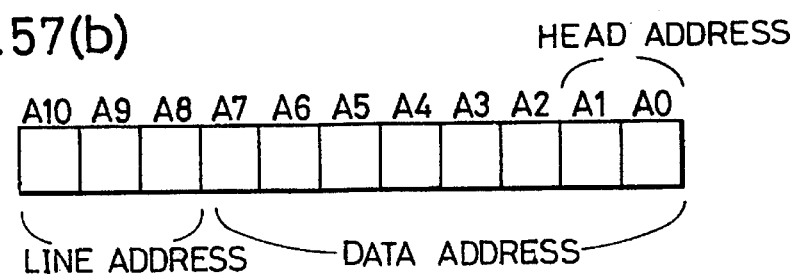
Figure 58A:
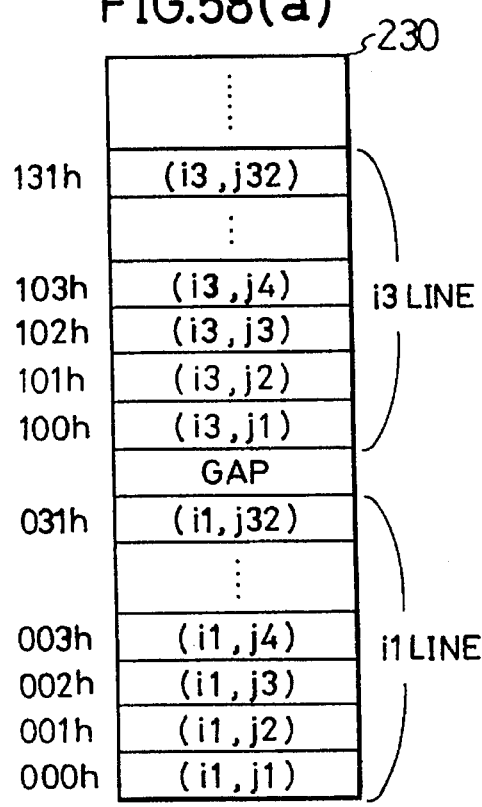
FIG. 58 is a memory map which shows stored contents of the memory shown in FIG. 57.
Figure 58B:
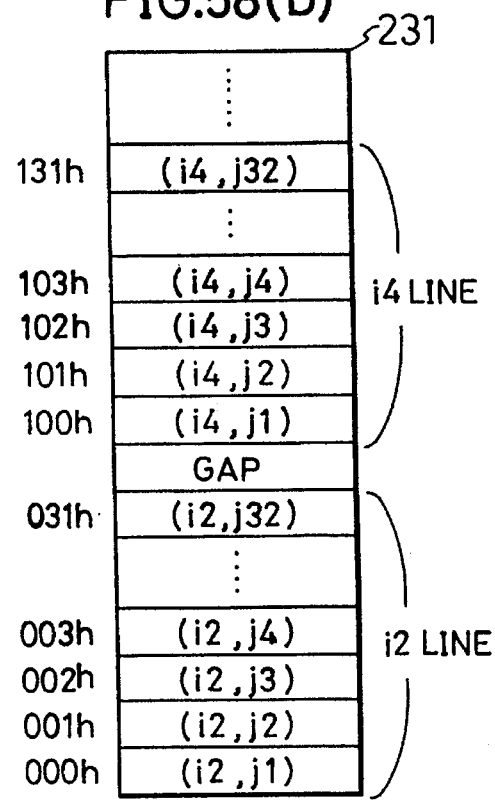

As shown in FIG. 57(b), the address of the memory in the present embodiment becomes 11 bits which is a total of 3 bits of the line address and 8 bits of the data address, so the odd memory 230 and the even memory 231 requires capacity according to the number of addresses. As shown in FIG. 58, data of dots j1, j2, . . . and j32 on the line i1 are stored to the odd memory 230 beginning from the address 000h. As shown in FIG. 58(b), data of dots j1, j2, . . . and j32 on the line i2 are stored to the even memory 231 beginning from the address 000h. Data on the line j3 are stored in the odd memory 230, but one line address is incremented so as to be stored successively beginning from the address 100h. Hereafter, the same operation is performed as to the lines i4, i5, . . . , and after data on the line i14 are stored, the address returns to 100h, and an image signal is stored from the line i15.

Figure 59:
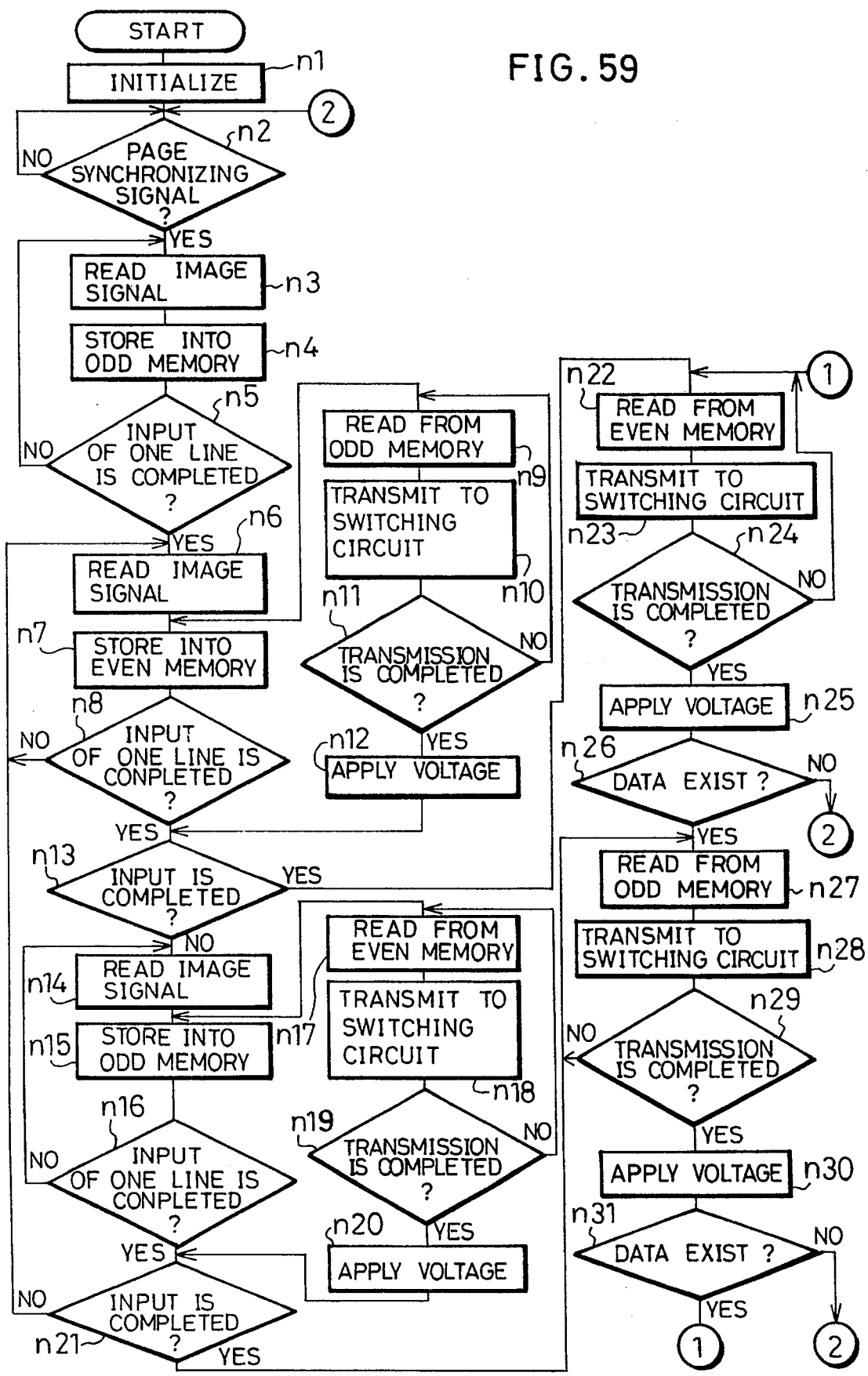
FIG. 59 is a flow chart which shows sequence of processes in the image signal array converting circuit.

FIG. 59 is a flow chart which shows procedure for an operation of the image signal array converting circuit 229. After being turned on, the image signal array converting circuit 229 initializes each section including the odd memory 230 and the even memory 231 (n1), and when a reset signal is inputted from the image reading unit 232, it waits for an input of a 1 page synchronizing signal PAGE (n2). When a 1 line synchronizing signal HSYNC is inputted after the 1 page synchronizing signal PAGE, an image data SI to be inputted in synchronization with a synchronizing signal SICK are read (n3) and successively stored to a prescribed address in the odd memory 230 (n4).

When next 1 page synchronizing signal HSYNC is inputted, it is judged that input of data on the first line is completed (n5), and an image signal on the second line (i2) is read in synchronization with the synchronizing signal SICK (n6) so as to be successively stored to a prescribed address in the even memory 231 (n7, n8). At the same time, data stored in the odd memory 230 are read out and are outputted as a keying signal to the voltage switching circuits 228a and 228b (n10, n11). After the data for one line are outputted to the voltage switching circuits 228a and 228b, a voltage is applied to the gate 207a on the electrode 207 from the voltage switching circuits 228a and 228b.

Hereafter, when the image signals on the odd lines are inputted, the image signals are stored to the odd memory 230 and the image signals stored to the even memory 231 are read out so as to be outputted as a keying signal to the voltage switching circuits 228a and 228b. The voltage switching circuits 228a and 228b applies a voltage to the electrode 207 according to contents of the keying signals (n14 through n20). Meanwhile, when the image signals on the even lines are inputted, the image signals are stored to the even memory 231, and the image signals stored in the odd memory 230 are outputted to the voltage switching circuits 228a and 228b. The voltage switching circuits 228a and 228b applies a voltage to the electrode 207 according to contents of the image signals (n6 through n12). The sequence n6 through n12 and n14 through n20 are repeated until input of the image signals on all the lines is completed (n13, 21).

For example on n13, when it is judged by reverse of the 1 page synchronizing signal PAGE that the input of the image signals on all the lines from the image reading unit 232 is completed, data stored in the even memory 231 are read out (n22) so as to be outputted to the voltage switching circuits 228a and 228b (n23). When output of a keying signal corresponding to the image signal for 1 line is completed, a voltage is applied from the voltage switching circuits 228a and 228b to the electrode 207 (n24, n25). The same processes are applied to the odd memory 230 (n26 through n31).

As mentioned above, in the present embodiment, the image signals inputted for each line from the image reading unit 232 are classified as the image signals on the odd lines and as the image signals on the even lines so as to be stored into the odd memory 230 and the even memory 231. Thereafter, the inputted image signals on or after the second lines are written into one of the memories, and at the same time the image signals are read out from the other memory so as to be outputted to the voltage switching circuits 228a and 228b. Since when the image signal on the first line is inputted, an image signal does not exist in the even memory 231, image signals are read out when the image signals on and after the second lines are inputted. For this reason, as mentioned above, when a line address which has to do with definition of capacity of a memory is determined, 1 is added to a maximum line number width.

In addition, as shown in FIG. 53, in order to control the toner which passes through the gate 207 formed on the electrode 207, the first and second voltage switching circuits 228a and 228b are provided so that a voltage is applied in two systems to the gates 207a. To be concrete, the gates 207a on the odd lines (Y1, Y3, . . . , Y31) shown in FIG. 56 are connected to the voltage switching circuit 228a, and the gates 207a on the even lines (Y2, Y4, . . . , Y32) are connected to the voltage switching circuit 228b. The image signal array converting circuit 229 outputs the image signals to the voltage switching circuits 228a and 228b in parallel in synchronization with the synchronizing signals. More specifically, the image signals (X1, Y1), (X3, Y3), (X1, Y5), (X3, Y7), . . . , (X3, Y31) are outputted to the first voltage switching circuit 228a in this order, and the image signals (X2, Y2), (X4, Y4), (X2, Y6), (X4, Y8), . . . , (X4, Y32) are outputted to the second voltage switching circuit 228b in this order.

In the case where an image shown in FIG. 55 is formed on a sheet to be carried in the direction shown by the arrow D in FIG. 52 by using the electrode 207 shown in FIG. 56, the image signals read out from the odd memory 230 and the even memory 231 are outputted to the eight gates 207a positioned on the line X1 while the top of the image forming position on the sheet passes the line X1 of the electrode 207 and reaches the line X2. In a first image forming cycle shown in FIG. 60, as to the image signals on the line i1 of the image data shown in FIG. 55, eight image signals (i1, j1), (i1, j5), (i1, j9), . . . , (i1, j29) which correspond to a gate 207a on the line X1 on the electrode 207 are read out from the odd memory 230 and are outputted to the first voltage switching circuit 228a. At this time, since there does not exist image signals corresponding to the gates 207a on the lines X2 through X4 of the electrode 207 in the odd memory 230, signals which are equivalent to white image signals for preventing the toner from passing through the gates 207a are outputted to the voltage switching circuits 228a and 228b.

In 1st through 4th printing cycles, the image signals j1, j5, j9, . . . , j29 on the lines i1 through i4 corresponding to the gates 207a positioned on the line X1 of the electrode 207 are read out alternately from between the odd memory 230 and the even memory 231 so as to be outputted to the voltage switching circuit 228a. The image signals outputted to the electrode 207 during the above process and a printing state on the sheet are shown in FIGS. 60(a) and (b) through 63(a) and (b). In the drawings, (a) shows contents of the image signals to be outputted to each gate 207a on the electrode 207 and (b) shows an image forming state on the sheet.

Figures 64A, 64B, 65A, 65B:
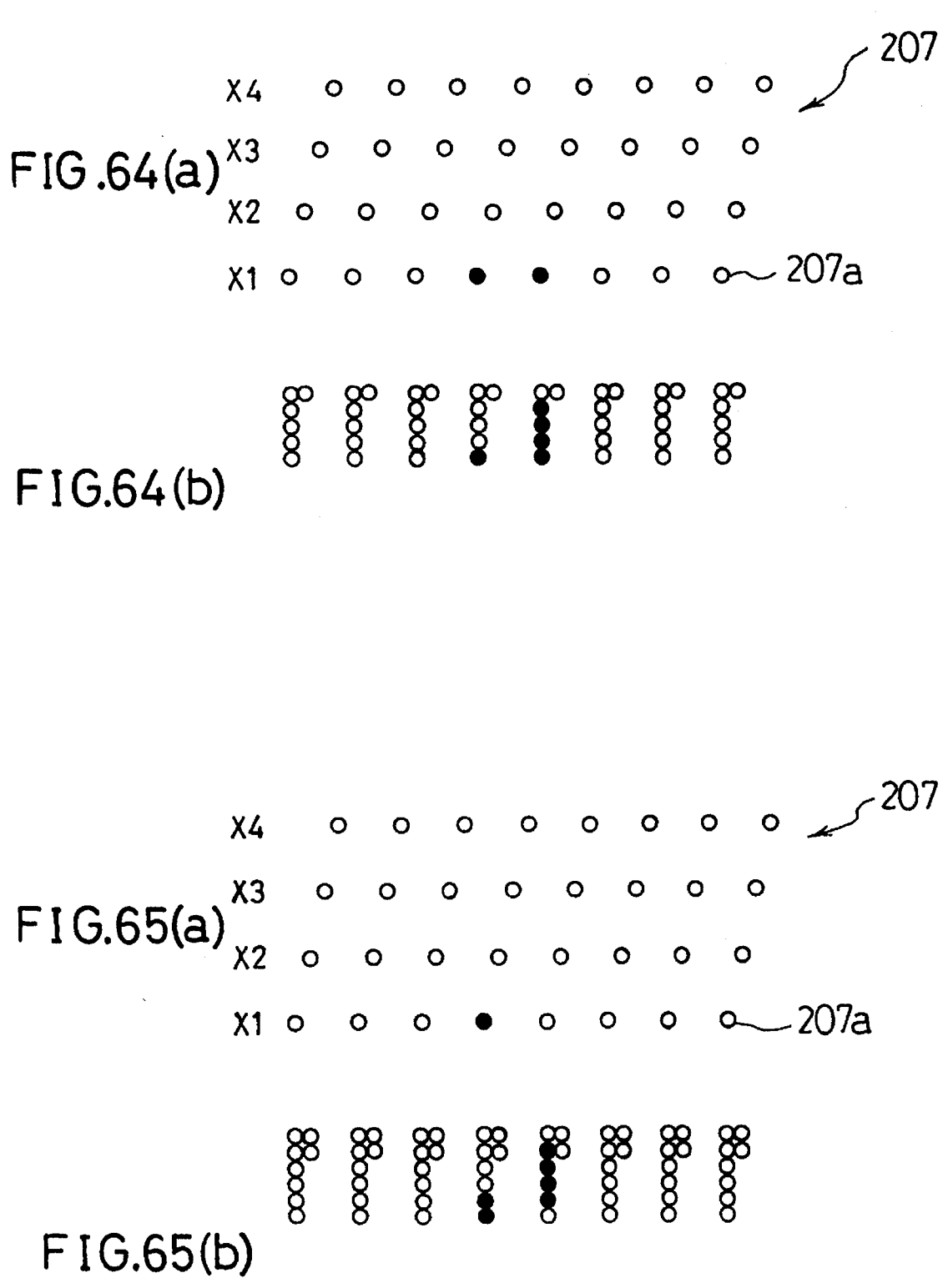
Figures 66A, 66B, 67A, 67B:
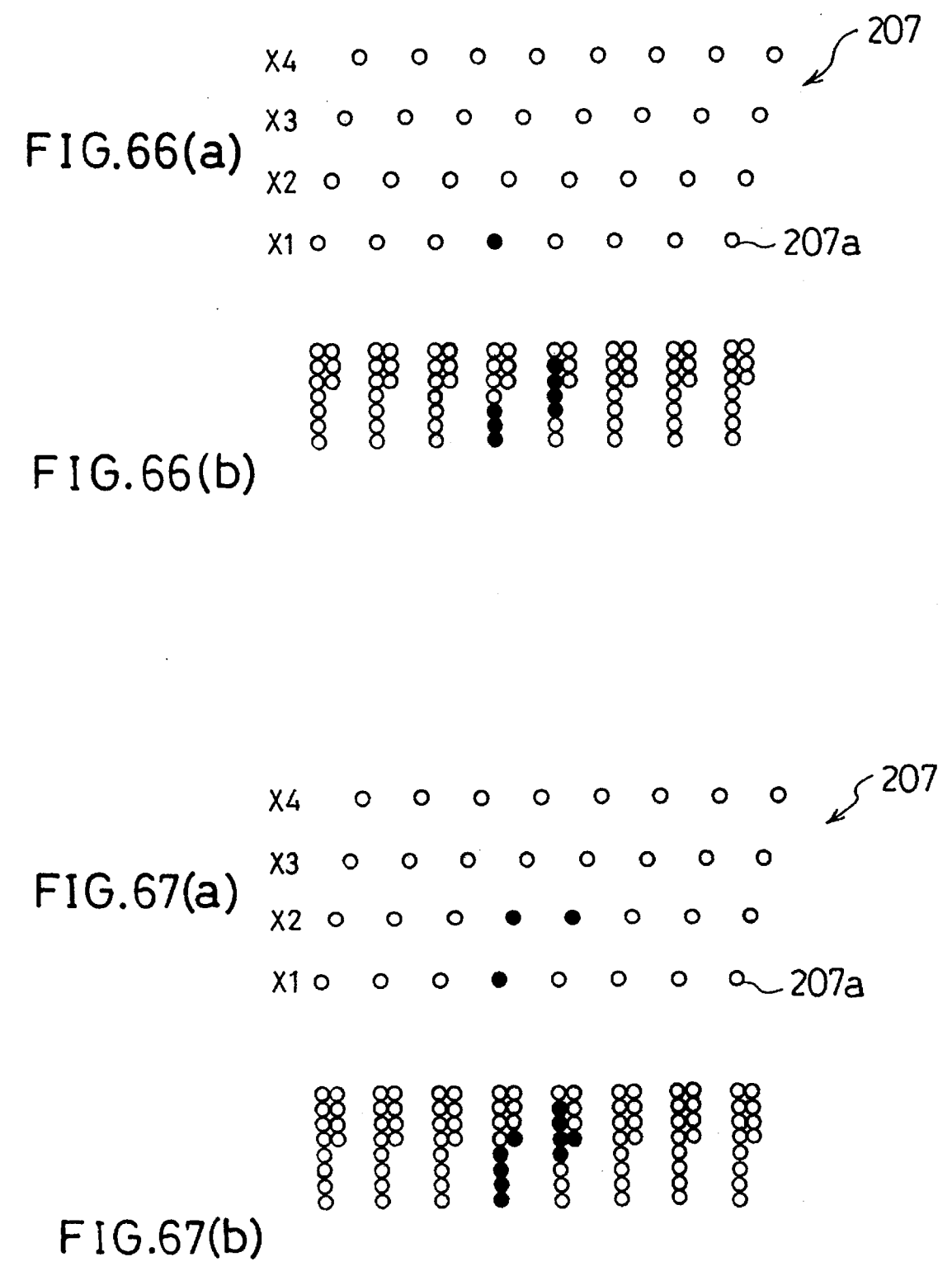

As shown in FIGS. 64(a) and (b) through 67(a) and (b), in the 5th and 8th image forming cycles, while an upper edge of an image forming area on the sheet reaches the line X2 of the electrode 207 and successively the line X3, the image signals which correspond to the gates 207a on the line X1 of the electrode 207 of the image signals on the lines i5 through i8, and the image signals which correspond to the gates 207a on the line X2 of the electrode 207 of the image signals on the lines i1 through i4 are read out alternately from between the odd memory 230 and the even memory 231 so as to be outputted to the voltage switching circuits 228a and 228b. As a result, the image signals are outputted to each gate 207a of the electrode 207 in the states shown in FIGS. 64(a) through 67(a), and the image is formed on the sheet as shown in FIG. 64(b) through FIG. 67(b).

Figure 68A:
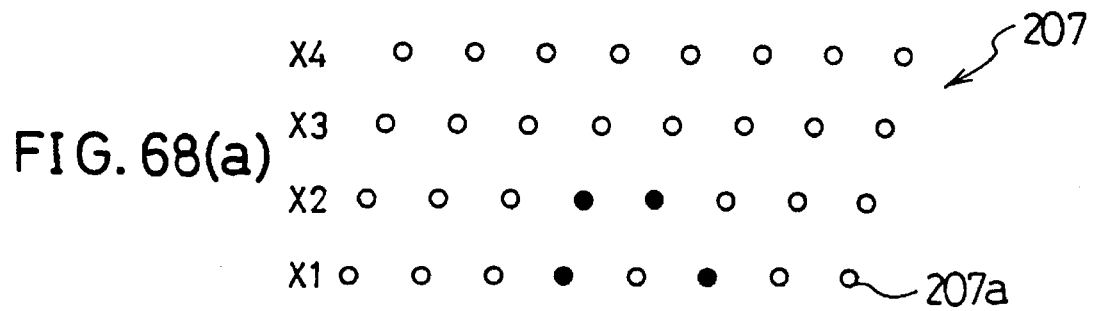
Figure 68B:
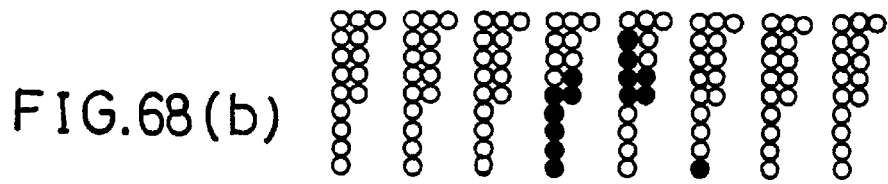
Figure 69A:
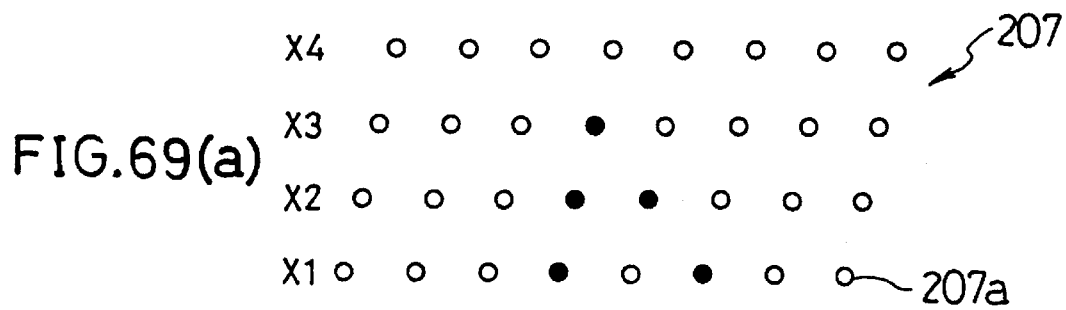
Figure 69B:
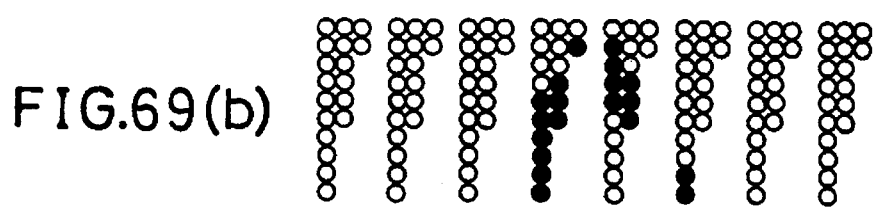
Figure 72A:
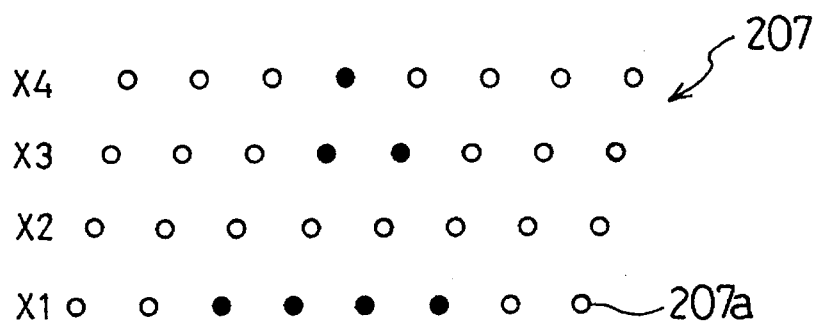
Figure 72B:
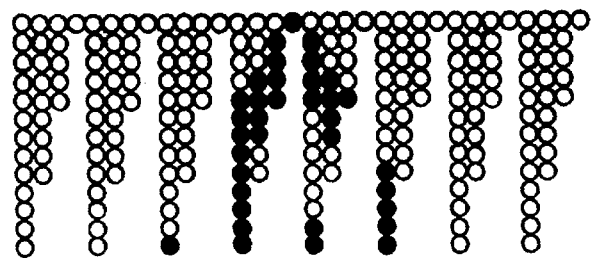
Figure 73A:
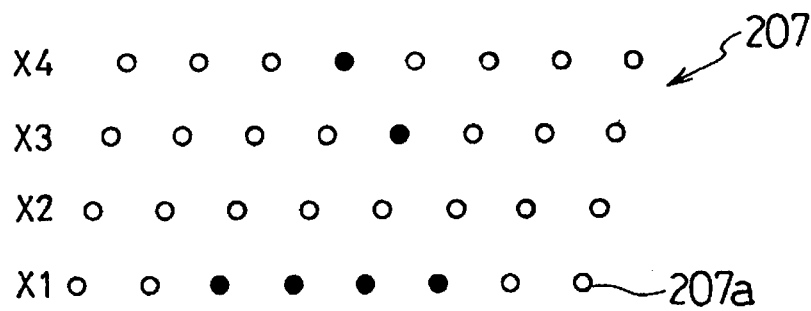
Figure 73B:
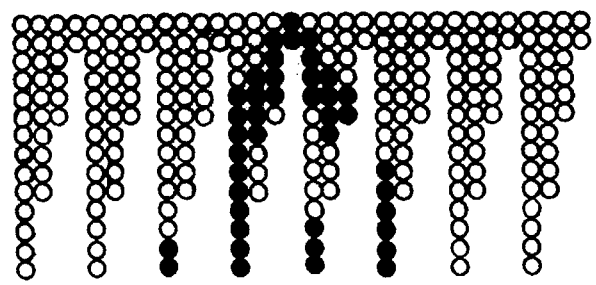
Figure 80A:
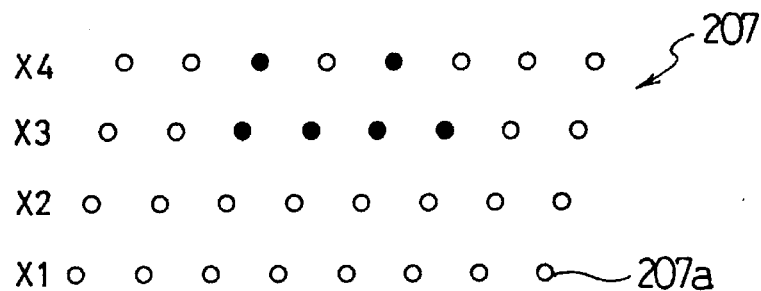
Figure 80B:
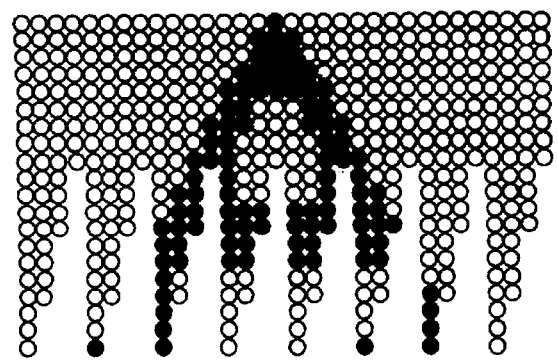
Figure 81A:
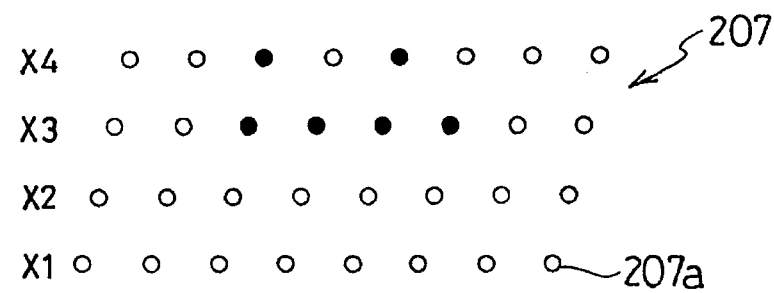
Figure 81B:
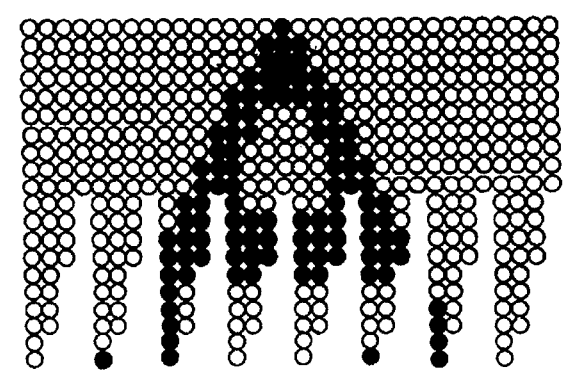
Figure 92:
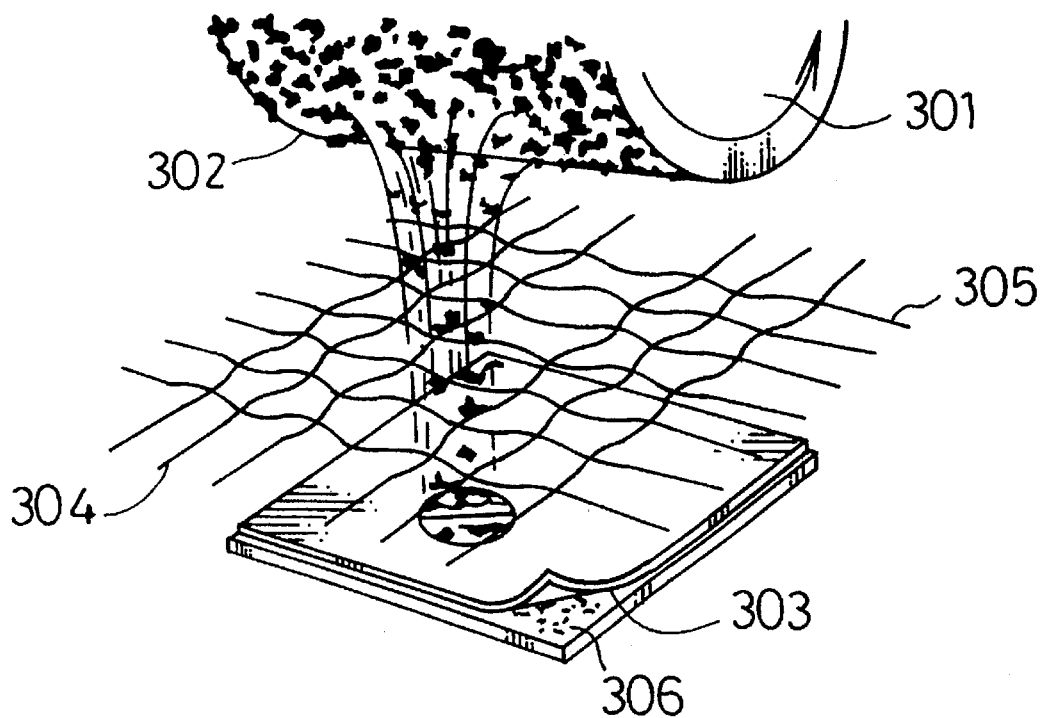
FIG. 92 is an explanatory drawing which shows an arrangement of a main section of a conventional image forming apparatus.
Figure 93:
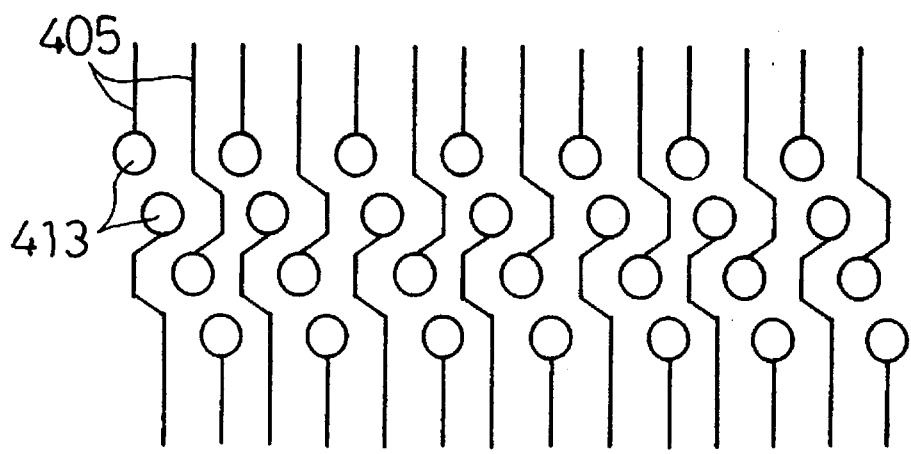
FIG. 93 is an explanatory drawing which shows a state of arrangements of gates in a conventional image forming apparatus.

As shown in FIGS. 68(a) and (b) through 71(a) and (b), in the 9th and 12th image forming cycles, while the upper end of the image forming area on the sheet passes the line X3 of the electrode 207 and reaches the line X4, the image signals which correspond to the gates 207a on the line X1 of the electrode 207 of the image signals on the lines i9 through i12 of the image data, the image signals which correspond to the gates 207a on the line X2 of the electrode 207 of the image signals on the lines i5 through i8, and the image signals which correspond to the gates 207a on the line X3 of the electrode 207 of the image signals on the lines i1 through i4 are read out alternately from between the odd memory 230 and the even memory 231 so as to be outputted to the voltage switching circuits 228a and 228b. In the 9th through 12th image forming cycles, the gates 207a on the lines X1 through X3 of the electrode 207 are selectively opened one after another in the states shown in FIG. 68(a) through 71(a) so that the image is formed on the sheet in the state shown FIG. 68(b) through in FIG. 71(b).

Successively, after the top of the image forming area on the sheet reaches the line X4 of the electrode 207, in the 13th through 20th image forming cycles, the image signals which correspond to the gates 207a on the line X1 of the electrode 207 of the image signals on the lines i13 through i20 of the image data, the image signals which correspond to the gates 207a on the line X2 of the electrode 207 of the image signals on the lines i9 through i16, and the image signals which correspond to the gates 207a on the line X3 of the electrode of the image signals on the lines i5 through i12 are read out alternately from between the odd memory 230 and the even memory 231 so as to be outputted to the voltage switching circuits 228a and 228b. As a result, the gates 207a of the electrode 207 are selectively opened one after another in the state shown in FIGS. 72(a) through 79(a) so that the image is formed on the sheet in the state shown in FIG. 72(b) through FIG. 79(b).

In the 20th image forming cycle, after the bottom edge of the image forming area on the sheet reaches the line X1 of the electrode 207, in the 21st through 24th image forming cycles, the image signals which correspond to the gates 207a on the line X2 of the electrode 207 of the image signals on the lines i17 through i20 of the image data, the image signals which correspond to the gates 207a on the line X3 of the electrode 207 of the image signals on the lines i13 through i16, and the image signals which correspond to the gates 207a on the line X4 of the electrode 207 of the image signals on the lines i9 through i12 are read out alternately from between the odd memory 230 and the even memory 231 so as to be outputted to the voltage switching circuits 228a and 228b. As a result, the gates 207a of the electrode 207 are selectively opened one after another in the states shown in FIGS. 80(a) through 83(a) so that the image is formed on the sheet in the state shown in FIG. 80(b) through FIG. 83(b). At this time, a signal which is equivalent to a white image signal is outputted to the gates 207a on the line X1 of the electrode 207, and all the gates 207a on the line X1 are closed.

In the 24th image forming cycle, after the bottom end of the image forming area on the sheet reaches the line X2 of the electrode 207, in the 25th through 28th image forming cycles, the image signals which correspond to the gates 207a on the line X3 of the electrode 207 of the image signals on the lines i17 through i20 of the image data, and the image signals which correspond to the gates 207a on the line X4 of the electrode 207 of the image signals on the lines i13 through i16 are read out alternately from between the odd memory 230 and the even memory 231 so as to be outputted to the voltage switching circuits 228a and 228b. As a result, the gates 207a of the electrode 207 are selectively opened one after another in the states shown in FIGS. 84(a) through 87(b) so that the image is formed on the sheet in the state shown in FIG. 84(b) through FIG. 87(b). At this time, a signal which is equivalent to a white image signal is outputted to the gates 207a on the lines X1 and X2 of the electrode 207, and all the gates 207a on the lines X1 and X2 are closed.

In the 28th image forming cycle, after the bottom end of the image forming area on the sheet reaches the line X3 of the electrode 207, in the 29th through 32nd image forming cycles, image signals which correspond to the gates 207a on the line X4 of the electrode 207 of the image signals on the lines i17 through i20 of the image data are read out from the even memory 231 so as to be outputted to the voltage switching circuit 228b. As a result, the gates 207a of the electrode 207 are opened in the states shown in FIGS. 88(a) through 91(a) so that the image is formed on the sheet in the state shown in FIG. 88(b) through FIG. 91(b). At this time, a signal which is equivalent to a white image signal is outputted to the gates 207a on the lines X1 through X3 of the electrode 207, and all the gates 207 on the lines X1 through X3 are closed.

The above first image forming cycle is executed by the sequence n9 through n12 shown in FIG. 59, and the 2nd through 20th image forming cycles are executed by the sequence n9 through n20. Furthermore, the 21st through 32nd image forming cycles are executed by the sequence n22 through n30. Even in the case where image data which correspond to the gates 207a on a plurality of lines of the electrode 207 are just read out in the 5th through 31st image forming cycles, each line of the gates 207a on the electrode 207 is arranged such that intervals for 3 picture elements of image data are provided. Therefore, the image data can be read out from only either of the odd memory 230 and the even memory 231 in each image forming cycle.

For example, in the 13th image forming cycle shown in FIG. 72, image signals to be outputted to the respective gates 207a on the lines X1 through X4 of the electrode 207 are image signals on the lines i13, i9, i5 and i1 of image data, and are data which are stored in the odd memory 230. Moreover, in the 14th image forming cycle shown in FIG. 73, image signals to be outputted to the respective gates 207a on the lines X1 through X4 of the electrode 207 are image signals on the lines i14, i10, i6, i2 of the image data, and are data which are stored in the even memory 231.

As mentioned above, since each image forming cycle is executed according to image signals which have been read out alternately from the odd memory 230 and the even memory 231, each image forming cycle and a writing process of image signals, which alternates between the odd memory 230 and the even memory 231, can be simultaneously executed, and signal converting process can be executed at a high speed. The signal converting process sets a voltage which is applied to each gate 207a of the electrode 207 according to image signals inputted from an outer apparatus. This is not limited to the case where the gates 207a are arranged so as to make four lines as mentioned in the present embodiment.

Here, image signals per picture element are composed of a plurality of bits. An image having gradation can be formed by changing a value or applying time of an voltage, which is applied to the gates, according to weight of bits of the picture element.

In addition, a color image can be formed by repeating the image signal converting process according to a plurality of image signals according to colors such as Yellow, Magenta and Cyan.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus, comprising:
   a developing particle holder for holding developing particles by means of either of electric force and magnetic force;
   a counter-electrode positioned opposite said developing particle holder;
   a control grid, including a matrix of gates arranged with a pitch therebetween, is provided between said developing particle holder and said counter-electrode, in order to regulate passage of developing particles, and, to facilitate individual control of said gates, a distance, between said control grid and said developing particle holder, is shorter than said pitch of the gates;
   a power source section, furnishing a potential which generates a prescribed potential difference between said developing particle holder and said counter-electrode and applying a potential to said control grid; and grid potential control means for changing an electric field existing between said developing particle holder and said counter-electrode by changing the potential, applied by said power source section to said control grid, according to image signals, in order to form an image, by controlling flight of developing particles from said developing particle holder through each gate towards said counter-electrode and by adhering the developing particles to a recording medium arranged in a direction toward which the developing particles fly.

2. The image forming apparatus as defined in claim 1, further comprising:

a developing particle anti-sticking grid having a developing particle passing holes in the opposite position to the gates of said control grid, said developing particle anti-sticking grid being positioned between said control grid and said developing particle holder;

wherein a potential having same polarity as that of charged developing particles is given from said power source section to said developing particle anti-sticking grid.

3. The image forming apparatus as defined in claim 1, further comprising:

a developing particle flying stabilization grid having developing particle passing holes, said developing particle flying stabilization grid being positioned between said control grid and said counter electrode, wherein a potential for generating an electric field which promotes the flying of toner from said control grid towards said counter electrode is given to said developing particle flying stabilization grid.

4. The image forming apparatus as defined in claim 3, further comprising flying direction deflecting means for deflecting a flying direction of the developing particles from said developing particle flying stabilization grid towards said counter electrode to a direction which is at right angles to the flying direction by at least one of the electric field and magnetic field, said flying direction deflecting means being positioned between said developing particle flying stabilization grid and the counter electrode.

5. The image forming apparatus as defined in claim 1, further comprising recording medium potential giving means which applies, to a side of said recording medium which is remote from said developing particle holder, a potential, which generates an electric field having the same direction as that of the electric field between said control grid and said counter-electrode when the developing particles fly through said control grid towards said counter-electrode, and maintains said potential even after said developing particles have flown from the developing particle holder to the recording medium.

6. The image forming apparatus as defined in claim 1, wherein an electrode group including said counter electrode and said control grid between said counter electrode and said developing particle holder is integrated, and said electrode group can be installed to and removed from an image forming apparatus main body.

7. An image forming apparatus, comprising:

a developing particle holder for holding developing particles by means of either of electric force and magnetic force;

a counter-electrode positioned opposite said developing particle holder;

a control grid, including a plurality of gates, is provided between said developing particle holder and said counter-electrode, in order to regulate passing of developing particles;

a power source section, furnishing a potential which generates a prescribed potential difference between said developing particle holder and said counter-electrode and applying a potential to said control grid; and grid potential control means for changing an electric field existing between said developing particle holder and said counter-electrode by changing the potential, applied by said power source section to said control grid, according to image signals, in order to form an image, by controlling flight of developing particles from said developing particle holder through each gate towards said counter-electrode and by adhering the developing particles to a recording medium arranged in a direction toward which the developing particles fly; and a developing particle anti-sticking grid having developing particle passing holes which have diameters larger than that of the gates of said control grid and are positioned in opposition to the gates of said control grid, said developing particle anti-sticking grid being positioned between said control grid and said developing particle holder.

8. An image forming apparatus, comprising:

a developing particle holder for holding developing particles by means of either of electric force and magnetic force;

a counter-electrode positioned opposite said developing particle holder;

a control grid including
a first electrode layer on a closer side to said developing particle holder, on which a plurality of control electrodes are arranged in one direction,
a second electrode layer on a far side from said developing particle holder, on which a plurality of control electrodes are arranged parallel to the control electrodes of the first electrode layer and in a different direction from that of the first electrode layer, and a control grid having a plurality of gates which define passages for travel of developing particles, which grid is so formed that each control electrode of said first electrode layer overlap a corresponding control electrode of said second electrode layer;

a power source section, furnishing a potential which generates a prescribed potential difference between said developing particle holder and said counter-electrode and applying first and second different voltages respectively to electrodes of said first electrode layer and to electrodes of said second electrode layer of said control grid; and grid potential control means for changing an electric field existing between said developing particle holder and said counter-electrode by changing the voltages applied by said power source section to said control grid, according to image signals, in order to form an image, by controlling flight of developing particles from said developing particle holder through each gate towards said counter-electrode and by adhering the developing particles to a recording medium arranged in a direction toward which the developing particles fly.

9. The image forming apparatus as defined in claim 8, wherein said first electrode layer is formed by arranging a plurality of the control electrodes, which are composed of wire rods folded back at an angle of 180 degrees at their centers, said control electrodes are arranged parallel to one another in a prescribed direction, wherein said second electrode layer is formed by arranging a plurality of the control electrodes, which are composed of wire rods turned down at their centers and extended parallel from the turning point to the other direction, parallel to a direction where a prescribed angle is formed with the arrangement direction of the control electrodes of said first electrode layer.

10. The image forming apparatus as defined in claim 8, wherein said first electrode layer is formed by arranging a plurality of board-like control electrodes, which have circular openings for composing of the gates in a lengthwise direction, parallel to one another in a prescribed direction, wherein said second electrode layer is formed by arranging a plurality of the control electrodes, which have circular openings for composing of the gates in a lengthwise direction, parallel to one another in a direction where a prescribed angle is formed with the arrangement direction of the control electrodes of said first electrode layer.

11. The image forming apparatus as defined in claim 8, further comprising:

a developing particle antisticking grid having a developing particle passing hole in the opposite position to the gates of said control grid, said developing particle antisticking grid being provided between said control grid and said developing particle holder, wherein a potential having same polarity as that of charged developing particles is given from said power source section to said developing particle antisticking grid.

12. The image forming apparatus as defined in claim 8, further comprising:

a developing particle flying stabilization grid having a developing particle passing hole, said developing particle flying stabilization grid being provided between said control grid and said counter electrode, wherein a potential, which generates an electric field for promoting the flying of toner from said control grid towards said counter electrode, is given to said developing particle flying stabilization grid.

13. The image forming apparatus as defined in claim 12, further comprising flying direction deflecting means for deflecting a flying direction of the developing particles from said developing particle flying stabilization grid towards said counter electrode to a direction which is at right angles to the flying direction by at least one of the electric field and magnetic field, said flying direction deflecting means being positioned between said developing particle flying stabilization grid and the counter electrode.

14. The image forming apparatus as defined in claim 8, further comprising recording medium potential giving means which applies, to a side of said recording medium which is remote from said developing particle holder, a potential, which generates an electric field having the same direction as that of the electric field between said control grid and said counter-electrode when the developing particles fly through said control grid towards said counter-electrode, and maintains said potential even after said developing particles have flown from the developing particle holder to the recording medium.

15. The image forming apparatus as defined in claim 8, wherein an electrode group including said counter electrode and said control grid between said counter electrode and said developing particle holder is integrated, and said electrode group can be installed to and removed from an image forming apparatus main body as one unit.

16. An image forming apparatus, comprising:

a developing particle holder for holding developing particles by means of either of electric force and magnetic force;

a counter-electrode positioned opposite said developing particle holder;

a control grid, including a plurality of gates, is provided between said developing particle holder and said counter-electrode, in order to regulate passing of developing particles;

a power source section, furnishing a potential which generates a prescribed potential difference between said developing particle holder and said counter-electrode and applying a potential to said control grid; and grid potential control means for changing an electric field existing between said developing particle holder and said counter-electrode by changing the potential, applied by said power source section to said control grid, according to image signals, in order to form an image, by controlling flight of developing particles from said developing particle holder through each gate towards said counter-electrode and by adhering the developing particles to a recording medium arranged in a direction toward which the developing particles fly; and a developing particle anti-sticking grid having developing particle passing holes which have diameter, larger than that of the gates of said control grid and are positioned in opposition to the gates of said control grid, said developing particle anti-sticking grid being positioned between said control grid and said developing particle holder.

17. An image forming apparatus, comprising:

a developing particle holder for holding developing particles by means of either of electric force and magnetic force;

a counter electrode positioned opposite to said developing particle holder, said counter electrode having a developing particle passing hole for allowing developing particles which flew from said developing particle holder to pass;

a control grid having a plurality of gates as a passing section of the developing particles, said control grid being provided between said developing particle holder and said counter electrode;

a power source section for giving a potential which generates a prescribed potential difference between said developing particle holder and said counter electrode and for giving a potential to said control grid; and grid potential control means for changing an electric field existing between said developing particle holder and said counter electrode by changing the potential given from said power source section to said control grid according image signals in order to form an image by controlling flying of developing particles from said developing particle holder through said gate towards said counter electrode and by adhering the developing particles to a recording medium in an opposite side to the developing particle holder side of the counter electrode.

18. The image forming apparatus as defined in claim 17, further comprising:

a developing particle flying stabilization electrode positioned on an opposite side to the counter electrode side with respect to the recording medium, wherein a potential, which generates an electric field having a same direction as that of an electric field existing between said control grid and said counter electrode when the developing particles fly towards the counter electrode through said control grid, is given from said power source section to said developing particle flying stabilization electrode.

19. The image forming apparatus as defined in claim 17, further comprising recording medium potential giving means for giving a potential, which generates an electric field having a same direction as that of the electric field between said control grid and said counter electrode when the developing particles fly through said control grid towards said counter electrode, to an opposite side of the recording medium to the developing particle holder side.

20. The image forming apparatus as defined in claim 19, wherein said recording medium potential giving means is a roller which is pressed against the counter electrode side on the recording medium in a pair of rollers for charging the recording medium while transferring it in a carrying direction.

21. The image forming apparatus as defined in claim 17, wherein an electrode group including said counter electrode and said control grid between said counter electrode and said developing particle holder is integrated, and said electrode group can be installed to and removed from an image forming apparatus main body as one unit.

22. An image forming apparatus, comprising: a plurality of gates which selectively open and close to allow developing particles to pass through said gates, thereby forming an image on a recording medium, said plurality of gates being arranged in a matrix-fashion;

a plurality of data storing means;

image data writing means for successively writing image data inputted from an outer apparatus per line into successive ones of said plurality of storing means;

image data reading means for reading out image data from a storing means other than the storing means into which image data are currently being written by said image data writing means, thereby performing simultaneous reading and writing operations; and signal converting means which convert the image data, read out by said image data reading means, into control signals which switch said gates open and closed.

23. The image forming apparatus as defined in claim 22, wherein said storing means includes:

an odd memory for storing the image data on odd lines; and an even memory for storing the image data on even lines.

24. The image forming apparatus as defined in claim 23, wherein said gates include a matrix where an interval for an odd picture element is provided uniformly between lines.

* * * * *